(12) United States Patent
Bodwin

(10) Patent No.: US 12,001,508 B1
(45) Date of Patent: Jun. 4, 2024

(54) METHODS FOR MULTIPLYING MATRICES USING A PLURALITY OF CHIPLETS

(71) Applicant: Persimmons, Inc., Newport Beach, CA (US)

(72) Inventor: James Michael Bodwin, Cupertino, CA (US)

(73) Assignee: Persimmons, Inc., Newport Beach, CA (US)

( * ) Notice: Subject to any disclaimer, the term of this patent is extended or adjusted under 35 U.S.C. 154(b) by 0 days.

(21) Appl. No.: 18/492,016

(22) Filed: Oct. 23, 2023

(51) Int. Cl.
  *G06F 17/16* (2006.01)
  *G06F 7/523* (2006.01)
  *G06F 7/544* (2006.01)

(52) U.S. Cl.
  CPC ............... G06F 17/16 (2013.01); G06F 7/523 (2013.01); G06F 7/5443 (2013.01)

(58) Field of Classification Search
  CPC ......... G06F 17/16; G06F 7/523; G06F 7/5443
  See application file for complete search history.

(56) References Cited

U.S. PATENT DOCUMENTS

| | | | |
|---|---|---|---|
| 8,924,455 B1 * | 12/2014 | Barman | G06F 7/5443 708/607 |
| 10,915,297 B1 | 2/2021 | Halutz et al. | |
| 11,194,549 B2 * | 12/2021 | Liu | G06F 7/5277 |
| 11,328,037 B2 * | 5/2022 | Yinger | G06F 7/5443 |
| 11,556,762 B2 | 1/2023 | Flowers et al. | |

FOREIGN PATENT DOCUMENTS

CN 104899182 B 10/2017

OTHER PUBLICATIONS

Don Scansen, "Chiplets: A Short History", Mar. 2021, retrieved from https://www.eetimes.com/chiplets-a-short-history/ (Year: 2021).*
Nick Evanson, "What Are Chiplets and Why They Are So Important for the Future of Processors—The Chiplets Explainer", Jun. 2023, retrieved from https://www.techspot.com/article/2678-chiplets-explained/ (Year: 2023).*

(Continued)

*Primary Examiner* — Matthew D Sandifer
(74) *Attorney, Agent, or Firm* — Ascenda Law Group, PC

(57) ABSTRACT

A plurality of chiplets may be used to multiply two matrices A and B. Matrix A may be decomposed into horizontal stripes and matrix B may be decomposed into vertical stripes. Each of the horizontal stripes may be multiplied by each of the vertical stripes to form the output matrix C. Specifically, horizontal stripes may be stored in a stationary, distributed manner across the chiplets, while the vertical stripes (or sub-vertical stripes) may be passed between respective pairs of the chiplets until each of the vertical stripes (or sub-vertical stripes) of matrix B has been received and processed by each of the chiplets. The vertical stripes may be passed along one or more paths that interconnect the chiplets. Similar techniques can be applied to an arrangement in which the vertical stripes are stationary and the horizontal stripes (or sub-horizontal stripes) are passed between respective pairs of the chiplets.

20 Claims, 58 Drawing Sheets

(56) References Cited

OTHER PUBLICATIONS

S.-G. Cho, W. Tang, C. Liu and Z. Zhang, "PETRA: A 22nm 6.97TFLOPS/W AIB-Enabled Configurable Matrix and Convolution Accelerator Integrated with an Intel Stratix 10 FPGA," 2021 Symposium on VLSI Circuits, pp. 1-2, 2021 (Year: 2021).*
J. de Fine Licht, G. Kwasniewski, and T. Hoefler, "Flexible Communication Avoiding Matrix Multiplication on FPGA with High-Level Synthesis", in Proceedings of the 2020 ACM/SIGDA International Symposium on Field-Programmable Gate Arrays (FPGA '20), pp. 244-254, 2020 (Year: 2020).*
R. Hwang, T. Kim, Y. Kwon and M. Rhu, "Centaur: A Chiplet-based, Hybrid Sparse-Dense Accelerator for Personalized Recommendations," 2020 ACM/IEEE 47th Annual International Symposium on Computer Architecture (ISCA), pp. 968-981, 2020 (Year: 2020).*
Boehm; et al., "On Optimizing Operator Fusion Plans for Large-Scale Machine Learning in SystemML", Cornell University, Jan. 2, 2018, arXiv:1801.00829v1 [cs.DB], 14 pgs.
Fox; et al., "Chiplets and The Codelet Model", Cornell University, Sep. 13, 2022, spearXiv:2209.06083v1 [cs.DC], 11 pgs.
Lee; et al., "Generalized Cannon's Algorithm for Parallel Matrix Multiplication", ICS '97: Proceedings of the 11th international conference on Supercomputing, Jul. 1997, pp. 44-51.
Shoeybi; et al., "Megatron-LM: Training Multi-Billion Parameter Language Models Using Model Parallelism", Cornell University, Mar. 13, 2020, arXiv:1909.08053v4 [cs.CL], 15 pgs.
Van de Geijn; et al., "SUMMA: Scalable Universal Matrix Multiplication Algorithm", University of Texas at Austin, Computer Science Dept., Technical Report, Apr. 1, 1995, 19 pgs.
Wang; et al., "Overlap Communication with Dependent Computation via Decomposition in Large Deep Learning Models", ASPLOS '23, Mar. 25-29, 2023, pp. 93-106.
Zitti; et al., "Efficient technique for partitioning and programming linear algebra algorithms on concurrent VLSI architectures", IEE Proceedings—Circuits, Devices and systems, Apr. 1995, 142(2):97-104.

* cited by examiner $$\begin{bmatrix} A_1 \\ \vdots \\ A_s \end{bmatrix} * [B_1 \; \cdots \; B_t] = \begin{bmatrix} A_1B_1 & \cdots & A_1B_t \\ \vdots & \ddots & \vdots \\ A_sB_1 & \cdots & A_sB_t \end{bmatrix} \begin{bmatrix} C_1 \\ \vdots \\ C_s \end{bmatrix} = \begin{bmatrix} \gamma_1 \\ \vdots \\ \gamma_t \end{bmatrix}$$

Fig. 2A $$A_i * B_j = \begin{bmatrix} \alpha_1^T \\ \vdots \\ \alpha_h^T \end{bmatrix} * \begin{bmatrix} \beta_1 & \cdots & \beta_w \end{bmatrix} = \begin{bmatrix} \alpha_1^T \beta_1 & \cdots & \alpha_h^T \beta_1 \\ \vdots & \ddots & \vdots \\ \alpha_1^T \beta_w & \cdots & \alpha_h^T \beta_w \end{bmatrix}$$

Fig. 2B

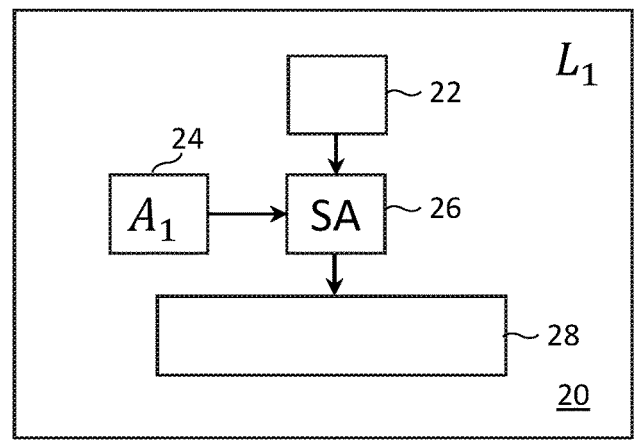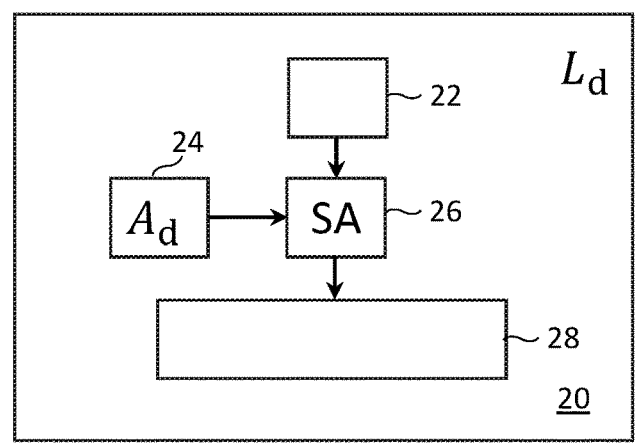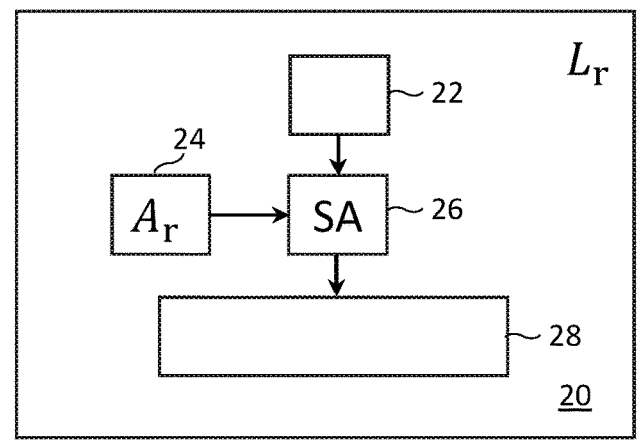
Fig. 5

$$A_1 \left\{ \begin{bmatrix} E_{1,1} & \cdots & E_{1,u} \\ \vdots & \cdots & \vdots \\ E_{s,1} & \cdots & E_{s,u} \end{bmatrix} * \begin{bmatrix} B_1 & & B_t \\ \begin{bmatrix} F_{1,1} \\ \vdots \\ F_{u,1} \end{bmatrix} & \cdots & \begin{bmatrix} F_{1,t} \\ \vdots \\ F_{u,t} \end{bmatrix} \end{bmatrix} = \begin{bmatrix} \overbrace{\sum_{k=1}^{u} E_{1,k}F_{k,1}}^{A_1 B_1} & \cdots & \overbrace{\sum_{k=1}^{u} E_{1,k}F_{k,t}}^{A_1 B_t} \\ \vdots & \ddots & \vdots \\ \underbrace{\sum_{k=1}^{u} E_{s,k}F_{k,1}}_{A_s B_1} & \cdots & \underbrace{\sum_{k=1}^{u} E_{s,k}F_{k,t}}_{A_s B_t} \end{bmatrix} \right.$$

Fig. 8

$$\begin{bmatrix} E_{1,1} & E_{1,2} & E_{1,3} & E_{1,4} \\ E_{2,1} & E_{2,2} & E_{2,3} & E_{2,4} \\ E_{3,1} & E_{3,2} & E_{3,3} & E_{3,4} \\ E_{4,1} & E_{4,2} & E_{4,3} & E_{4,4} \end{bmatrix} * \begin{bmatrix} F_{1,1} & F_{1,2} \\ F_{2,1} & F_{2,2} \\ F_{3,1} & F_{3,2} \\ F_{4,1} & F_{4,2} \end{bmatrix}$$

Fig. 10

$$\begin{bmatrix} E_{1,1} & E_{1,2} & E_{1,3} & E_{1,4} \\ E_{2,1} & E_{2,2} & E_{2,3} & E_{2,4} \\ E_{3,1} & E_{3,2} & E_{3,3} & E_{3,4} \\ E_{4,1} & E_{4,2} & E_{4,3} & E_{4,4} \\ E_{5,1} & E_{5,2} & E_{5,3} & E_{5,4} \\ E_{6,1} & E_{6,2} & E_{6,3} & E_{6,4} \\ E_{7,1} & E_{7,2} & E_{7,3} & E_{7,4} \\ E_{8,1} & E_{8,2} & E_{8,3} & E_{8,4} \end{bmatrix} * \begin{bmatrix} F_{1,1} \\ F_{2,1} \\ F_{3,1} \\ F_{4,1} \end{bmatrix} \begin{bmatrix} F_{1,2} \\ F_{2,2} \\ F_{3,2} \\ F_{4,2} \end{bmatrix}$$

→ Processed in 1st time period

→ Processed in 2nd time period

Fig. 22A $$\begin{bmatrix} E_{1,1} & E_{1,2} & E_{1,3} & E_{1,4} \\ E_{2,1} & E_{2,2} & E_{2,3} & E_{2,4} \\ E_{3,1} & E_{3,2} & E_{3,3} & E_{3,4} \\ E_{4,1} & E_{4,2} & E_{4,3} & E_{4,4} \\ E_{5,1} & E_{5,2} & E_{5,3} & E_{5,4} \\ E_{6,1} & E_{6,2} & E_{6,3} & E_{6,4} \\ E_{7,1} & E_{7,2} & E_{7,3} & E_{7,4} \\ E_{8,1} & E_{8,2} & E_{8,3} & E_{8,4} \end{bmatrix} * \begin{bmatrix} F_{1,1} & F_{1,2} \\ F_{2,1} & F_{2,2} \\ F_{3,1} & F_{3,2} \\ F_{4,1} & F_{4,2} \end{bmatrix} \rightarrow \text{Processed in same time period}$$

Fig. 23A

METHODS FOR MULTIPLYING MATRICES USING A PLURALITY OF CHIPLETS

FIELD OF THE INVENTION

The present invention relates to methods for multiplying matrices using a plurality of chiplets, and more specifically relates to using the chiplets to multiply striped data of matrix A with striped data from matrix B.

BACKGROUND

The inference operation in large language models (LLMs) involves multiplying two or more matrices, each with many parameters. Described hereinbelow are techniques to multiply two or more matrices using a plurality of chiplets under the constraint of low latency.

SUMMARY OF THE INVENTION

In accordance with one embodiment of the invention, a plurality of chiplets may be employed to multiply two or more matrices. For simplicity of discussion, the description will primarily focus on the multiplication of matrix A and with matrix B, as such description can be readily extended to the multiplication of three matrices, and so on. Matrix A may be decomposed into horizontal stripes and matrix B may be decomposed into vertical stripes. Each of the horizontal stripes may be multiplied by each of the vertical stripes to form the output matrix C. Specifically, horizontal stripes may be stored in a stationary, distributed manner across the chiplets, while the vertical stripes (or sub-vertical stripes) may be passed between respective pairs of the chiplets until each of the vertical stripes of the B matrix has been received and processed by each of the chiplets. The vertical stripes may be passed along one or more paths that interconnect the chiplets. Similar techniques can be applied to an arrangement in which the vertical stripes are stationary and the horizontal stripes (or sub-horizontal stripes) are passed between respective pairs of the chiplets.

In one embodiment, a method which employs stationary horizontal stripes comprises partitioning a matrix A with size m rows by n columns into a plurality of input horizontal stripes, $A_1, \ldots, A_S$, such that $$A = \begin{bmatrix} A_1 \\ \vdots \\ A_s \end{bmatrix},$$

each of the input horizontal stripes, $A_i$, having size h rows by n columns, with h being is less than m. Matrix B with size n rows by p columns may be partitioned into a plurality of vertical stripes, $B_1, \ldots, B_t$, such that $$B = [B_1 \ldots B_t],$$

each of the vertical stripes, $B_j$, with size n rows by w columns, with w being is less than p. The input horizontal stripes $A_1, \ldots, A_r$ may be stored across a plurality of chiplets, $L_1, \ldots, L_r$, such that input horizontal stripe $A_d$ is stored at the chiplet $L_d$, for $d=1 \ldots r$, wherein each of the chiplets comprises a systolic array. Each of the vertical stripes $B_1, \ldots, B_t$ may be communicated between respective pairs of the chiplets from the plurality of chiplets until each of the chiplets from the plurality of chiplets has received each of the vertical stripes $B_1, \ldots, B_t$. At the chiplet, $L_d$, $d=1 \ldots r$, the systolic array may multiply the input horizontal stripe $A_d$ with each of the vertical stripes $B_1, \ldots, B_t$ so as to form an output horizontal stripe, Cd, in which $$C_d = [A_d B_1 \ldots A_d B_t],$$

each of the output horizontal stripes, $C_d$, having size h rows by p columns.

In another embodiment, a method which employs stationary vertical stripes comprise partitioning matrix A with size m rows by n columns into a plurality of horizontal stripes, $A_1, \ldots, A_S$, such that $$A = \begin{bmatrix} A_1 \\ \vdots \\ A_s \end{bmatrix},$$

each of the horizontal stripes, $A_i$, having size h rows by n columns, with h being is less than m. Matrix B with size n rows by p columns may be partitioned into a plurality of input vertical stripes, $B_1, \ldots, B_r$, such that $$B = [B_1 \ldots B_t],$$

each of the input vertical stripes, $B_j$, with size n rows by w columns, with w being is less than p. The input vertical stripes $B_1, \ldots, B_r$ may be stored across a plurality of chiplets, $L_1, \ldots, L_r$, such that input vertical stripe $B_d$ is stored at the chiplet $L_d$, for $d=1 \ldots r$, wherein each of the chiplets comprises a systolic array. Each of the horizontal stripes $A_1, \ldots, A_S$ may be communicated between respective pairs of the chiplets from the plurality of chiplets until each of the chiplets from the plurality of chiplets has received each of the horizontal stripes $A_1, \ldots, A_S$. At the chiplet, $L_d$, $d=1 \ldots r$, the systolic array may multiply each the horizontal stripes $A_1, \ldots, A_S$ with the input vertical stripe $B_d$ so as to form an output vertical stripe, $\gamma_d$, in which $$\gamma_d = \begin{bmatrix} A_1 B_d \\ \vdots \\ A_s B_d \end{bmatrix},$$

each of the output vertical stripes, $\gamma_d$, having size m rows by w columns.

In one embodiment, a method which employs stationary horizontal stripes comprises partitioning matrix A with size m rows by n columns into a plurality of input horizontal stripes, $A_1, \ldots, A_S$, such that $$A = \begin{bmatrix} A_1 \\ \vdots \\ A_s \end{bmatrix},$$

each of the input horizontal stripes, $A_i$, for $i=1, \ldots, s$, having size h rows by n columns, with h being is less than m. Each of the input horizontal stripes, $A_i$, for $i=1, \ldots, s$ may further be partitioned into a plurality of sub-horizontal stripes $\{E_{i,k}\}|_{i=1 \ldots s, k=1 \ldots u}$, such that $$A_i = [E_{i,1} \ldots E_{i,u}],$$

each of the sub-horizontal stripes, $E_{i,k}$ having size h rows by x columns, with x being less than n. A second matrix, B, with size n rows by p columns may be partitioned into a plurality of vertical stripes, $B_1, \ldots, B_t$, such that $$B = [B_1 \ldots B_t],$$

each of the vertical stripes, $B_j$, for $j=1, \ldots, t$ with size n rows by w columns, with w being is less than p. Each of the vertical stripes, $B_1$, for $j=1, \ldots, t$ may further be partitioned into a plurality of sub-vertical stripes $\{F_{k,j}\}|_{k=1 \ldots u, j=1 \ldots t}$, such that $F_u$ $$B_j = \begin{bmatrix} F_{1,j} \\ \vdots \\ F_{u,j} \end{bmatrix},$$

each of the sub-vertical stripes, $F_{k,j}$, having size x rows by w columns. The input horizontal stripes $A_1, \ldots, A_r$ may be stored across a plurality of chiplets, $L_1, \ldots, L_r$, such that horizontal stripe $A_d$ is stored at chiplet $L_d$, for $d=1 \ldots r$, wherein each of the chiplets comprises a systolic array. The sub-vertical stripes $\{F_{k,j}\}|_{k=1 \ldots u, j=1 \ldots t}$ may be communicated between respective pairs of the chiplets from the plurality of chiplets until each of the chiplets from the plurality of chiplets has received each of the sub-vertical stripes $\{F_{k,j}\}|_{k=1 \ldots u, j=1 \ldots t}$. At the chiplet, $L_d$, for $d=1 \ldots r$:
  the sub-horizontal stripe $E_{d,k}$ may be multiplied with the sub-vertical stripe $F_{k,j}$ for $j=1 \ldots t$ and $k=1 \ldots u$ so as to form a plurality of products $E_{d,k}F_{k,j}$ for $j=1 \ldots t$ and $k=1 \ldots u$.
  the plurality of products may be summed in accordance with $$A_d B_j = \sum_{k=1}^{u} E_{d,k} F_{k,j},$$

for $j=1 \ldots t$, and
  the output horizontal stripe, $C_d$, may be formed in accordance with $$C_d = [A_d B_1 \ldots A_d B_t],$$

each of the output horizontal stripes, $C_d$, having size h rows by p columns.

In one embodiment, a method that employs stationary vertical stripes comprises partitioning matrix A with size m rows by n columns into a plurality of input horizontal stripes, $A_1, \ldots, A_S$, such that $$A = \begin{bmatrix} A_1 \\ \vdots \\ A_s \end{bmatrix},$$

each of the input horizontal stripes, $A_i$, having size h rows by n columns, with h being is less than m. Each of the input horizontal stripes, $A_1, \ldots, A_S$ may be further partitioned into a plurality of sub-horizontal stripes $\{E_{i,k}\}|_{i=1 \ldots s, k=1 \ldots u}$, such that $$A_i = [E_{i,1} \ldots E_{i,u}],$$

each of the sub-horizontal stripes, $E_{i,k}$, having size h rows by x columns, with x being less than n. Matrix B with size n rows by p columns may be partitioned into a plurality of vertical stripes, $B_1, \ldots B_t$, such that $$B = [B_1 \ldots B_t],$$

each of the vertical stripes, $B_j$, with size n rows by w columns, with w being is less than p. Each of the vertical stripes, $B_1, \ldots, B_t$ may be further partitioned into a plurality of sub-vertical stripes $\{F_{k,j}\}|_{k=1 \ldots u, j=1 \ldots t}$, such that $$B_j = \begin{bmatrix} F_{1,j} \\ \vdots \\ F_{u,j} \end{bmatrix},$$

each of the sub-vertical stripes, $F_{k,j}$, having size x rows by w columns. The input vertical stripes $B_1, \ldots, B_r$ may be stored across a plurality of chiplets, $\{L_d\}|_{d=1 \ldots r}$, such that input vertical stripe $B_d$ is stored at the chiplet $L_d$, for $d=1 \ldots r$, in which each of the chiplets comprises a systolic array. Each of the sub-horizontal stripes $\{E_{i,k}\}|_{i=1 \ldots s, k=1 \ldots u}$ may be communicated between respective pairs of the chiplets from the plurality of chiplets until each of the chiplets from the plurality of chiplets has received each of the sub-horizontal stripes $\{E_{i,k}\}|_{i=1 \ldots s, k=\ldots u}$. At the chiplet, $L_d$, for $d=1 \ldots r$:
  the sub-horizontal stripe $E_{i,k}$ may be multiplied with the sub-vertical stripe $F_{k,d}$ for $i=1 \ldots s$ and $k=1 \ldots u$ so as to form a plurality of products $E_{i,k}F_{k,d}$ for $i=1 \ldots s$ and $k=1 \ldots u$;
  the plurality of products may be summed in accordance with $$A_i B_d = \sum_{k=1}^{u} E_{i,k} F_{k,d}, \text{ for } i = 1 \ldots s;$$

and
  an output vertical stripe, $\gamma_d$, may be formed in which $$\gamma_d = \begin{bmatrix} A_1 B_d \\ \vdots \\ A_s B_d \end{bmatrix},$$

each of the output vertical stripes, $\gamma_d$, having size m rows by w columns.

These and other embodiments of the invention are more fully described in association with the drawings below.

BRIEF DESCRIPTION OF THE DRAWINGS

FIG. 2A depicts the decomposition of matrix A into a column of horizontal stripes, the decomposition of matrix B into a row of vertical stripes, and matrix multiplication based on the aforementioned decomposition of matrix A and matrix B.

FIG. 2B depicts the decomposition of a horizontal stripe into a column of row vectors and a vertical stripe as a row of column vectors, and the multiplication of a horizontal stripe with a vertical stripe based on the aforementioned decompositions of a horizontal stripe and a vertical stripe.

FIG. 5 depicts input horizontal stripes that have been stored into a plurality of chiplets, in accordance with one embodiment of the invention.

FIG. 8 depicts a further decomposition of matrix A in which each horizontal stripe is decomposed into a row of sub-horizontal stripes, a further decomposition of matrix B in which each vertical stripe is decomposed into a column of sub-vertical stripes, and matrix multiplication based on the aforementioned decomposition of matrix A and matrix B.

FIG. 10 depicts an example of matrix A and matrix B, with the decomposition explained in FIG. 8, in accordance with one embodiment of the invention.

FIGS. 22A-22C depicts the decomposition of matrix A and matrix B in accordance with FIG. 8, in which the vertical stripes are processed in separate time periods, in accordance with one embodiment of the invention.

FIGS. 23A-23B depicts the decomposition of matrix A and matrix B in accordance with FIG. 8, in which the vertical stripes are processed in the same time period, in accordance with one embodiment of the invention.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/steps.

Figure 1:
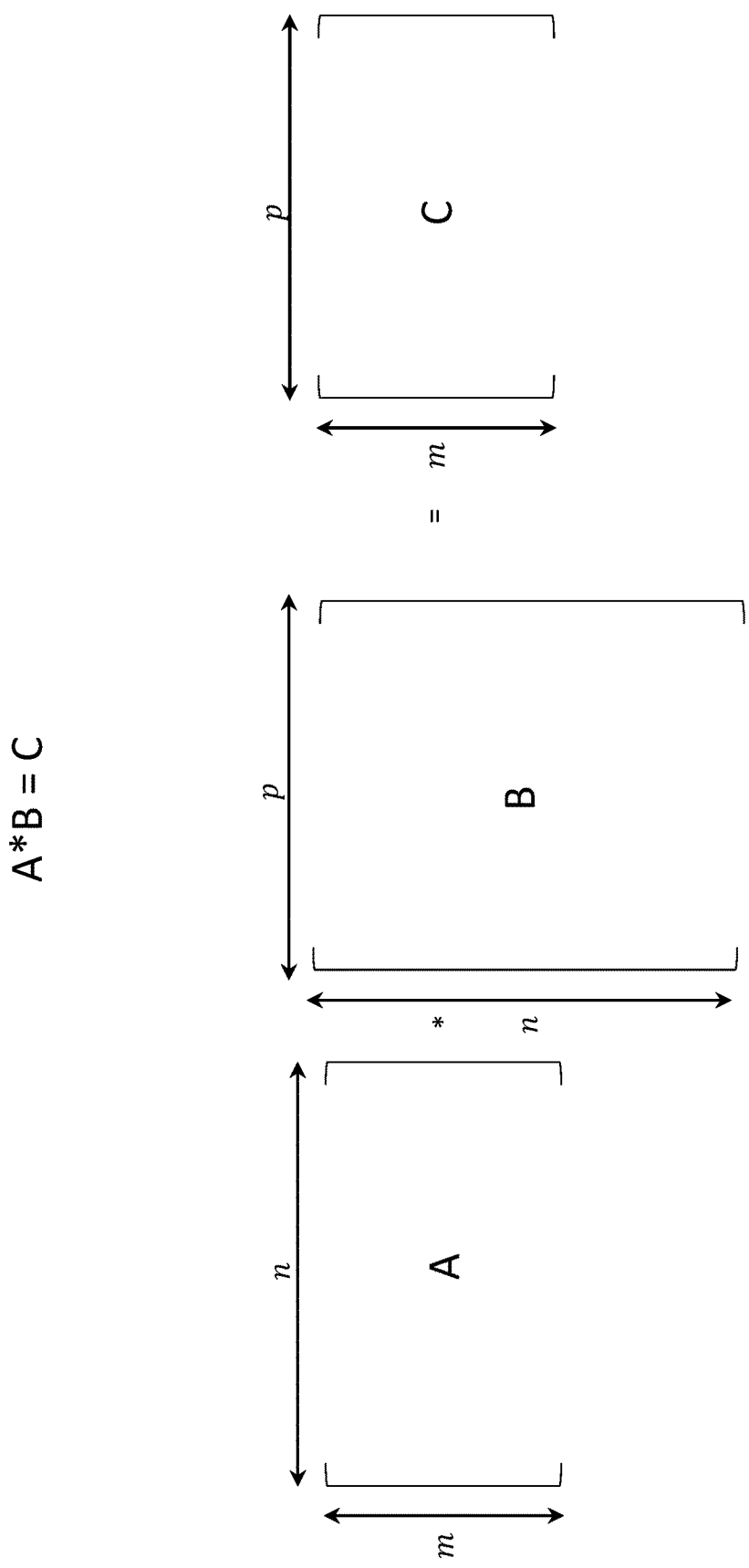
FIG. 1 depicts the multiplication of two matrices.

FIG. 1 depicts the multiplication of matrix A with matrix B. Matrix A has dimensions m×n and matrix B has dimensions n×p. The multiplication of matrix A with matrix B (i.e., AB) yields matrix C with dimensions m×p. In the discussion hereinbelow, matrix A is used to refer to the matrix on the "left" position of the product operation and matrix B is used to refer to the matrix on the "right" position of the product operation. As is known, matrix multiplication is not a commutative operation so it is important to clarify the respective positions in which matrix A and matrix B are disposed.

In FIG. 2A, matrix A is expressed as a column of horizontal stripes, $A_1 \ldots A_S$, and matrix B is expressed as a row of vertical stripes, $B_1 \ldots B_t$. Matrix C can be computed by multiplying each of the horizontal stripes $A_1 \ldots A_S$ with each of the vertical stripes, $B_1 \ldots B_t$ (i.e., $A_iB_j$, for i=1 . . . s, j=1 . . . t). Each product $A_iB_j$ may form a "tile" $C_{i,j}$ of matrix C, and the tiles (with dimensions h×w) can be arranged as shown in FIG. 2 to form matrix C.

In an alternative formulation, matrix C can be expressed as a column of horizontal stripes $C_d$, d=1 . . . s, (as shown in FIG. 2) in which each horizontal stripe $C_d$ may be computed as follows:

$$C_d = [A_d B_1 \ldots A_d B_t].$$

In yet another formulation, matrix C can be expressed as a row of vertical stripes $\gamma_d$, d=1 . . . t, (as shown in FIG. 2) in which each vertical stripe $\gamma_d$ may be computed as follows:

$$\gamma_d = \begin{bmatrix} A_1 B_d \\ \vdots \\ A_s B_d \end{bmatrix}$$

Most of the description hereinbelow will focus on the computation of matrix C based on the formulation of matrix C as a column of horizontal stripes. It is expected that the reader will be able to extend the description to the alternative formulation of matrix C as a row of vertical stripes.

In FIG. 2B, a horizontal stripe $A_i$ can be expressed as a column of row vectors, $\alpha_1^T, \ldots, \alpha_h^T$, and a vertical stripe $B_j$ can be represented as a row of column vectors, $\beta_1, \ldots, \beta_w$. Based on principles from linear algebra, each of the elements of the product of $A_iB_j$ can be computed as a dot product (also called an "inner product") of a row vector from horizontal stripe $A_i$ with a column vector from vertical stripe $B_j$.

Figure 3A:
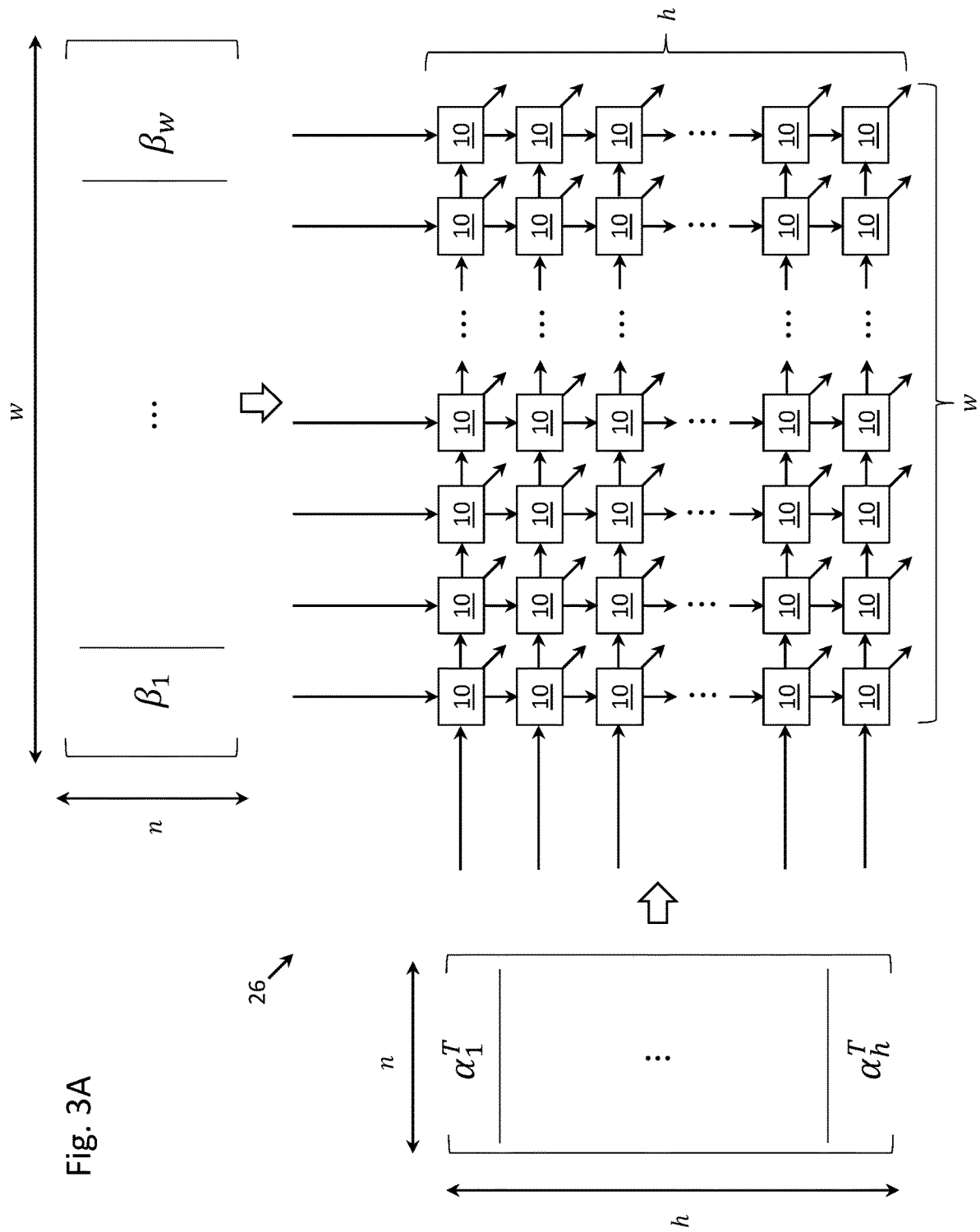
FIG. 3A depicts a system diagram of a systolic array, in accordance with one embodiment of the invention.

FIG. 3A depicts a system diagram of a systolic array 26, with h horizontal input lines and w vertical input lines, which is configured to multiply a horizontal stripe (with dimensions h×n) with a vertical stripe (with dimensions n×w). In other words, the circuit of FIG. 3A can be used to carry out the product depicted in FIG. 2B. One column of the horizontal stripe may be fed into the systolic array 26 every clock cycle (in a left to right direction in the orientation depicted in FIG. 3A), and one row of the vertical stripe may be fed into the systolic array 26 every clock cycle (in a top to bottom direction in the orientation depicted in FIG. 3A).

Figure 3B:
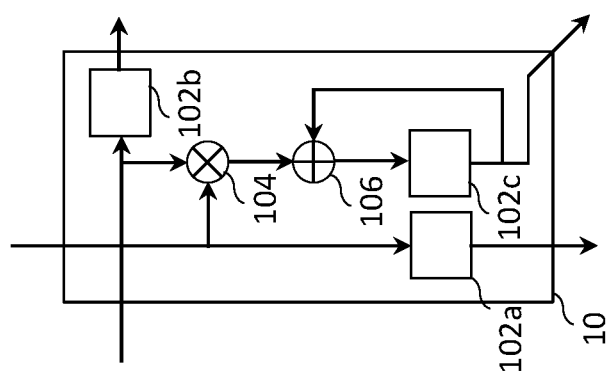
FIG. 3B depicts a system diagram of a multiply accumulate (MAC) unit, in accordance with one embodiment of the invention.

A multiply accumulate (MAC) unit 10 may be disposed at the intersection of each horizontal input line and vertical input line, which computes the dot product (or also called an "inner product") of a row (or row vector) of the horizontal stripe with a column (or column vector) of the vertical stripe. The internal structure of one of the MAC units 10 is depicted in FIG. 3B. As shown, MAC unit 10 may include three storage elements 102a, 102b, 102c, one multiplier 104 and one adder 106. The respective storage elements 102a from each column of the MAC units 10 may form a linear shift register that shifts elements from a column of the vertical stripe in the downwards direction every clock cycle. The respective storage elements 102b from each row of the MAC units 10 may form a linear shift register that shifts elements from a row of the input stripe in the rightwards direction every clock cycle. Multiplier 104 may compute the product of the value from the vertical input line with the value from the horizontal input line, and an accumulator (formed by adder 106 may storage element 102c) may accumulate the current product with the sum of the previous products. After n clock cycles, the dot product of row from the horizontal stripe and a column vector from the vertical stripe may be read from storage element 208c. It should be understood that terms such as horizontal, vertical, downwards and rightwards are intended to be used in the conceptual manner with respect to the diagram in FIG. 3, and may or may not apply to a chip-level implementation of the systolic array 26.

Figure 4:
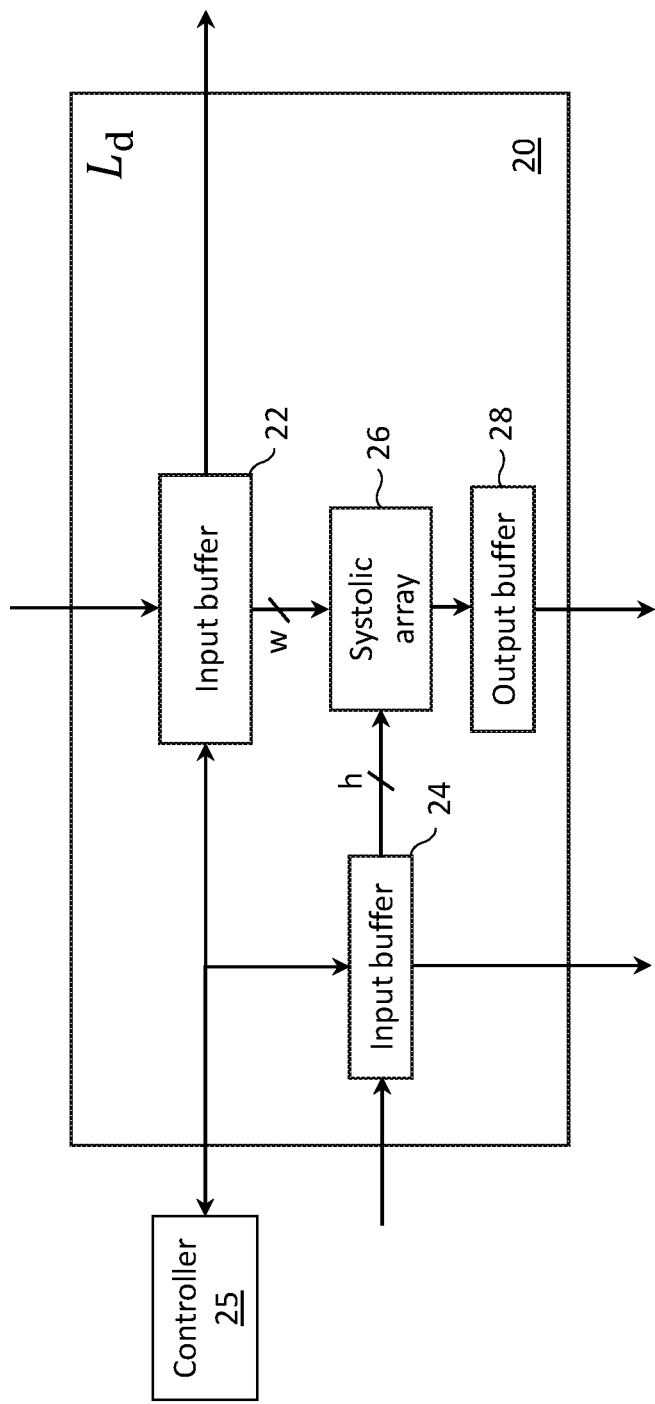
FIG. 4 depicts a system diagram of a chiplet, in accordance with one embodiment of the invention.

FIG. 4 depicts a system diagram of a chiplet 20. The uppercase letter "L" will also be used to refer to a chiplet 20 and the subscript "d" will be used as an index to refer to the various instances of a chiplet. Chiplet 20 may include input buffer 24 for receiving and storing one or more horizontal stripes (and/or one or more sub-horizontal stripes, as will be later described). Controller 25 may select one of the horizontal stripes, a portion of a horizontal stripe or a sub-horizontal stripe that is stored in input buffer 24 to be transmitted to the h horizontal input lines of systolic array 26. The data that is sent from input buffer 24 to systolic array 26 may also be transmitted from chiplet 20 to another chiplet (not depicted in FIG. 4). In one embodiment, input buffer 24 may be structured as a queue, or more specifically a first-in-first-out (FIFO) queue. In the case of a FIFO queue, a sequence of horizontal stripes (or sub-horizontal stripes) may be received over time, and the first horizontal stripe (or sub-horizontal stripe) that is received by input buffer 24 will be the first one that is sent to systolic array 26.

In a similar manner, chiplet 20 may include input buffer 22 for receiving and storing one or more vertical stripes (and/or one or more sub-vertical stripes, as will be later described). Controller 25 may select one of the vertical stripes, a portion of a vertical stripe or a sub-vertical stripe that is stored in input buffer 22 to be transmitted to the w vertical input lines of systolic array 26. The data that is sent from input buffer 22 to systolic array 26 may also be transmitted from chiplet 20 to another chiplet (not depicted in FIG. 4). In one embodiment, input buffer 22 may be structured as a queue, or more specifically a first-in-first-out (FIFO) queue. In the case of a FIFO queue, a sequence of vertical stripes (or sub-vertical stripes) may be received over time, and the first vertical stripes (or sub-vertical stripe) that is received by input buffer 24 will be the first one that is sent to systolic array 26.

Lastly, chiplet 20 may include an output buffer 28 to store the one or more products computed by the systolic array. Each of the products may have dimensions up to h×w (which are the dimensions of the systolic array). For completeness, it is noted that one or more of the input buffers 22, 24 and the output buffer 28 (or a portion thereof) may be instantiated within memory internal to the chiplet (e.g., SRAM) or memory external to the chiplet (e.g., DRAM).

FIG. 5 depicts input horizontal stripes $A_1, \ldots, A_r$ that have been stored at a plurality of chiplets, $L_1, \ldots, L_r$. Specifically, input horizontal stripe $A_d$ is stored at the chiplet $L_d$, for d=1 . . . r. The example assumes no particular distinctions between the r chiplets, so the label $L_1$ may merely refer to the chiplet at which the input horizontal stripe $A_1$ is stored, the label $L_2$ may merely refer to the chiplet at which the input horizontal stripe $A_2$ is stored, and so on. If r equals s, then that means that each input horizontal stripe has been loaded onto one chiplet. Under the condition that r equals s, it is possible that the total number of chiplets equals r, in which case the total number of chiplets equals the total number of input horizontal stripes, s. Under the condition that r equals s, it is also possible that the total number of chiplets exceeds r, in which case, those chiplets without stored input horizontal stripes have been omitted from the drawing for simplicity. Under the condition that there are more input horizontal stripes than chiplets, there are several ways in which this scenario can be handled. In one embodiment, the input horizontal stripes can be processed in groups (with one group followed serially by another group) in which the number of input horizontal stripes in each group is less than or equal to the total number of chiplets. Such a circumstance is explained further in FIG. 21A-21C. In another embodiment, more than one input horizontal stripe can be stored at a single chiplet, as explained further in FIGS. 21D-21F.

Figure 6:
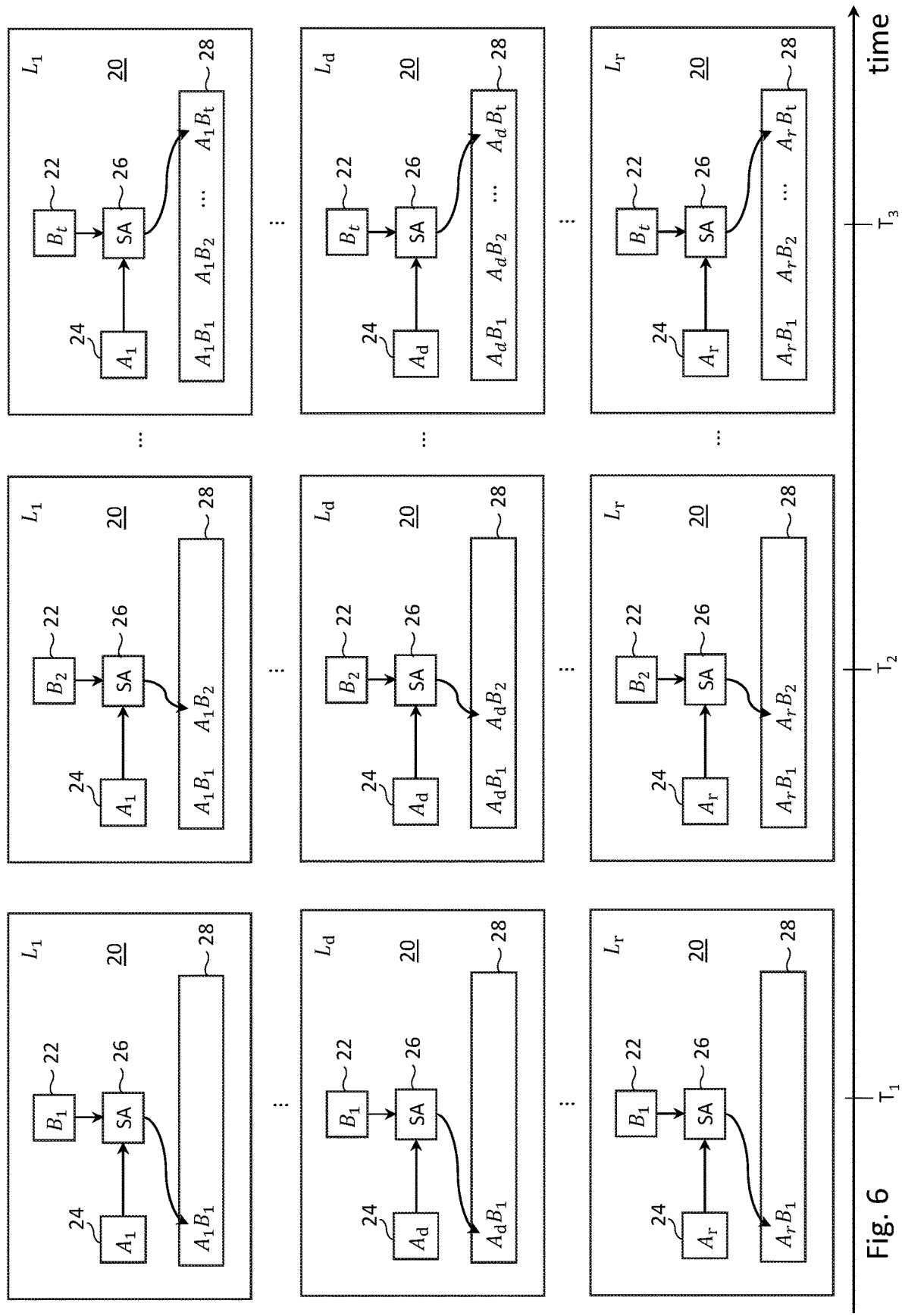
FIG. 6 depicts the processing of vertical stripes across the plurality of chiplets over various time periods, in accordance with one embodiment of invention.

FIG. 6 depicts the processing of vertical stripes across the plurality of chiplets over various time periods. In the example of FIG. 6, one should observe that the assignment of input horizontal stripes to chiplets remains stationary (i.e., does not get updated from one time period to another time period), while the assignment of vertical stripes to chiplets are updated from one time period to another time period. In time period $T_1$, vertical stripe $B_1$ is stored across the plurality of chiplets, $L_1, \ldots, L_r$, the product of $A_d$ and $B_1$ is computed by systolic array 26 at chiplet $L_d$ for $d=1, \ldots, r$, and the product $A_d B_1$ is stored at the output buffer 28 of $L_d$ for $d=1, \ldots, r$. In time period $T_2$, vertical stripe $B_2$ is stored across the plurality of chiplets, $L_1, \ldots, L_r$, the product of $A_d$ and $B_2$ is computed by systolic array 26 at $L_d$ for $d=1, \ldots, r$, and the product $A_d B_2$ is stored at the output buffer 28 of $L_d$ for $d=1, \ldots, r$. At time period $T_3$, the vertical stripe $B_t$ is stored across the plurality of chiplets, $L_1, \ldots, L_r$, the product of Ad and $B_t$ is computed by systolic array 26 at $L_d$ for $d=1, \ldots, r$, and the product $A_d B_t$ is stored at the output buffer 28 of $L_d$ for $d=1, \ldots, r$. The ellipses indicate that some time periods have been omitted for conciseness. For clarity, it is noted that time periods $T_1$, $T_2$, and $T_3$ are intended to indicate separate time periods. While the subscripts 1, 2 and 3 may suggest successive time periods, this is not intended in the example of FIG. 6. As should be clear, the ellipses indicate that time periods may be present between time periods $T_2$ and $T_3$.

After all vertical stripes of matrix B have been processed by the chiplets, the output horizontal stripe, $C_d=[A_d B_1 \ldots A_d B_t]$ is stored at the output buffer 28 of $L_d$ for $d=1, \ldots, r$. If s equals r (meaning that all input horizontal stripes are stored on the plurality of chiplets), then the entire output matrix C has been computed in a distributed manner across the chiplets. If s is greater than r, that means that only a portion of the output matrix C has been computed in a distributed manner across the chiplets, and the processing may need to be repeated for yet to be processed input horizontal stripes if the entire output matrix C is desired. It is noted that in the example of FIG. 6, the vertical stripes $B_1, \ldots, B_t$ were processed in the order of the vertical stripes from $B_1$ to $B_t$ for clarity of discussion, but this ordering is not needed as the each product computation of $A_i B_j$ can be performed independently from one another (based on the first principles of linear algebra). Stated differently, the vertical stripes can be processed in any order, as long as when the processing is finished, all of the vertical stripes $B_1, \ldots, B_t$ have been processed.

Figure 7:
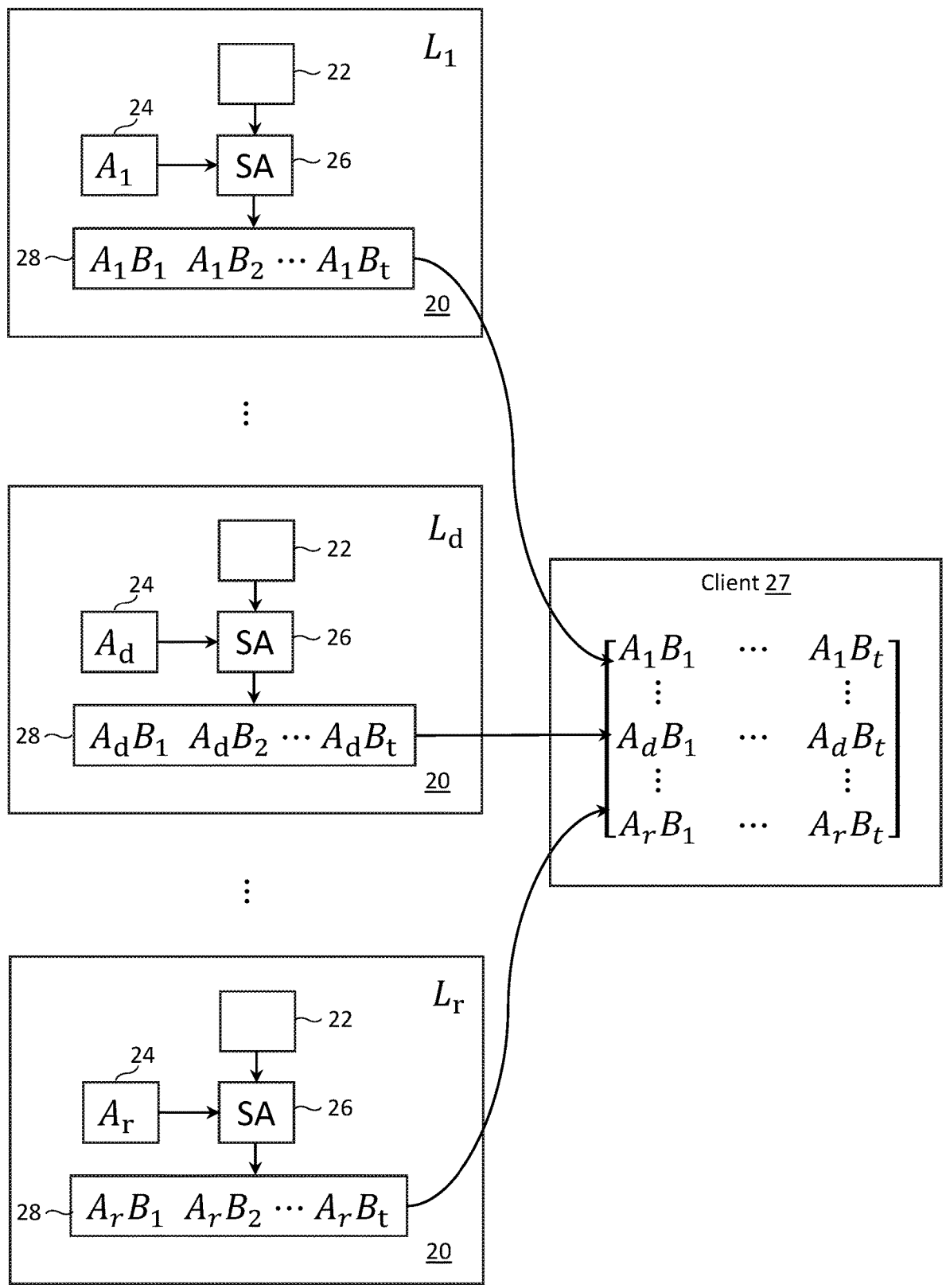
FIG. 7 depicts output horizontal stripes being transmitted to a client device, in accordance with one embodiment of the invention.

FIG. 7 depicts output horizontal stripes being transmitted to client device 27. Specifically, output horizontal stripe $C_d$ may be transmitted from chiplet $L_d$ to client device 27. The output horizontal stripes may be assembled at the client device 27 to form matrix C (or a portion of matrix C). In one embodiment (not depicted), the output horizontal stripes $C_d$ may be repurposed as a further input horizontal stripe by storing the contents of the output buffer 28 into the input buffer 24 for each of the chiplets $L_d$ for $d=1, \ldots, r$. In other words, output matrix C can replace the original matrix A, and matrix B can be replaced with some other matrix (e.g., matrix D), and the product of matrix C and matrix D can be computed without ever having to load the input horizontal stripes of matrix C onto the chiplets (as the input horizontal stripes of C were first generated on the respective chiplets). In a preferred embodiment, the output of the systolic array 26 (i.e., the data stored in the output buffer) is only transmitted to client device 27, and is not transmitted from one chiplet to another chiplet. The inter-chiplet communication, as will be later explained in more detail, will primarily be limited to the stripes of the input matrices (i.e., matrix A or matrix B).

FIG. 8 depicts a further decomposition of matrix A in which each horizontal stripe is decomposed into a row of sub-horizontal stripes, a further decomposition of matrix B in which each vertical stripe is decomposed into a column of sub-vertical stripes, and matrix multiplication based on the aforementioned decomposition of matrix A and matrix B. Specifically, horizontal stripe, $A_i$, may be partitioned (or decomposed) into a plurality of sub-horizontal stripes $E_{i,k}$, for $i=1 \ldots s$, $k=1 \ldots u$, such that $$A_i = [E_{i,1} \ldots E_{i,u}],$$

Each of the sub-horizontal stripes, $E_{i,k}$, may have dimensions h×x. Similarly, vertical stripe, $B_j$, may be partitioned (or decomposed) into a plurality of sub-vertical stripes $F_{k,j}$, for $k=1 \ldots u$, $j=1 \ldots t$ such that $$B_j = \begin{bmatrix} F_{1,j} \\ \vdots \\ F_{u,j} \end{bmatrix}$$

Each of the sub-vertical stripes, $F_{k,j}$, may have dimensions x×w. Based on this further decomposition of matrix A and matrix B, the product of one horizontal stripe from matrix A and one vertical stripe from matrix B can be computed using one of the systolic arrays 26 as a sum of the products of sub-horizontal stripes with sub-vertical stripes. Specifically, the product of $A_i$ and $B_j$ may be computed as $$A_i B_j = \sum_{k=1}^{u} E_{i,k} F_{k,j}.$$

An advantage provided by this further decomposition is a reduced amount of memory for one of input buffers 22 and 24.

Figure 9A:
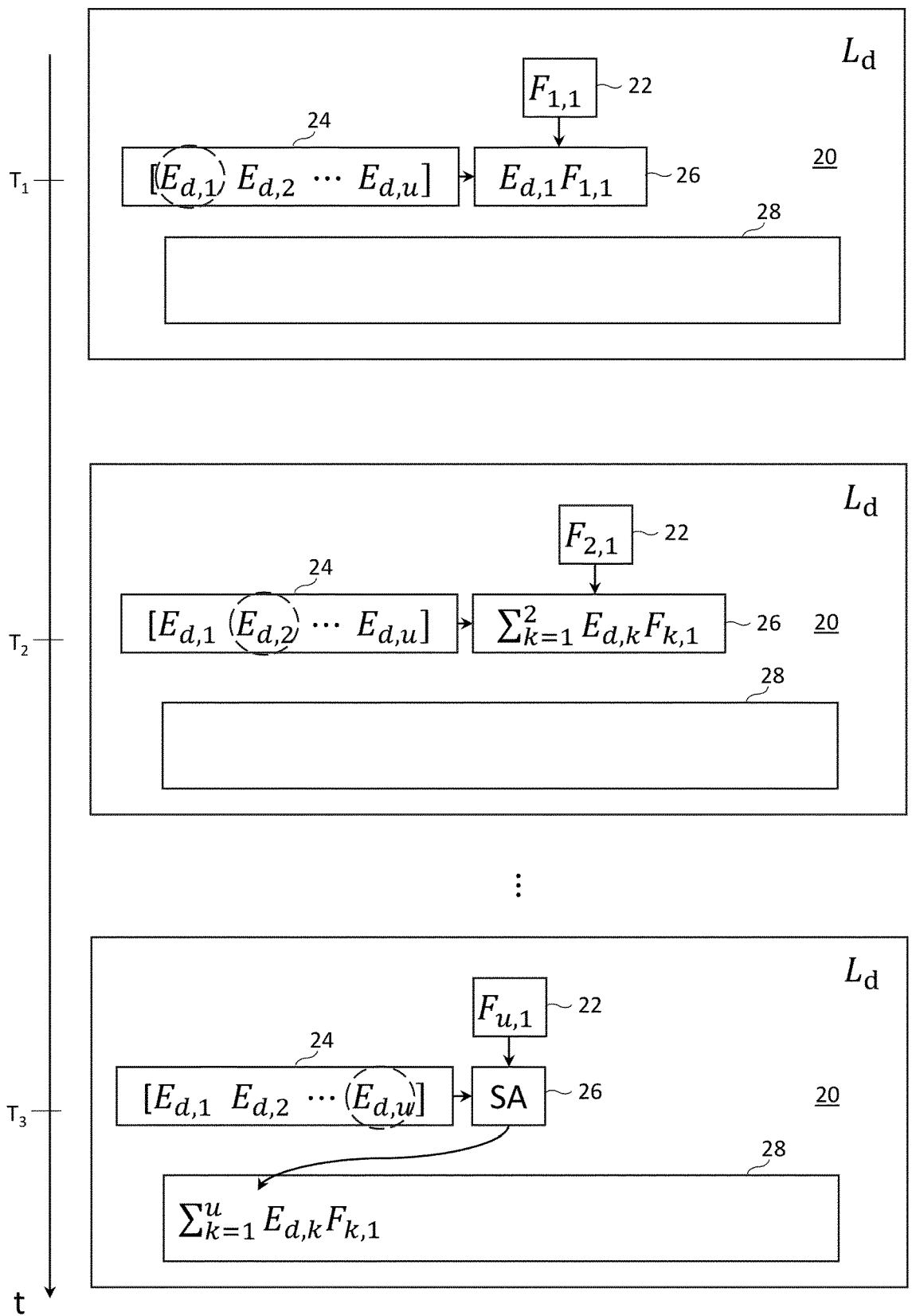
FIGS. 9A-9C depicts the multiplication of a horizontal stripe from matrix A with vertical stripes from matrix B that is carried out over successive time periods at one of the chiplets, utilizing the decomposition of matrix A and matrix B depicted in FIG. 8, in accordance with one embodiment of the invention.
Figure 9B:
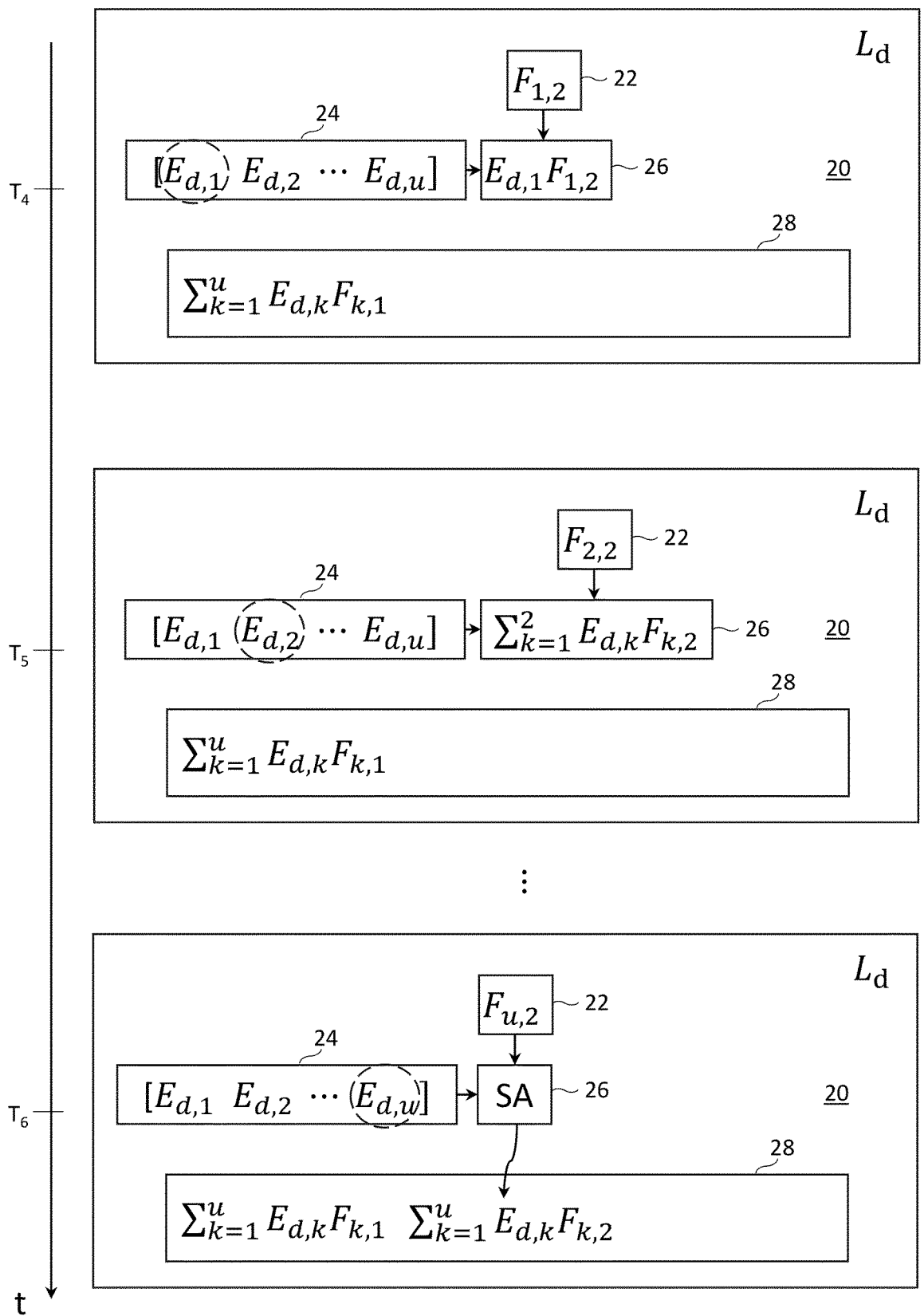
Figure 9C:
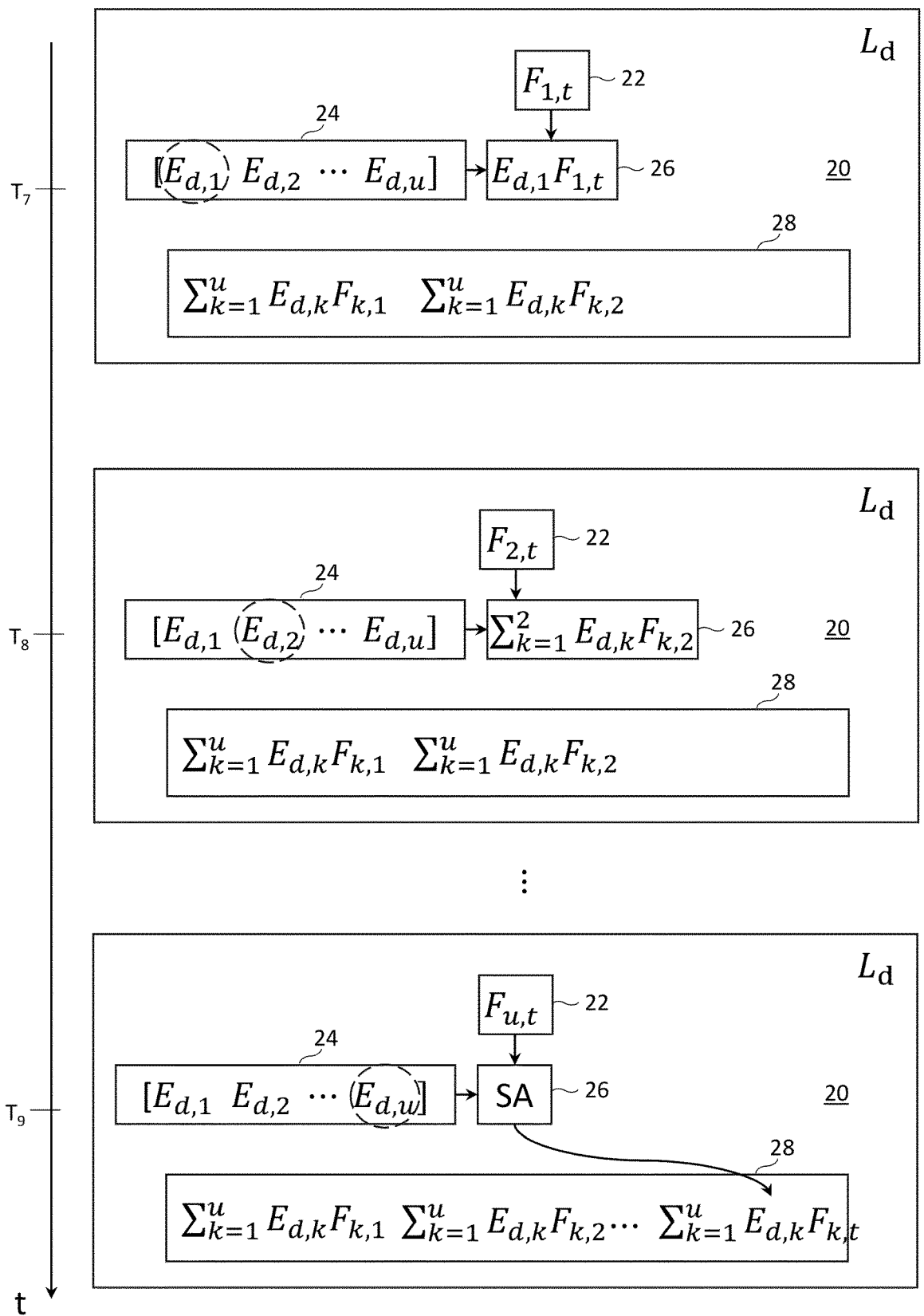

FIGS. 9A-9C depicts the multiplication of a horizontal stripe, Ad, from matrix A with vertical stripes, $B_1, \ldots, B_t$, from matrix B that is carried out over successive time periods at one of the chiplets, $L_d$, such multiplication utilizing the decomposition of matrix A and matrix B depicted in FIG. 8. Importantly, the vertical stripes from matrix B, $B_1, \ldots, B_t$, are not loaded or stored on chiplet, $L_d$, as a complete vertical stripe, but are rather loaded in the form of the sub-vertical stripes, $F_{k,j}$, for $k=1 \ldots u$, $j=1 \ldots t$, discussed in FIG. 8.

FIG. 9A depicts the processing of horizontal stripe Ad with vertical stripe $B_1$ at chiplet, $L_d$, over a plurality of time periods $T_1$, $T_2$ and $T_3$, which are not intended to indicate successive time periods. At time period $T_1$, sub-vertical stripe $F_{1,1}$ may be stored in input buffer 22, and controller 25 may be used to select the corresponding sub-horizontal stripe, $E_{d,1}$ within input buffer 24. By "corresponding," we mean the sub-horizontal stripe that is needed to compute the following sum:

$$\sum_{k=1}^{u} E_{d,k} F_{k,j}.$$

That is, the subscript k (also called the "k-index") from the sub-horizontal stripe should match the subscript k (also called the "k-index") from the sub-vertical stripe. The product $E_{d,1}F_{1,1}$ may be computed by systolic array 26 and stored in the respective accumulators of the systolic array 26. At time period $T_2$, sub-vertical stripe $F_{2,1}$ may be stored in input buffer 22, and controller 25 may be used to select the corresponding sub-horizontal stripe, $E_{d,2}$, within input buffer 24. The product $E_{d,2}F_{2,1}$ may be computed by systolic array 26, accumulated with the previously computed product $E_{d,1}F_{1,1}$, and the partial sum $E_{d,1}F_{1,1}+E_{d,2}F_{2,1}$ may be stored in the respective accumulators of the systolic array 26. At time period $T_3$, sub-vertical stripe $F_{u,1}$ may be stored in input buffer 22, and controller 25 may be used to select the corresponding sub-horizontal stripe, $E_{d,u}$ within input buffer 24. The product $E_{d,u}F_{u,1}$ may be computed by systolic array 26, accumulated with the previously computed partial sum, and the final sum $\Sigma_{k=1}^{u}E_{d,k}F_{k,1}$ may be stored in output buffer 28.

At this time, it is worth emphasizing the reduced size of input buffer 22 that is possible with only storing one or more sub-vertical stripes at the input buffer 22, in contrast to storing the entire vertical stripe. The tradeoff is the need for controller 25 to select the sub-horizontal stripe from input buffer 24 that corresponds to the sub-vertical stripe being transmitted to the systolic array 26. In one embodiment, the selection of the controller 25 is facilitated by the tagging of each sub-vertical stripe with its "k-index" (e.g., the tag embodied as metadata that is aggregated with each sub-vertical stripe). In another embodiment, the k-index is not stored as metadata, but rather is encoded by the order in which the sub-vertical stripes are received by the chiplet. For example, the sub-vertical stripes could be sent to the chiplet in an increasing order of the k-index (e.g., $F_{1,1}$, $F_{2,1}$, $F_{3,1}$, . . . ). To clarify, while only one sub-vertical stripe is depicted in input buffer 22 at any one time period in FIG. 9A, it is possible that one or more sub-vertical stripes be stored during each time period when input buffer 22 is instantiated as an input queue 22.

FIG. 9B depicts the processing of horizontal stripe $A_d$ with vertical stripe $B_2$ over a plurality of time periods $T_4$, $T_5$ and $T_6$, which are not intended to indicate successive time periods. At time period $T_4$, sub-vertical stripe $F_{1,2}$ may be stored in input buffer 22; controller 25 may be used to select the corresponding sub-horizontal stripe, $E_{d,1}$ from input buffer 24; the product $E_{d,1}F_{1,2}$ may be computed by systolic array 26 and stored in the respective accumulators of the systolic array 26. At time period $T_5$, sub-vertical stripe $F_{2,2}$ may be stored in input buffer 22, and controller 25 may be used to select the corresponding sub-horizontal stripe, $E_{d,2}$ from the input buffer 24. The product $E_{d,2}F_{2,2}$ may be computed by systolic array 26, accumulated with the previously computed product $E_{d,1}F_{1,2}$, and the partial sum $E_{d,1}F_{1,2}+E_{d,2}F_{2,2}$ may be stored in the respective accumulators of the systolic array 26. At time period $T_6$, sub-vertical stripe $F_{u,2}$ may be stored in input buffer 22, and controller 25 may be used to select the corresponding sub-horizontal stripe, $E_{d,u}$. The product $E_{d,u}F_{u,2}$ may be computed by systolic array 26, accumulated with the previously computed partial sum, and the final sum $$\sum_{k=1}^{u} E_{d,k} F_{k,2}$$

may be stored in output buffer 28.

FIG. 9C depicts the processing of horizontal stripe $A_d$ with vertical stripe $B_t$ over a plurality of time periods $T_7$, $T_8$ and $T_9$, which are not intended to indicate successive time periods. At time period $T_7$, sub-vertical stripe $F_{1,t}$ may be stored in input buffer 22; controller 25 may be used to select the corresponding sub-horizontal stripe, Ed, from input buffer 24; the product $E_{d,1}F_{1,t}$ may be computed by systolic array 26 and stored in the respective accumulators of the systolic array 26. At time period $T_8$, sub-vertical stripe $F_{2,t}$ may be stored in input buffer 22, and controller 25 may be used to select the corresponding sub-horizontal stripe, $E_{d,2}$ from the input buffer 24. The product $E_{d,2}F_{2,t}$ may be computed by systolic array 26, accumulated with the previously computed product $E_{d,1}F_{1,t}$, and the partial sum $E_{d,1}F_{1,t}+E_{d,2}F_{2,t}$ may be stored in the respective accumulators of the systolic array 26. At time period $T_9$, sub-vertical stripe $F_{u,t}$ may be stored in input buffer 22, and controller 25 may be used to select the corresponding sub-horizontal stripe, $E_{d,u}$. The product $E_{d,u}F_{u,t}$ may be computed by systolic array 26, accumulated with the previously computed partial sum, and the final sum $$\sum_{k=1}^{u} E_{d,k} F_{k,t}$$

may be stored in output buffer 28.

After all sub-vertical stripes $F_{k,j}$, for k=1 . . . u, j=1 . . . t have been processed by chiplet, $L_d$, the output buffer 28 stores one output horizontal stripe $C_d=[A_dB_1 \ldots A_dB_t]$. If not already apparent, during the processing of output horizontal stripe $C_d$, the input horizontal stripe $A_d$ is stored on input buffer 24 in a stationary manner (i.e., it is not updated). Based on the description of FIGS. 9A-9C, it is expected that the reader will be able to generalize the described process to the alternative setup in which vertical stripe $B_d$ is stored on the chiplet, $L_d$, in a stationary manner, and respective sub-horizontal stripes are processed by the chiplet, $L_d$, one by one in order to compute one output vertical stripe $$\gamma_d = \begin{bmatrix} A_1 B_d \\ \vdots \\ A_s B_d \end{bmatrix}.$$

Figure 11A:
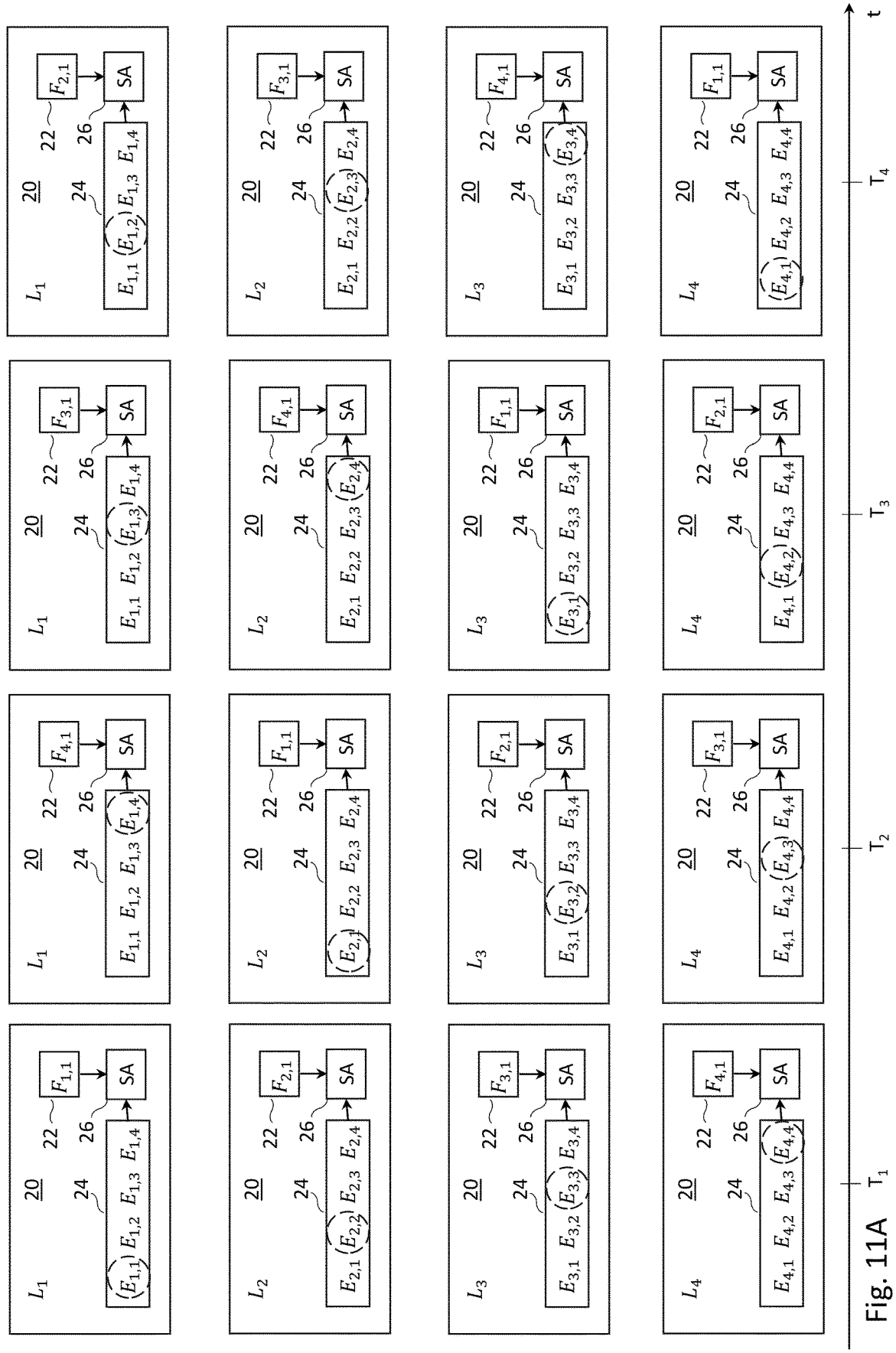
FIGS. 11A-11B depicts the multiplication of matrix A and matrix B from FIG. 10 at a plurality of chiplets over a plurality of time periods, in accordance with one embodiment of the invention.
Figure 11B:
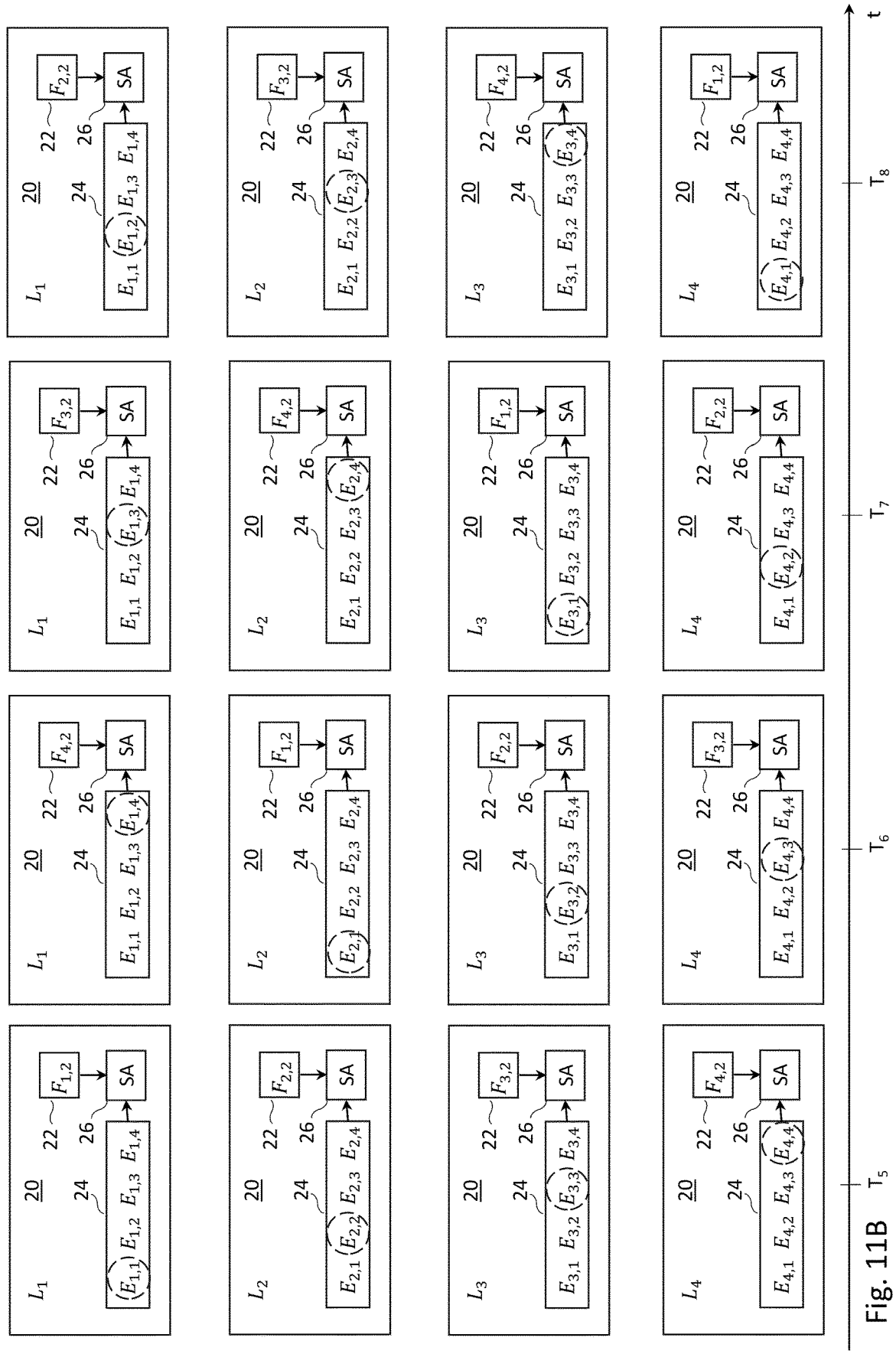

While FIGS. 9A-9C depicted the processing at one chiplet, $L_d$, for completeness, FIGS. 10 and 11A-11B provides some additional context of the processing (based on the decomposition explained in FIG. 8) across all chiplets in a simplified system with only four chiplets. FIG. 10 depicts an example in which matrix A includes four horizontal stripes, $A_1, \ldots, A_4$ each partitioned into four sub-horizontal stripes, and matrix B includes two vertical stripes, $B_1$ and $B_2$, each partitioned into four sub-vertical stripes.

FIGS. 11A-11B depicts the multiplication of matrix A and matrix B from FIG. 10 at a plurality of chiplets over a plurality of time periods. For ease of explanation, matrix A has four horizontal stripes, which matches the number of chiplets. In such case, one horizontal stripe can be stored on each of the chiplets at or prior to time period $T_1$. Specifically, horizontal stripe $A_1=[E_{1,1}\ E_{1,2}\ E_{1,3}\ E_{1,4}]$ may be stored on chiplet, $L_1$ horizontal stripe $A_2=[E_{2,1}\ E_{2,2}\ E_{2,3}\ E_{2,4}]$ may be stored on chiplet, $L_2$ horizontal stripe $A_3=[E_{3,1}\ E_{3,2}\ E_{3,3}\ E_{3,4}]$ may be stored on chiplet, $L_3$ horizontal stripe $A_4=[E_{4,1}\ E_{4,2}\ E_{4,3}\ E_{4,4}]$ may be stored on chiplet, $L_4$.

A later example in FIGS. 21A-21C will explain how to handle the circumstance in which the number of horizontal stripes exceeds the number of chiplets. The circumstance in which the number of horizontal stripes is less than the number of chiplets is easy to handle, since chiplets can always just be unused (e.g., left idle). For further ease of explanation, each of the vertical stripes of matrix B has four sub-vertical stripes, which also matches the number of chiplets. Later examples will explore the circumstances in which the number of sub-vertical stripes is less than or greater than the number of chiplets.

As a high level overview of the processing of the sub-vertical stripes in FIGS. 11A-11B, the processing involves distributing the sub-vertical stripes corresponding to one vertical stripe among the chiplets, passing the sub-vertical stripes from one chiplet to another until all chiplets have received a copy of each of the sub-vertical stripes and repeating the process with the sub-vertical stripes from the next vertical stripe. FIG. 11A depicts the processing of the four sub-vertical stripes $F_{1,1}, F_{2,1}, F_{3,1}, F_{4,1}$ corresponding to vertical stripe $B_1$, and FIG. 11B depicts the processing of the four sub-vertical stripes $F_{1,2}, F_{2,2}, F_{3,2}, F_{4,2}$ corresponding to vertical stripe $B_2$.

Now, to dive into the details of FIGS. 11A-11B, vertical stripe $B_1$ may be processed in time period $T_1$. Specifically in time period $T_1$:

sub-vertical stripe $F_{1,1}$ may be stored on chiplet $L_1$
sub-vertical stripe $F_{2,1}$ may be stored on chiplet $L_2$
sub-vertical stripe $F_{3,1}$ may be stored on chiplet $L_3$
sub-vertical stripe $F_{4,1}$ may be stored on chiplet $L_4$
Also in time period $T_1$,
systolic array 26 of chiplet $L_1$ may compute $E_{1,1}F_{1,1}$
systolic array 26 of chiplet $L_2$ may compute $E_{2,2}F_{2,1}$
systolic array 26 of chiplet $L_3$ may compute $E_{3,3}F_{3,1}$
systolic array 26 of chiplet $L_4$ may compute $E_{4,4}F_{4,1}$ The partial sums (i.e., accumulations) performed by systolic array 26 in time period $T_1$ have not been shown in the output buffer in FIG. 11A for the sake of conciseness, as these details were previously shown in detail in FIGS. 9A-9C.

In time period $T_2$, the further processing of vertical stripe $B_1$ may include:
storing sub-vertical stripe $F_{4,1}$ on chiplet $L_1$
storing sub-vertical stripe $F_{1,1}$ on chiplet $L_2$
storing sub-vertical stripe $F_{2,1}$ on chiplet $L_3$
storing sub-vertical stripe $F_{3,1}$ on chiplet $L_4$
computing $E_{1,4}F_{4,1}$ with systolic array 26 of chiplet $L_1$
computing $E_{2,1}F_{1,1}$ with systolic array 26 of chiplet $L_2$
computing $E_{3,2}F_{2,1}$ with systolic array 26 of chiplet $L_3$
computing $E_{4,3}F_{3,1}$ with systolic array 26 of chiplet $L_4$ In time period $T_3$, the further processing of vertical stripe $B_1$ may include:
storing sub-vertical stripe $F_{3,1}$ on chiplet $L_1$
storing sub-vertical stripe $F_{4,1}$ on chiplet $L_2$
storing sub-vertical stripe $F_{1,1}$ on chiplet $L_3$
storing sub-vertical stripe $F_{2,1}$ on chiplet $L_4$
computing $E_{1,3}F_{3,1}$ with systolic array 26 of chiplet $L_1$
computing $E_{2,4}F_{4,1}$ with systolic array 26 of chiplet $L_2$
computing $E_{3,1}F_{1,1}$ with systolic array 26 of chiplet $L_3$
computing $E_{4,2}F_{2,1}$ with systolic array 26 of chiplet $L_4$ In time period $T_4$, the further processing of vertical stripe $B_1$ may include:
storing sub-vertical stripe $F_{2,1}$ on chiplet $L_1$
storing sub-vertical stripe $F_{3,1}$ on chiplet $L_2$
storing sub-vertical stripe $F_{4,1}$ on chiplet $L_3$
storing sub-vertical stripe $F_{1,1}$ on chiplet $L_4$
computing $E_{1,2}F_{2,1}$ with systolic array 26 of chiplet $L_1$
computing $E_{2,3}F_{3,1}$ with systolic array 26 of chiplet $L_2$
computing $E_{3,4}F_{4,1}$ with systolic array 26 of chiplet $L_3$
computing $E_{4,1}F_{1,1}$ with systolic array 26 of chiplet $L_4$ In time period $T_5$, the processing of vertical stripe $B_2$ may include:
storing sub-vertical stripe $F_{1,2}$ on chiplet $L_1$
storing sub-vertical stripe $F_{2,2}$ on chiplet $L_2$
storing sub-vertical stripe $F_{3,2}$ on chiplet $L_3$
storing sub-vertical stripe $F_{4,2}$ on chiplet $L_4$
computing $E_{1,2}F_{1,1}$ with systolic array 26 of chiplet $L_1$
computing $E_{2,2}F_{2,2}$ with systolic array 26 of chiplet $L_2$
computing $E_{3,2}F_{3,3}$ with systolic array 26 of chiplet $L_3$
computing $E_{4,2}F_{4,4}$ with systolic array 26 of chiplet $L_4$ In time period $T_6$, the further processing of vertical stripe $B_2$ may include:
storing sub-vertical stripe $F_{4,2}$ on chiplet $L_1$
storing sub-vertical stripe $F_{1,2}$ on chiplet $L_2$
storing sub-vertical stripe $F_{2,2}$ on chiplet $L_3$
storing sub-vertical stripe $F_{3,2}$ on chiplet $L_4$
computing $E_{1,4}F_{4,2}$ with systolic array 26 of chiplet $L_1$
computing $E_{2,1}F_{1,2}$ with systolic array 26 of chiplet $L_2$
computing $E_{3,2}F_{2,2}$ with systolic array 26 of chiplet $L_3$
computing $E_{4,3}F_{3,2}$ with systolic array 26 of chiplet $L_4$ In time period $T_7$, the further processing of vertical stripe $B_2$ may include:
storing sub-vertical stripe $F_{3,2}$ on chiplet $L_1$
storing sub-vertical stripe $F_{4,2}$ on chiplet $L_2$
storing sub-vertical stripe $F_{1,2}$ on chiplet $L_3$
storing sub-vertical stripe $F_{2,2}$ on chiplet $L_4$
computing $E_{1,3}F_{3,2}$ with systolic array 26 of chiplet $L_1$
computing $E_{2,4}F_{4,2}$ with systolic array 26 of chiplet $L_2$
computing $E_{3,1}F_{1,2}$ with systolic array 26 of chiplet $L_3$
computing $E_{4,2}F_{2,2}$ with systolic array 26 of chiplet $L_4$ Finally, in time period $T_5$, the further processing of vertical stripe $B_2$ may include:
storing sub-vertical stripe $F_{2,2}$ on chiplet $L_1$
storing sub-vertical stripe $F_{3,2}$ on chiplet $L_2$
storing sub-vertical stripe $F_{4,2}$ on chiplet $L_3$
storing sub-vertical stripe $F_{1,2}$ on chiplet $L_4$
computing $E_{1,2}F_{2,2}$ with systolic array 26 of chiplet $L_1$
computing $E_{2,3}F_{3,2}$ with systolic array 26 of chiplet $L_2$
computing $E_{3,4}F_{4,2}$ with systolic array 26 of chiplet $L_3$
computing $E_4,F_{1,2}$ with systolic array 26 of chiplet $L_4$ In the later figures which are higher level and more graphical, it will be easier to appreciate how the sub-vertical stripes can be passed from one chiplet to another.

Figure 12A:
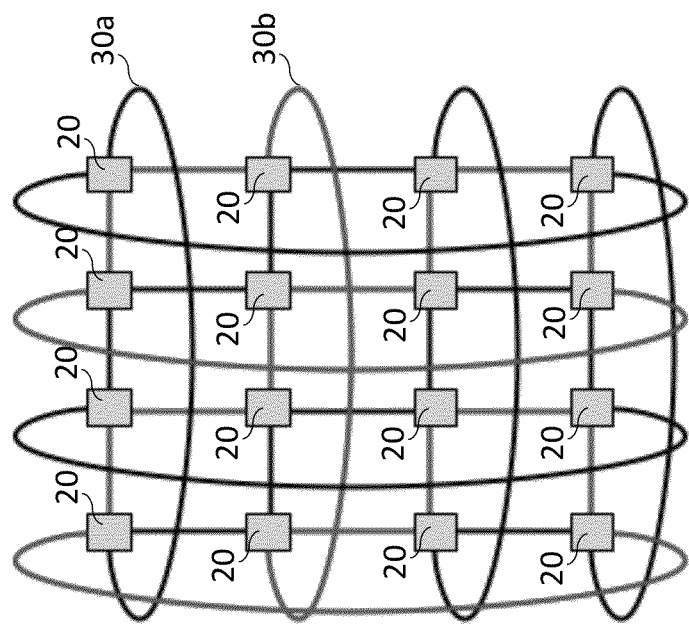
FIG. 12A depicts an interconnection between a plurality of chiplets in the form of two closed paths, in accordance with one embodiment of the invention.
Figure 12C:
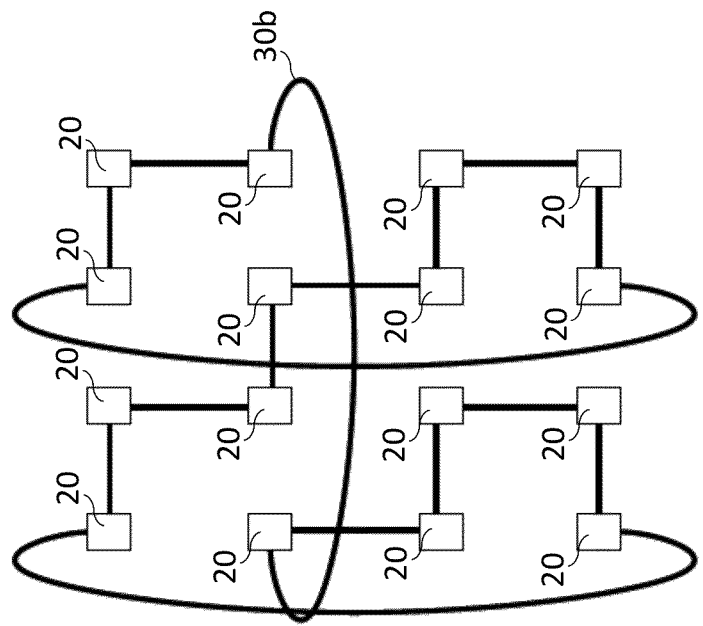
FIGS. 12B and 12C each depicts one of the closed paths depicted in FIG. 12A for clarity, in accordance with one embodiment of the invention.
Figure 12B:
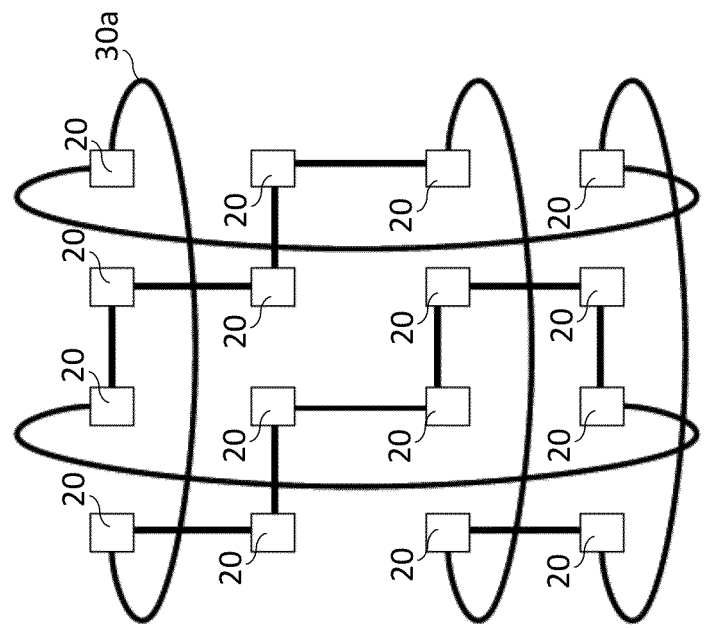

FIG. 12A depicts an interconnection between a plurality of chiplets 20 in the form of two closed paths 30a, 30b. For clarity of presentation, FIG. 12B depicts only closed path 30a and FIG. 12C depicts only closed path 30b. It is noted that there are no shared "edges" between closed path 30a and 30b, in which an edge refers to a segment of the respective paths which interconnects two chiplets. Each of closed paths 30a and 30b additionally has the property that the path traverses each of the chiplets 20 at most one time. As a counter example, a path in the form of the number "8"

or the infinity symbol "o" would not possess this property in that the node (or chiplet) at the center of the path would be traversed by the path two times. While each of closed paths 30a, 30b has the property that the path traverses each of the chiplets 20 at most one time, it is noted for completeness that this property is not a requirement for all paths.

As will become more apparent in the later figures, vertical stripes (or horizontal stripes in the case that vertical stripes are stationary), sub-vertical stripes (or sub-horizontal stripes in the case that the vertical stripes are stationary) may be passed from one chiplet to another chiplet along a closed path. For ease of discussion, vertical stripes, horizontal stripes, sub-vertical stripes and sub-horizontal stripes may generally be referred to as "striped data."

In one embodiment, the striped data may be passed in one or more of a "forward" or "backwards" direction along a closed path (or more generally, a first direction and a second direction opposite to the first direction). The analogy of a freeway for cars may be appropriate in that cars may drive northbound and southbound on the freeway (or eastbound and westbound on a freeway). To be explicit, the freeway may be likened to the closed path and the cars may be likened to the striped data.

Figure 13:
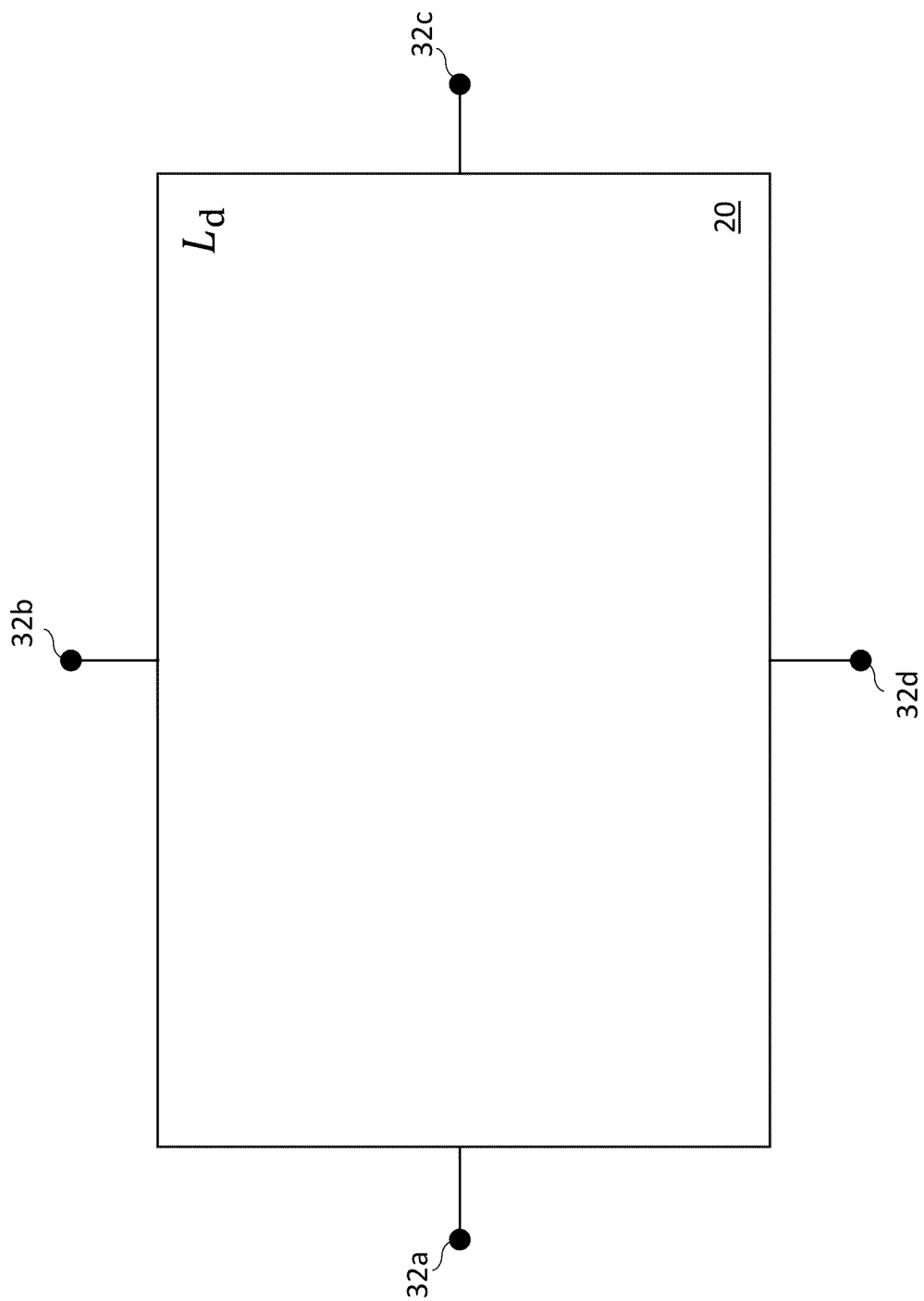
FIG. 13 depicts a chiplet with four ports, each configured to receive and transmit striped data, in accordance with one embodiment of the invention.

FIG. 13 depicts a chiplet with four ports, 32a, 32b, 32c, 32d, each configured to receive and transmit striped data. One pair of the ports may be connected to closed path 30a and the other pair of ports may be connected to closed path 30b. For instance, ports 32b and 32d may be connected to closed path 30a, and ports 32a and 32c may be connected to closed path 30b. To extend the analogy of the freeway, "northbound" striped data may flow into port 32d and out of port 32b; "southbound" striped data may flow into port 32b and out of port 32d; "eastbound" striped data may flow into port 32a and out of port 32c; and "westbound" striped data may flow into port 32c and out of port 32a. In another embodiment, each port may be dedicated to "traffic" of one direction. For instance, "northbound" striped data may flow into and out of port 32a; "southbound" striped data may flow into and out of port 32b; "eastbound" striped data may flow into and out of port 32c; and "westbound" striped data may flow into and out of port 32d. In yet another embodiment, stripe data may flow into one of the ports and flow out of any of the ports. For example, stripe data may flow into port 32a and flow out of port 32b.

As a specific example, vertical stripe $B_1$ may be received by port 32a of chiplet $L_d$ (from e.g., chiplet $L_{d-1}$), and then stored in input buffer 22. When vertical stripe $B_1$ is transmitted form input buffer 22 to systolic array 26, vertical stripe $B_1$ may also be transmitted from input buffer 22 through port 32d of chiplet $L_d$ to chiplet $L_{d+1}$. As another specific example, sub-vertical stripe $F_{1,1}$ may be received by port 32a of chiplet $L_d$ (from e.g., chiplet $L_{d-1}$), and then stored in input buffer 22. When sub-vertical stripe $F_{1,1}$ is transmitted form input buffer 22 to systolic array 26, sub-vertical stripe $F_{1,1}$ may also be transmitted from input buffer 22 through port 32d of chiplet $L_d$ to chiplet $L_{d+1}$. To clarify, ports 32a, 32b, 32c and 32d may be dedicated for the communication of striped data. For completeness, it is noted that there may be other ports (not depicted in FIG. 13) that are configured for communicating the data from output buffer 28 $L_d$ to client device 27 and for controller 25 to communicate with the chiplet $L_d$.

Figure 14A:
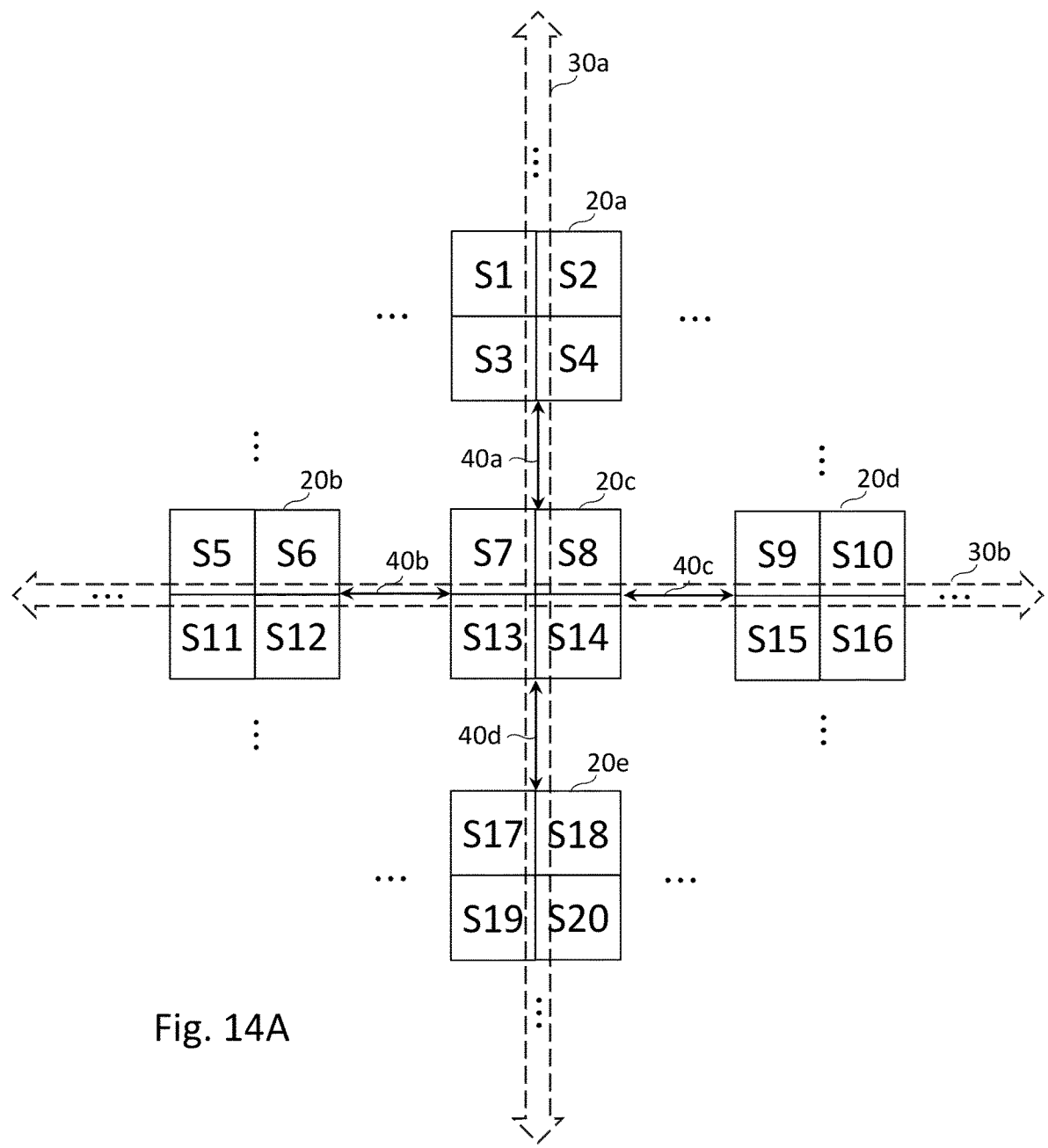
FIG. 14A depicts interconnections between a plurality of chiplets, in accordance with one embodiment of the invention.

FIG. 14A depicts interconnections between a plurality of chiplets 20a, 20b, 20c, 20d, and 20e. Chiplets 20a and 20c may be connected via signal path 40a; chiplets 20b and 20c may be connected via signal path 40b; chiplets 20c and 20d may be connected via signal path 40c; and chiplets 20c and 20e may be connected via signal path 40d. Signal paths 40a and 40d may be part of closed path 30a and signal paths 40b and 40c may be part of closed path 30b. The data stripes are numbered from S2-S24 for ease of discussion. Initially in the time period depicted in FIG. 14A, data stripes S1-S4 are stored at chiplet 20a, data stripes S5, S6, S11 and S12 are stored at chiplet 20b, data stripes S7, S8, S13 and S14 are stored at chiplet 20c, data stripes S9, S10, S15 and S16 are stored at chiplet 20d, and data stripes S17-S20 are stored at chiplet 20e. The ellipses indicate that other chiplets may be present, and have been omitted for ease of discussion. For completeness, it is noted that only "straight segments" of closed paths 30a and 30b were illustrated in FIG. 14A. In another embodiment (not depicted), signal paths 40a and 40b could be part of closed path 30a, and signal paths 40c and 40d could be part of closed path 30b.

Figure 14B:
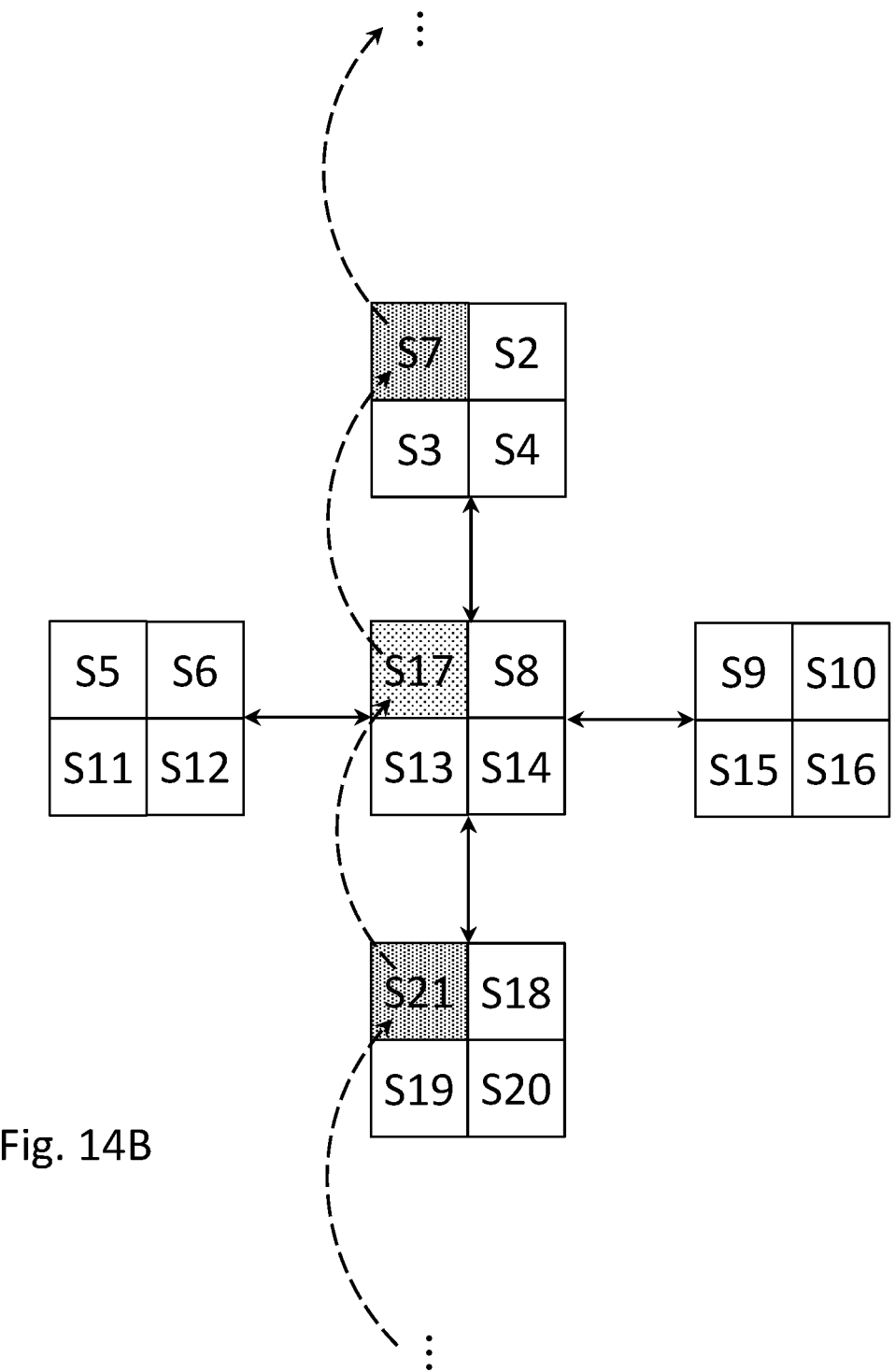
FIGS. 14B-14E depicts data stripes being passed between pairs of the chiplets, in accordance with one embodiment of the invention.

FIGS. 14B-14E depict striped data being passed between pairs of the chiplets 20a-20e. In FIG. 14B, striped data are transmitted along closed path 30a in the "north" direction. Specifically, striped data S7 is transmitted from chiplet 20c to 20a, striped data S17 is transmitted from chiplet 20e to 20c, and striped data S21 is transmitted from a chiplet (not depicted) to chiplet 20e.

Figure 14C:
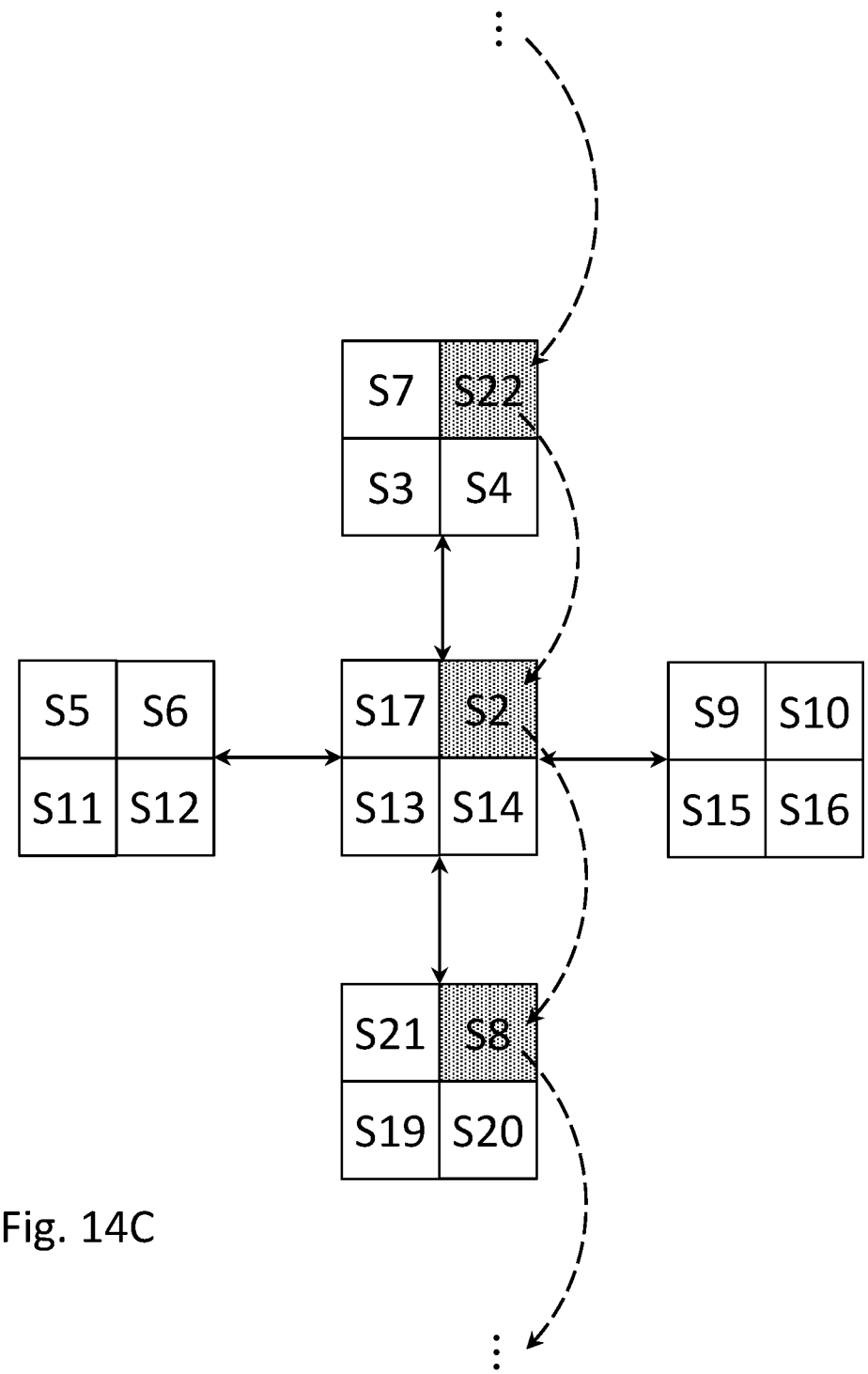

In FIG. 14C, striped data are transmitted along closed path 30a in the "south" direction. Specifically, striped data S8 is transmitted from chiplet 20c to 20e, striped data S2 is transmitted from chiplet 20a to 20c, and striped data S22 is transmitted from a chiplet (not depicted) to chiplet 20a.

Figure 14D:
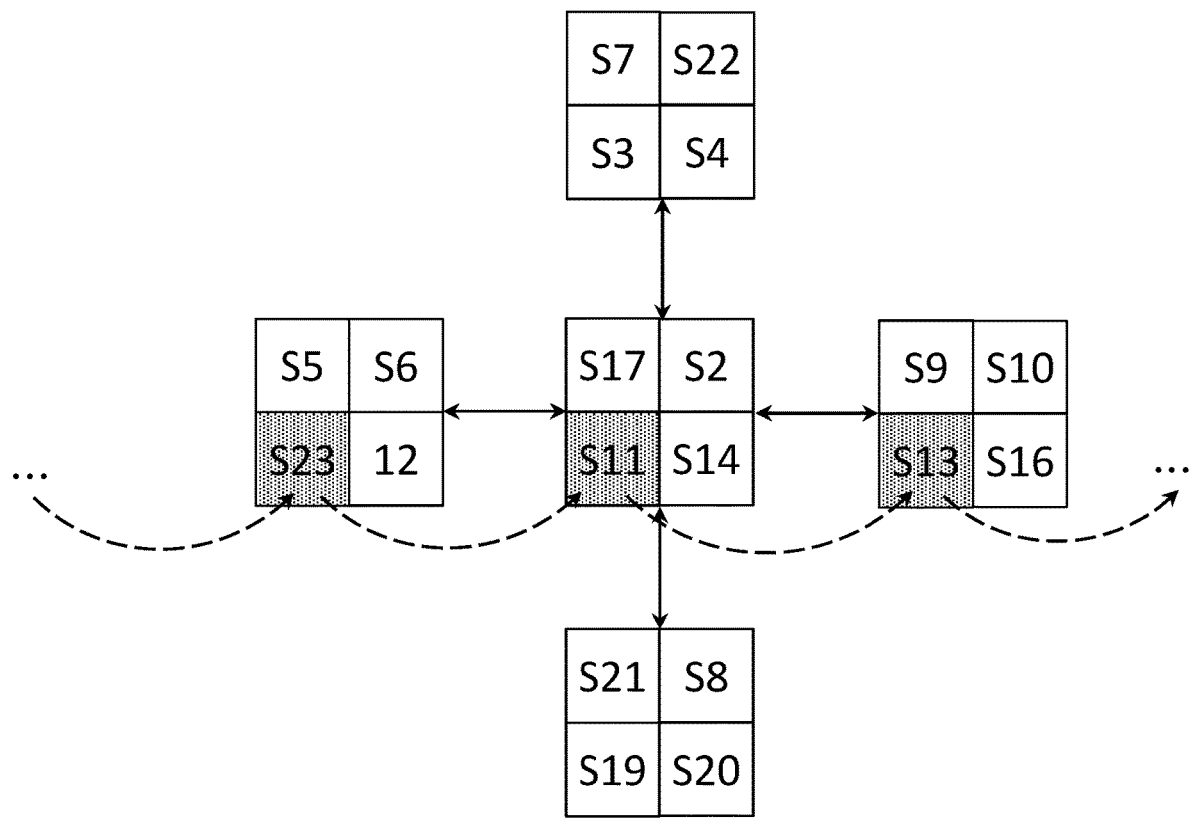

In FIG. 14D, striped data are transmitted along closed path 30b in the "east" direction. Specifically, striped data S13 is transmitted from chiplet 20c to 20d, striped data S11 is transmitted from chiplet 20b to 20c, and striped data S23 is transmitted from a chiplet (not depicted) to chiplet 20b.

Figure 14E:
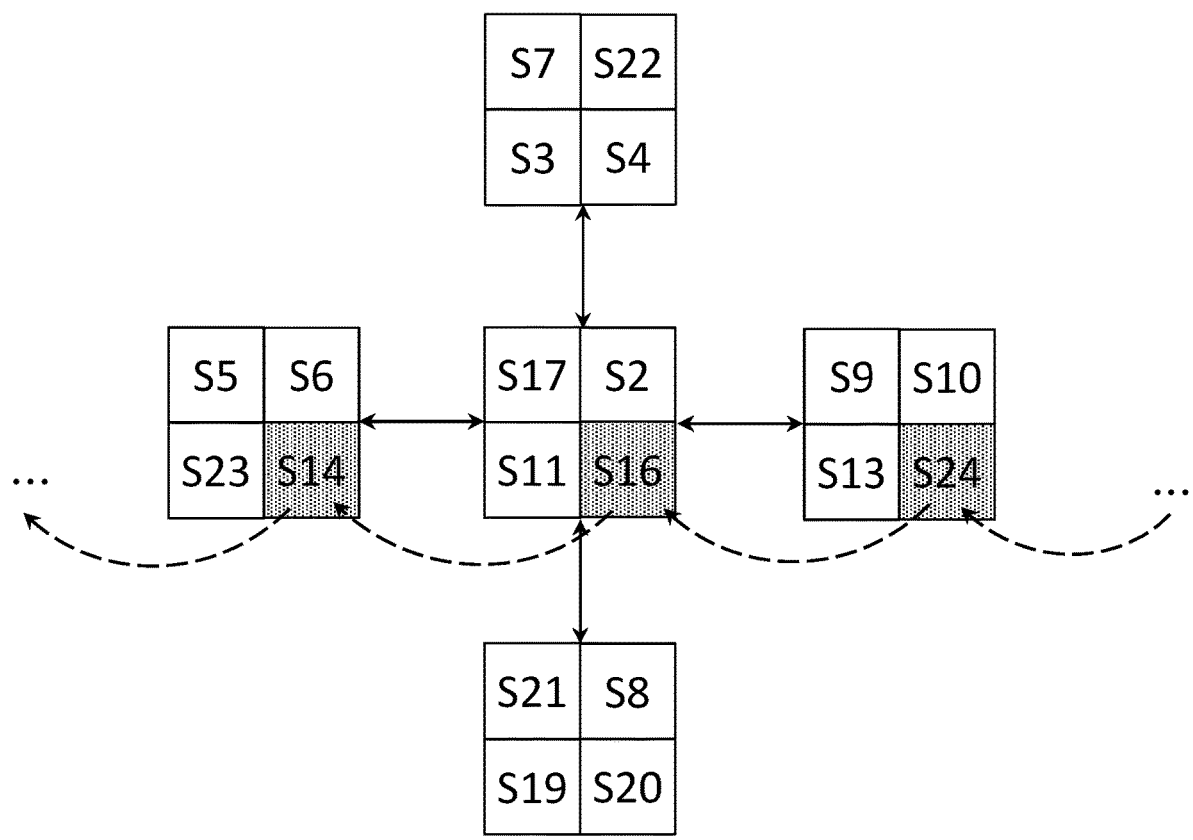

In FIG. 14E, striped data are transmitted along closed path 30b in the "west" direction. Specifically, striped data S14 is transmitted from chiplet 20c to 20b, striped data S16 is transmitted from chiplet 20d to 20c, and striped data S24 is transmitted from a chiplet (not depicted) to chiplet 20d.

Figure 15A:
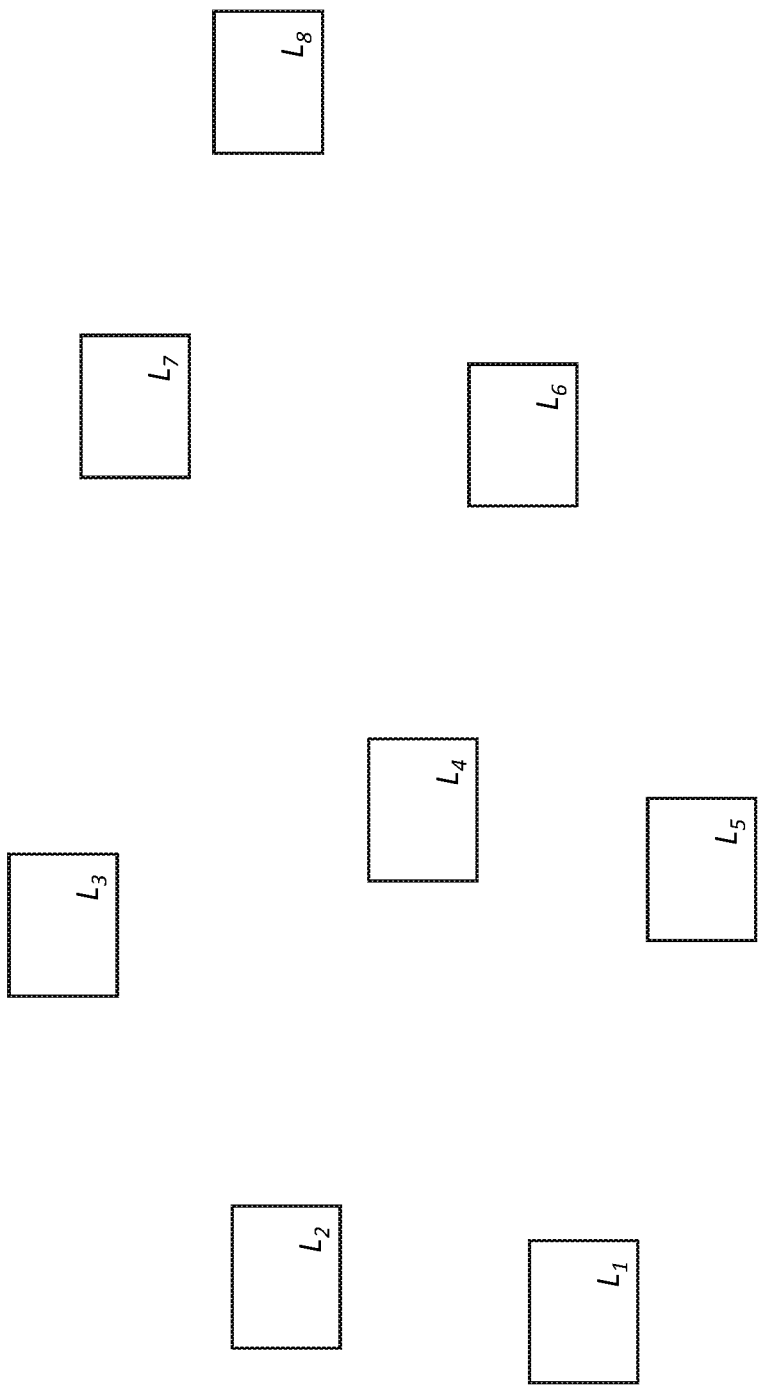
FIG. 15A depicts a plurality of chiplets, in accordance with one embodiment of the invention.
Figure 15B:
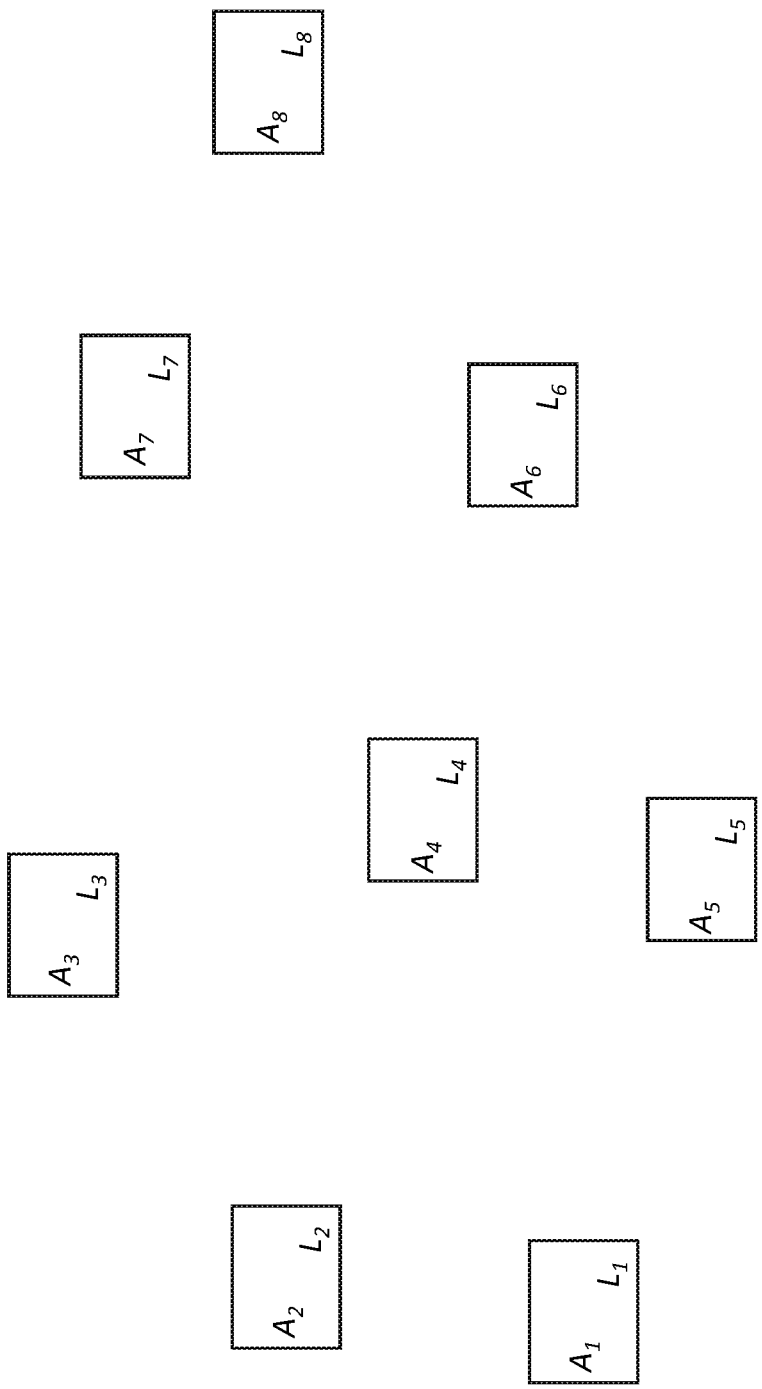
FIG. 15B depicts a plurality of horizontal stripes that have been loaded into the plurality of chiplets, in accordance with one embodiment of the invention.

In the remaining figures, the passing of striped data between respective pairs of chiplets is explained in greater detail. FIG. 15A depicts a plurality of chiplets, $L_1, \ldots, L_8$. FIG. 15B depicts a plurality of horizontal stripes, $A_1, \ldots, A_8$ that have been loaded into the plurality of chiplets. As should be apparent, matrix A may be formed as a column of the horizontal stripes:

$$A = \begin{bmatrix} A_1 \\ \vdots \\ A_8 \end{bmatrix}$$

Specifically, horizontal stripe $A_i$ may be stored at chiplet $L_i$, for i=1 . . . 8. As should be understood, the number of chiplets (i.e., 8) is merely an example, and other number of chiplets are possible. FIG. 15B is analogous to previously discussed FIG. 5, except that it is depicted at a higher level. Thus input buffers 22, 24, systolic array 26 and output buffer 28 depicted in FIG. 5 are not shown explicitly in FIG. 15A, but the reader should understand that in a more detailed representation of the chiplets, these components may be present.

Figure 16A:
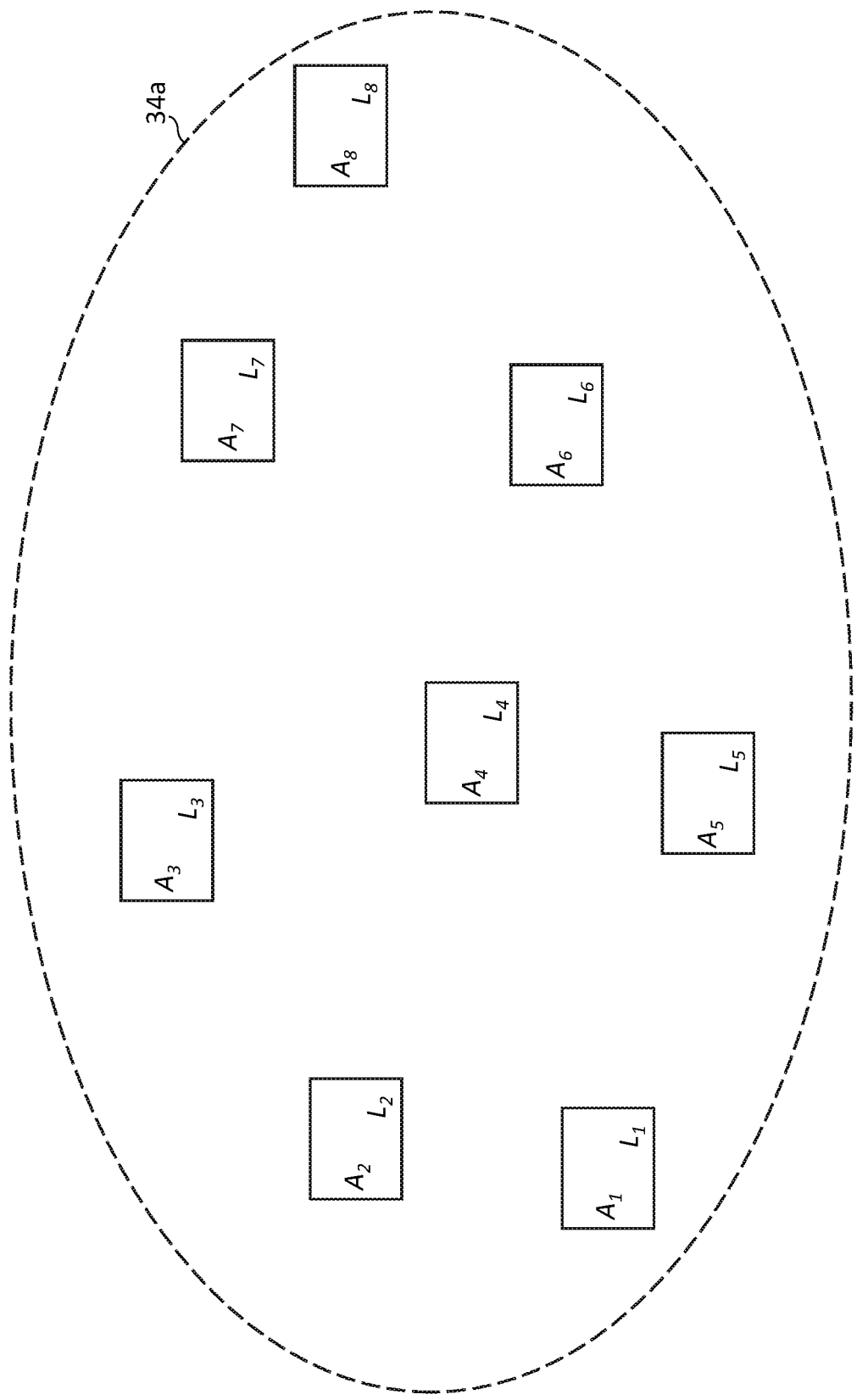
FIG. 16A depicts the plurality of chiplets being logically grouped into one chiplet group, in accordance with one embodiment of the invention.
Figure 16B:
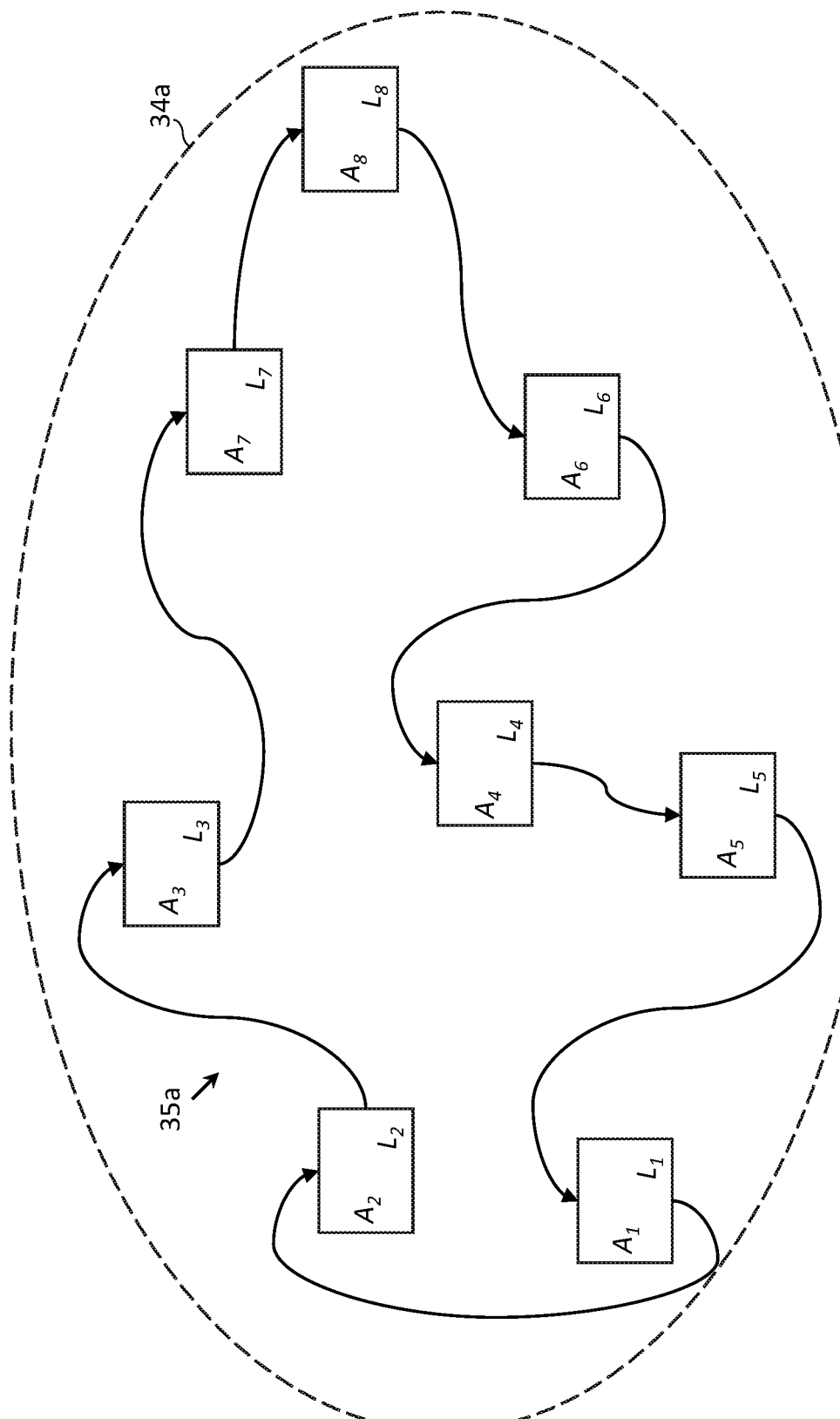
FIG. 16B depicts the plurality of chiplets being interconnected via a closed path, in accordance with one embodiment of the invention.

FIG. 16A depicts the plurality of chiplets being logically grouped into one chiplet group 34a (i.e., a "chiplet group" being a concise way to refer to a group of chiplets). FIG. 16B depicts the plurality of chiplets $L_1, \ldots, L_8$ being interconnected via a closed path 35a which, in the particular example, is directional (i.e., in the clockwise direction). For ease of discussion and illustration, closed path 35a may have only one direction, but in practice closed path 35a may be bi-directional (i.e., striped data may flow in the clockwise and counter clockwise directions).

Figure 16C:
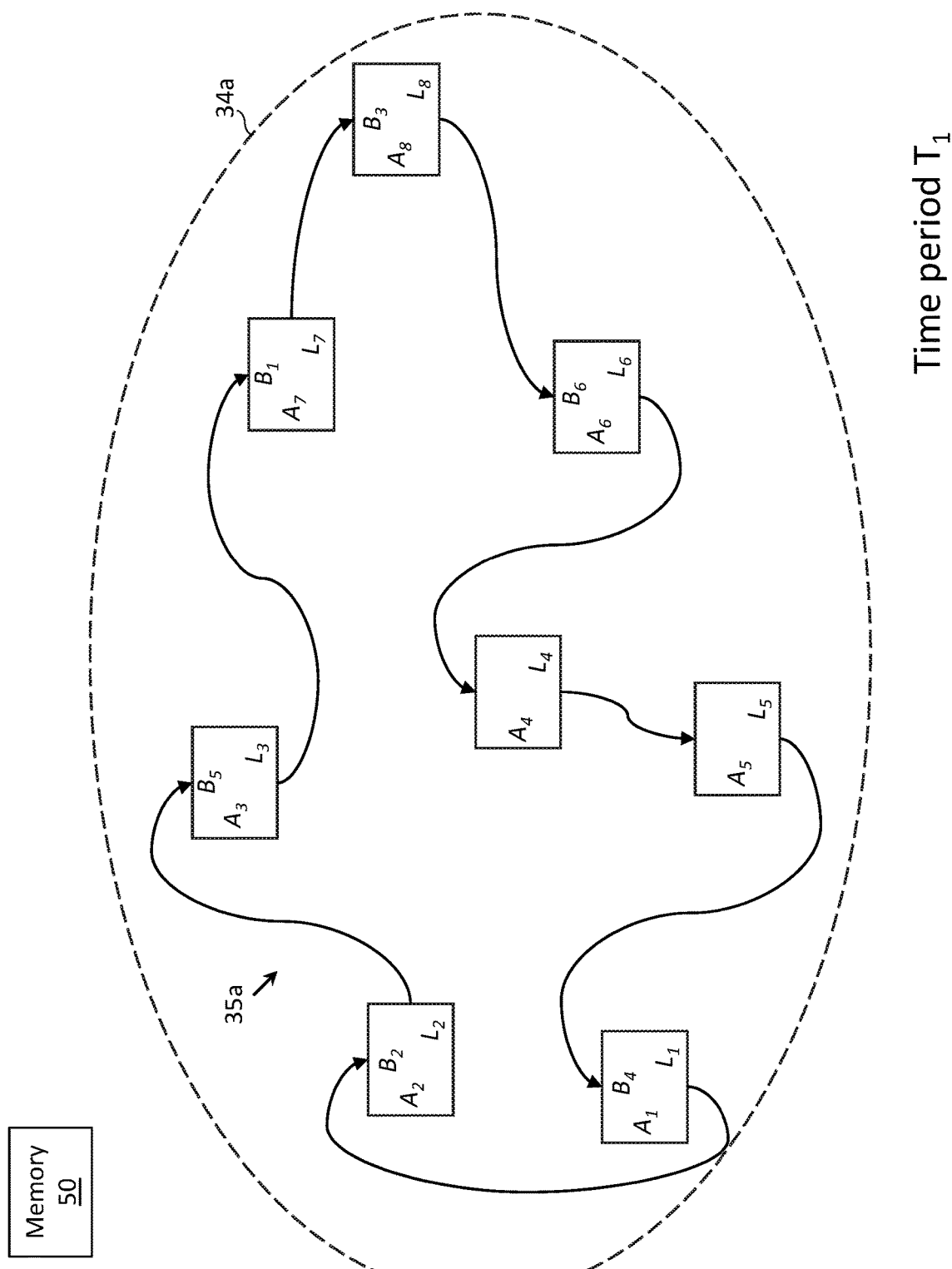
FIG. 16C depicts vertical stripes that have been loaded into a subset of the chiplets, in accordance with one embodiment of the invention.

FIG. 16C depicts vertical stripes, $B_1, \ldots, B_6$ that have been loaded into chiplets, $L_1, L_2, L_3, L_7, L_8, L_6$, respectively from memory 50. For example, memory 50 could be located on a computer (not depicted) that is connected to each of the chiplets via a Peripheral Component Interconnect Express (abbreviated as PCIe or PCI-e) link. As should be apparent, matrix B may be formed as a row of the vertical stripes:

$$B=[B_1 \ldots B_6]$$

In the example, since there are more chiplets than vertical stripes, some of the chiplets (e.g., $L_4, L_5$) may initially be unused. FIG. 16C is similar to FIG. 6, but there is an important distinction. In FIG. 6, the same vertical stripe is being processed during each time period (e.g., vertical stripe $B_1$ processed in time period $T_1$, vertical stripe $B_2$ processed in time period $T_2$, and so on), but in FIG. 16C, disparate vertical stripes from matrix B are being processed across the chiplets during time period $T_1$ (e.g., in the particular example all vertical stripes form matrix B are being processed across the chiplets during time period $T_1$). By "processed," we mean that the horizontal stripe resident at the chiplet is multiplied with the vertical stripe resident at the chiplet, and the resulting product is stored in the output buffer. This level of detail has been abstracted away from FIG. 16C, but the reader should understand these details from the previous discussion from FIG. 6.

Figure 16D:
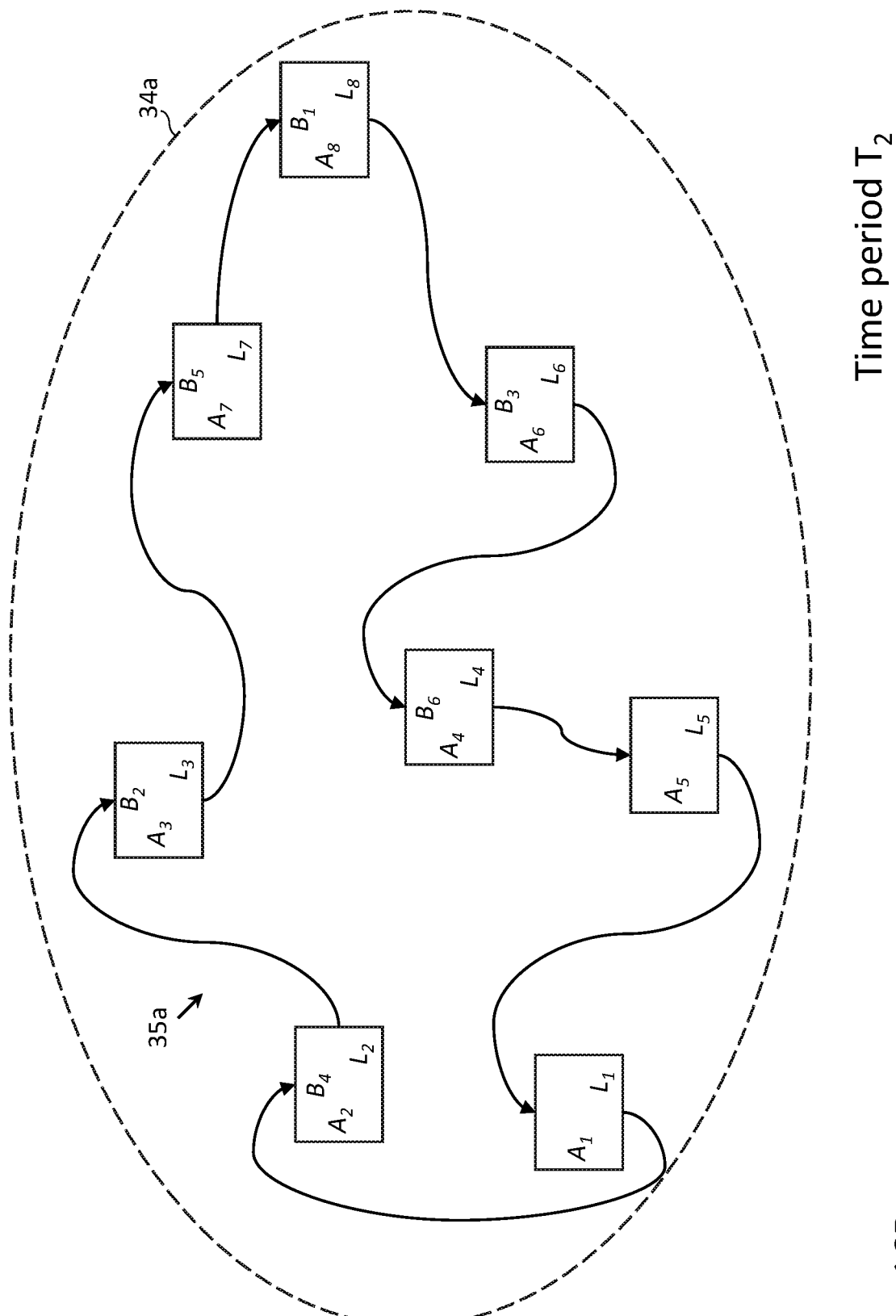
FIG. 16D depicts the vertical stripes after the vertical stripes have been passed from one chiplet to another chiplet via the closed path, in accordance with one embodiment of the invention.

FIG. 16D depicts the processing of vertical stripes during time period $T_2$ (which immediately follows time period $T_1$ in the example of FIG. 16D) after the vertical stripes have been "rotated" in the clockwise direction along closed path 35a in the intervening time between time period $T_1$ and time period $T_2$. The rotation may involve the vertical stripes being passed from one chiplet to another chiplet. In particular:
  vertical stripe $B_4$ has been passed from chiplet $L_1$ to $L_2$
  vertical stripe $B_2$ has been passed from chiplet $L_2$ to $L_3$
  vertical stripe $B_5$ has been passed from chiplet $L_3$ to $L_7$
  vertical stripe $B_1$ has been passed from chiplet $L_7$ to $L_8$
  vertical stripe $B_3$ has been passed from chiplet $L_5$ to $L_6$
  vertical stripe $B_6$ has been passed from chiplet $L_6$ to $L_4$ For completeness, it is noted that the vertical stripes need not all "advance" at the same time during the rotation of the vertical stripes. For instance, the time at which vertical stripe $B_4$ is passed from chiplet $L_1$ to $L_2$ may differ from the time at which vertical stripe $B_2$ is passed from chiplet $L_2$ to $L_3$ (i.e., these times may be independent from one another).

The remaining time periods have been omitted for conciseness, but it should be apparent that the final time period occurs when each of the chiplets has processed a copy of each of the vertical stripes of matrix B. After the processing in the final time period, horizontal stripes from matrix C can be transmitted from each of the chiplets $L_1, \ldots, L_8$ to client device 27, in order to form matrix C (or a portion of matrix C) at client device 27. As such details were previously discussed in detail in association with FIG. 7, no further discussion will be provided for the sake of conciseness.

It is noted that the order in which the vertical stripes are received at each of the chiplets does not matter so long as all vertical stripes of matrix B are received once by each of the chiplets (i.e., due to first principles of linear algebra). However, the implementation described in FIGS. 16C and 16D has an advantage over the implementation described in FIG. 6 in that vertical stripes can be passed through a closed path in order to carry out the multiplication of matrix A with matrix B. Accordingly, the implementation described in FIGS. 16C and 16D is preferred over the implementation described in FIG. 6.

At this point, it is important to clarify the two types of "storing" that take place on the chiplet. Either striped data can be stored on the respective chiplets from memory 50 (as depicted in FIG. 16C) or the striped data can be stored on the respective chiplets from "neighboring chiplets" via communication carried out using the closed path 35a. In the implementation of FIG. 6, the vertical stripes must be loaded onto the chiplets from memory 50 every time period (assuming that the respective input buffers are sized to store only one vertical stripe at a time). In contrast, in the implementation of FIG. 16C and FIG. 16D, the vertical stripes only need to be loaded onto the chiplets at the outset (i.e., in time period $T_1$), and then in the following time periods, the vertical stripes can be communicated from one chiplet to another via the closed path 35a.

Figure 17A:
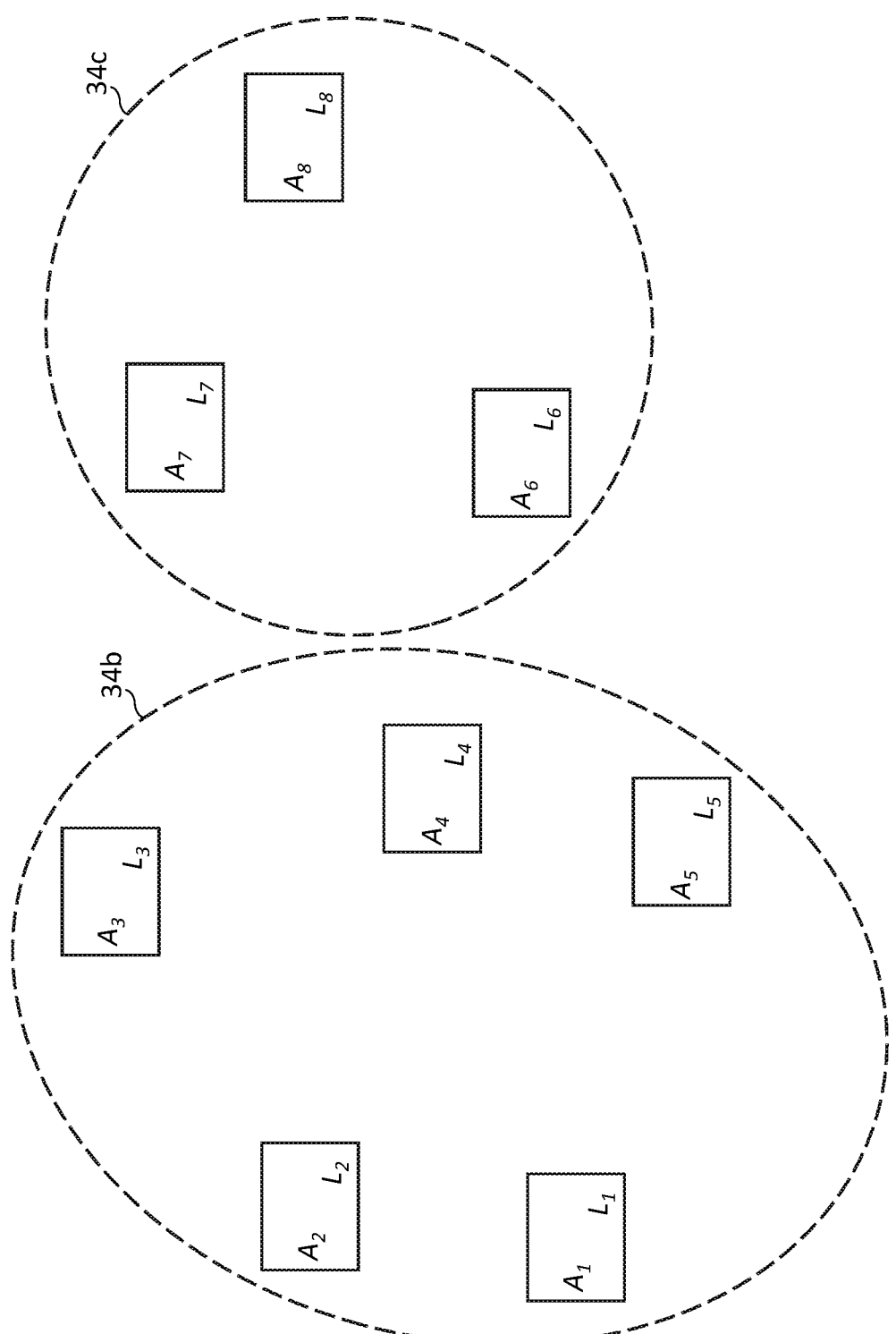
FIG. 17A depicts the plurality of chiplets being logically grouped into two chiplet groups which form a partition of the chiplets, in accordance with one embodiment of the invention.

FIG. 17A depicts an example in which the plurality of chiplets, $L_1, \ldots, L_8$, are logically grouped into two chiplet groups 34b, 34c which form a partition of the chiplets. Specifically, chiplets $L_1, \ldots, L_5$ belong to chiplet group 34b and chiplets $L_6, L_7, L_8$ belong to chiplet group 34c.

Figure 17B:
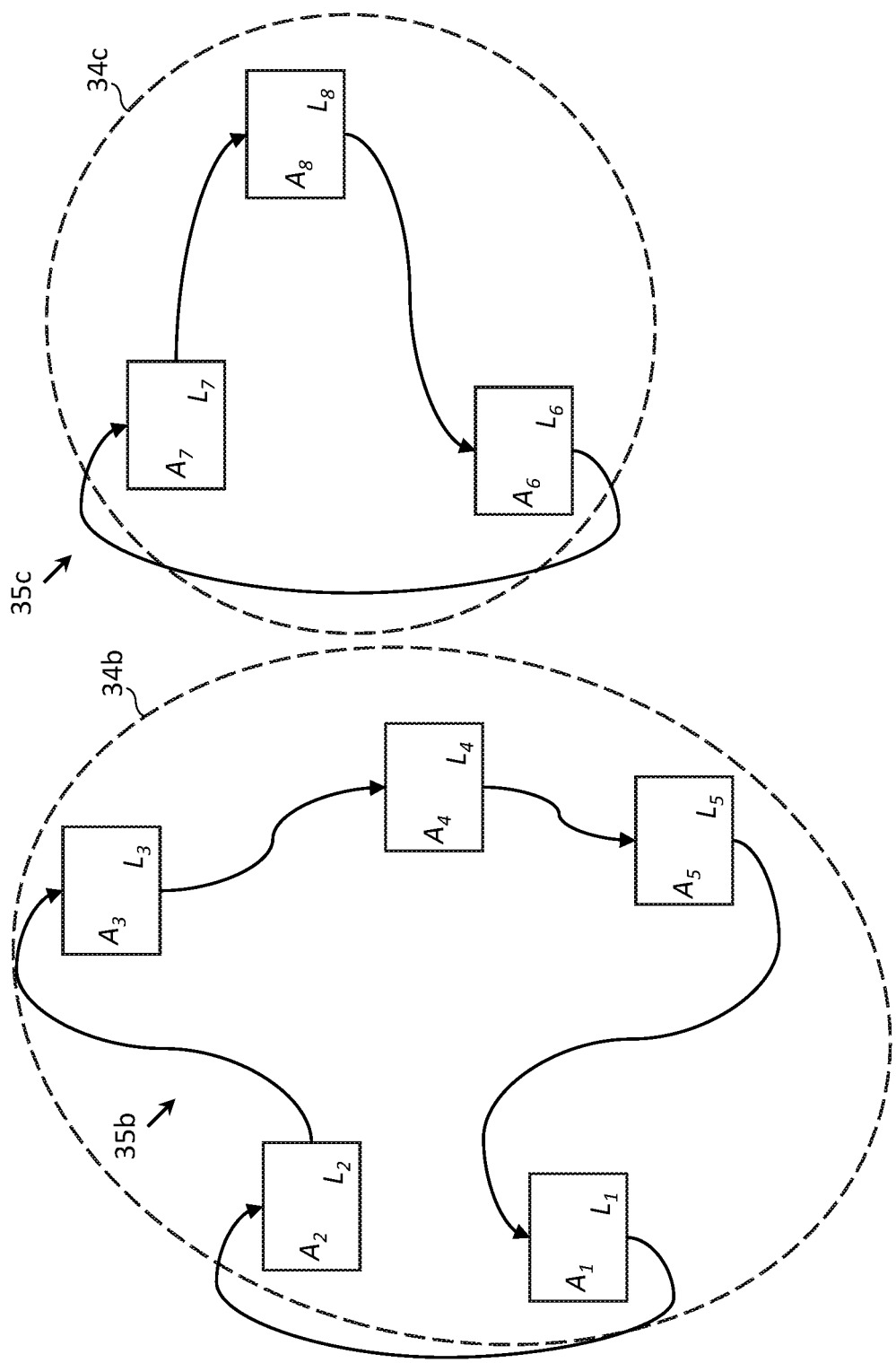
FIG. 17B depicts the plurality of chiplets within each of the chiplet groups being interconnected via a closed path, in accordance with one embodiment of the invention.

FIG. 17B depicts the plurality of chiplets within each of the chiplet groups 34b, 34c being interconnected via a closed path. Specifically, chiplets $L_1, \ldots, L_5$ are interconnected via closed path 35b and chiplets $L_6, L_7, L_8$ are interconnected via closed path 35c. While the example of FIG. 17B illustrates the chiplets being interconnected via two closed paths, it is understood that the chiplets may be interconnected via any number of closed paths.

Figure 17C:
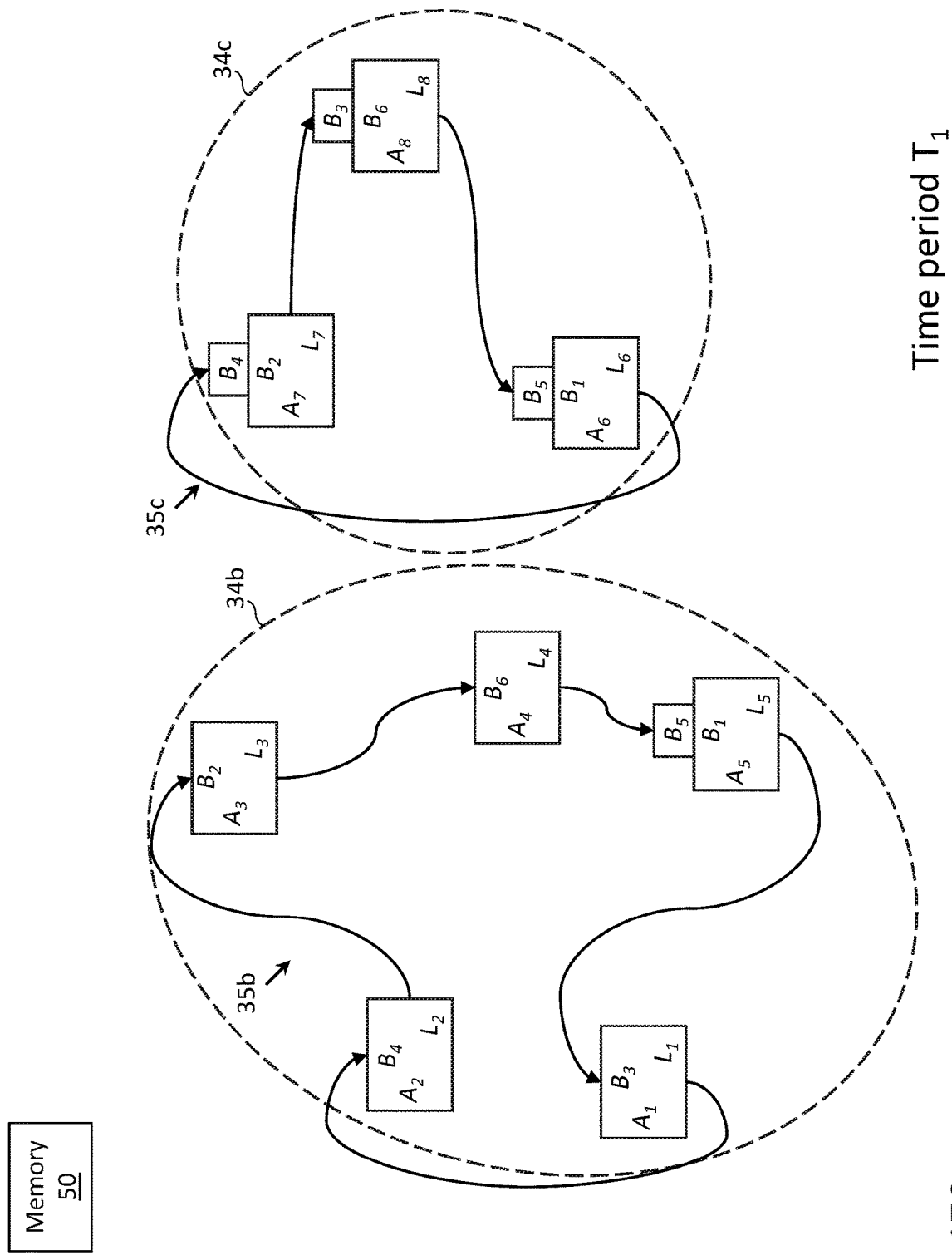
FIG. 17C depicts vertical stripes that have been loaded into the chiplets, in accordance with one embodiment of the invention.
Figure 17D:
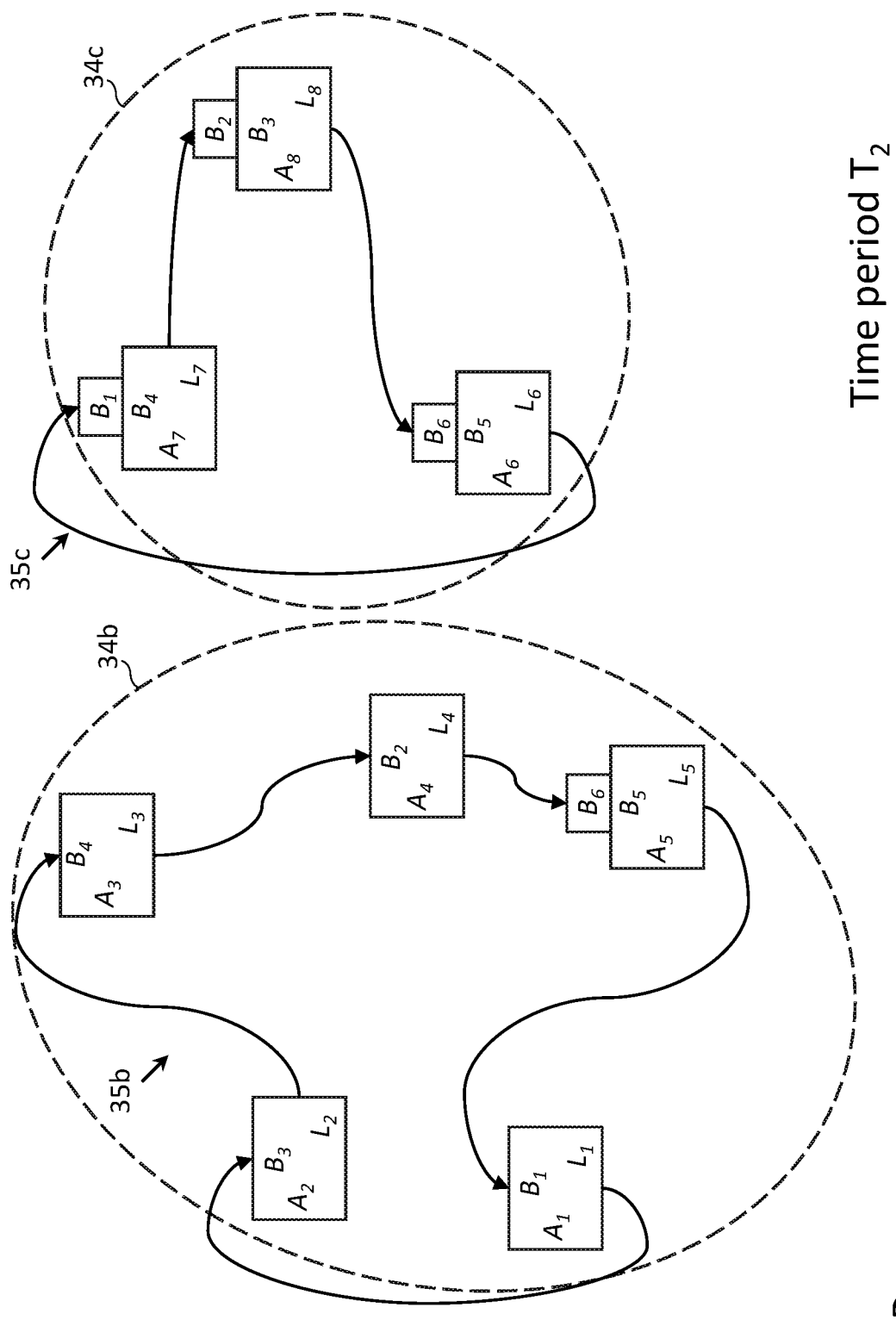
FIG. 17D depicts the vertical stripes after the vertical stripes have been passed from one chiplet to another chiplet via the respective closed paths, in accordance with one embodiment of the invention.

FIG. 17C depicts the processing of vertical stripes, $B_1, \ldots, B_6$ at the chiplets in time period $T_1$, after the vertical stripes, $B_1, \ldots, B_6$ have been loaded from memory 50 into the chiplets belonging to each of the chiplet groups. Specifically, a first copy of the vertical stripes $B_1, \ldots, B_6$ has been stored in chiplets $L_1, \ldots, L_8$ belonging to chiplet group 34b and a second copy of the vertical stripes $B_1, \ldots, B_6$ has been stored in chiplets $L_6, L_7$ and $L_8$ belonging to chiplet group 34c. As there are more vertical stripes than chiplets in each of the chiplet groups, not all of the vertical stripes can be processed at the same time in time period $T_1$. As shown, vertical stripes $B_6, B_6, B_1$ and $B_2$ are located in respective queues of chiplets $L_8, L_6, L_7$ and $L_8$, respectively, waiting for their turn to be processed. In time period $T_1$:
  Horizontal stripe $A_1$ is multiplied with vertical stripe $B_3$ at chiplet $L_1$
  Horizontal stripe $A_2$ is multiplied with vertical stripe $B_4$ at chiplet $L_2$
  Horizontal stripe $A_3$ is multiplied with vertical stripe $B_2$ at chiplet $L_3$
  Horizontal stripe $A_4$ is multiplied with vertical stripe $B_6$ at chiplet $L_4$
  Horizontal stripe $A_5$ is multiplied with vertical stripe $B_1$ at chiplet $L_8$
  Horizontal stripe $A_6$ is multiplied with vertical stripe $B_1$ at chiplet $L_6$
  Horizontal stripe $A_7$ is multiplied with vertical stripe $B_2$ at chiplet $L_7$
  Horizontal stripe $A_8$ is multiplied with vertical stripe $B_6$ at chiplet $L_8$ FIG. 17D depicts the processing of vertical stripes in time period $T_2$ (which immediately follows time period $T_1$ in the example of FIG. 17D) after the vertical stripes have been "rotated" in the clockwise direction along closed paths 35b and 35c in the intervening time between time period $T_1$ and time period $T_2$. The rotation may involve some vertical stripes being passed from one chiplet to another chiplet. For instance, in chiplet group 34b, vertical stripes $B_1$, $B_3$, $B_4$, $B_2$ and $B_6$ have been passed from one chiplet to another, and in chiplet group 34c, vertical stripes $B_1$, $B_2$ and $B_6$ have been passed from one chiplet to another. The rotation may also involve some vertical stripes being loaded into the respective systolic arrays 26 from the respective input queues 22. For instance, in chiplet group 34b, vertical stripe $B_5$ has been loaded from input queue into the systolic array at chiplet $L_8$, and in chiplet group 34c, vertical stripes $B_5$, $B_4$ and $B_3$ have been loaded from respective input queues into the respective systolic arrays at chiplets $L_6$, $L_7$ and $L_8$, respectively. In time period $T_2$:

Horizontal stripe $A_1$ is multiplied with vertical stripe $B_1$ at chiplet $L_1$ Horizontal stripe $A_2$ is multiplied with vertical stripe $B_3$ at chiplet $L_2$ Horizontal stripe $A_3$ is multiplied with vertical stripe $B_4$ at chiplet $L_3$ Horizontal stripe $A_4$ is multiplied with vertical stripe $B_2$ at chiplet $L_4$ Horizontal stripe $A_5$ is multiplied with vertical stripe $B_5$ at chiplet $L_8$ Horizontal stripe $A_6$ is multiplied with vertical stripe $B_5$ at chiplet $L_6$ Horizontal stripe $A_7$ is multiplied with vertical stripe $B_4$ at chiplet $L_7$ Horizontal stripe $A_8$ is multiplied with vertical stripe $B_3$ at chiplet $L_8$ The remaining time periods have been omitted for conciseness, but it should be apparent that the final time period occurs when each of the chiplets has processed a copy of each of the vertical stripes of matrix B. After the processing in the final time period, horizontal stripes from matrix C can be transmitted from each of the chiplets $L_1, \ldots, L_8$ to client device 27, in order to form matrix C (or a portion of matrix C) at client device 27. As such details were already discussed in detail in association with FIG. 7, no further discussion will be provided for the sake of conciseness. An advantage to logically grouping the chiplets into smaller chiplet groups is that it is less likely to have idle chiplets (which reduces the number of time periods to process all of the vertical stripes). However, a disadvantage to logically grouping the chiplets into smaller chiplet groups is that the size of the respective input queues 22 may need to be increased to accommodate an increasing number of vertical stripes waiting to be processed.

As an extension to the example of FIGS. 17A-17D, it is noted that there could be circumstances in which a chiplet could be part of two or more closed paths (or more generally, part of two or more paths).

Figure 18:
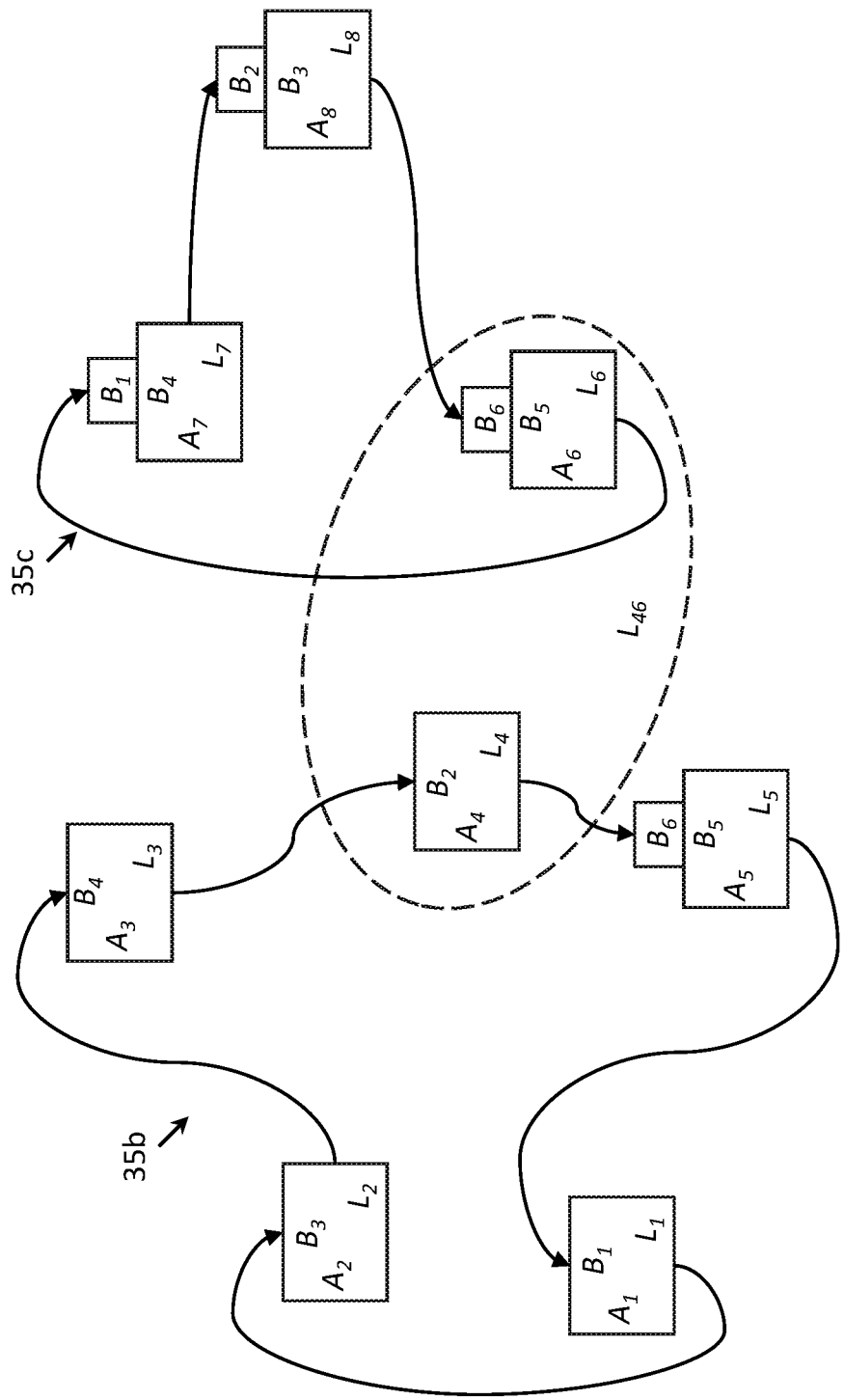
FIG. 18 depicts a variation of the arrangement of FIGS. 17A-17D, in which one chiplet is part of two closed paths, in accordance with one embodiment of the invention.

For instance, one could modify the example of FIGS. 17A-17D by replacing chiplets $L_4$ and $L_6$ with a single chiplet, $L_{46}$, (see FIG. 18) that carries out the respective operations of chiplets $L_4$ and $L_6$. That is, chiplet $L_{46}$ would store and process horizontal stripes $A_4$ and $A_6$. In order to distinguish between the vertical stripes that are rotated through closed path 35b, and the vertical stripes that are rotated through closed path 35c, the multiple ports of the chiplet $L_{46}$ may be utilized. For instance, port 32b could be used to receive the vertical stripes from closed path 35b, and port 23c could be used to receive the vertical stripes from closed path 35c. Further, the architecture of a MAC unit 10 may need to be modified to include two accumulators, one for accumulating the partial sums of horizontal stripe $A_4$ and one for accumulating the partial sums of horizontal stripe $A_6$. In general, each MAC unit 10 of the systolic array 26 may have any number of accumulators, one corresponding to each of the horizontal (or vertical) stripes that are resident on the chiplet in a fixed manner.

The example of FIGS. 19A-19D describes a strategy that is employed for the circumstance in which there are many more chiplets than there are vertical stripes. Instead of leaving many of the chiplets idle, multiple copies of each of the vertical stripes may be loaded into chiplets belonging to the same chiplet group. In the simplified example of FIG. 19A-19D, there are a total of eight chiplets and four vertical stripes, $B_1$, $B_2$, $B_3$ and $B_4$, in which matrix B is formed as follows:

$$B = [B_1 \ldots B_4]$$

Hence, two copies of each of the vertical stripes can be loaded into the eight chiplets belonging to chiplet group 34a so that no chiplet will be idle. It should be understood how to handle minor variations to this setup. For instance, if there are a total of ten chiplets and four vertical stripes, two copies of each of the vertical stripes can be loaded into the chiplets belonging to the chiplet group and two out of the ten chiplets can be idle at any one time period. Alternatively, three copies of each of the vertical stripes can be loaded into the ten chiplets belonging to the chiplet group and two of the vertical stripes can be placed into one or more queues of the respective chiplets.

Figure 19A:
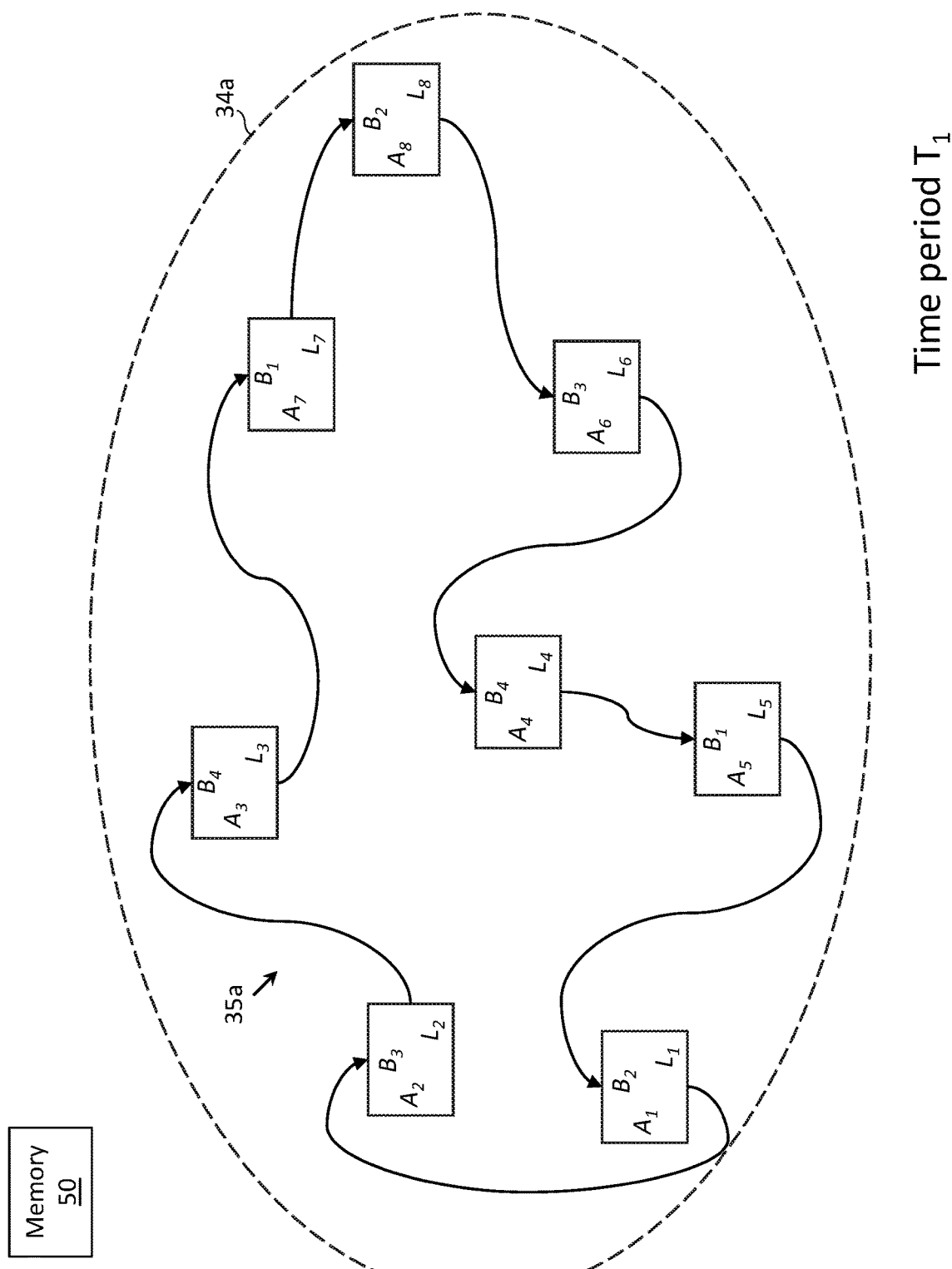
FIGS. 19A-19D depict the passing of vertical stripes from one chiplet to another chiplet via the closed path, in which there are duplicate instances of the vertical stripes within the closed path, in accordance with one embodiment of the invention.

In time period $T_1$ depicted in FIG. 19A:
vertical stripe $B_1$ can be loaded from memory 50 into chiplets $L_5$ and $L_7$
vertical stripe $B_2$ can be loaded from memory 50 into chiplets $L_1$ and $L_8$
vertical stripe $B_3$ can be loaded from memory 50 into chiplets $L_2$ and $L_6$
vertical stripe $B_4$ can be loaded from memory 50 into chiplets $L_3$ and $L_4$ Also in time period $T_1$, the respective horizontal stripes that are resident on the respective chiplets can be multiplied with the respective vertical stripes that are resident on the respective chiplets.

Figure 19B:
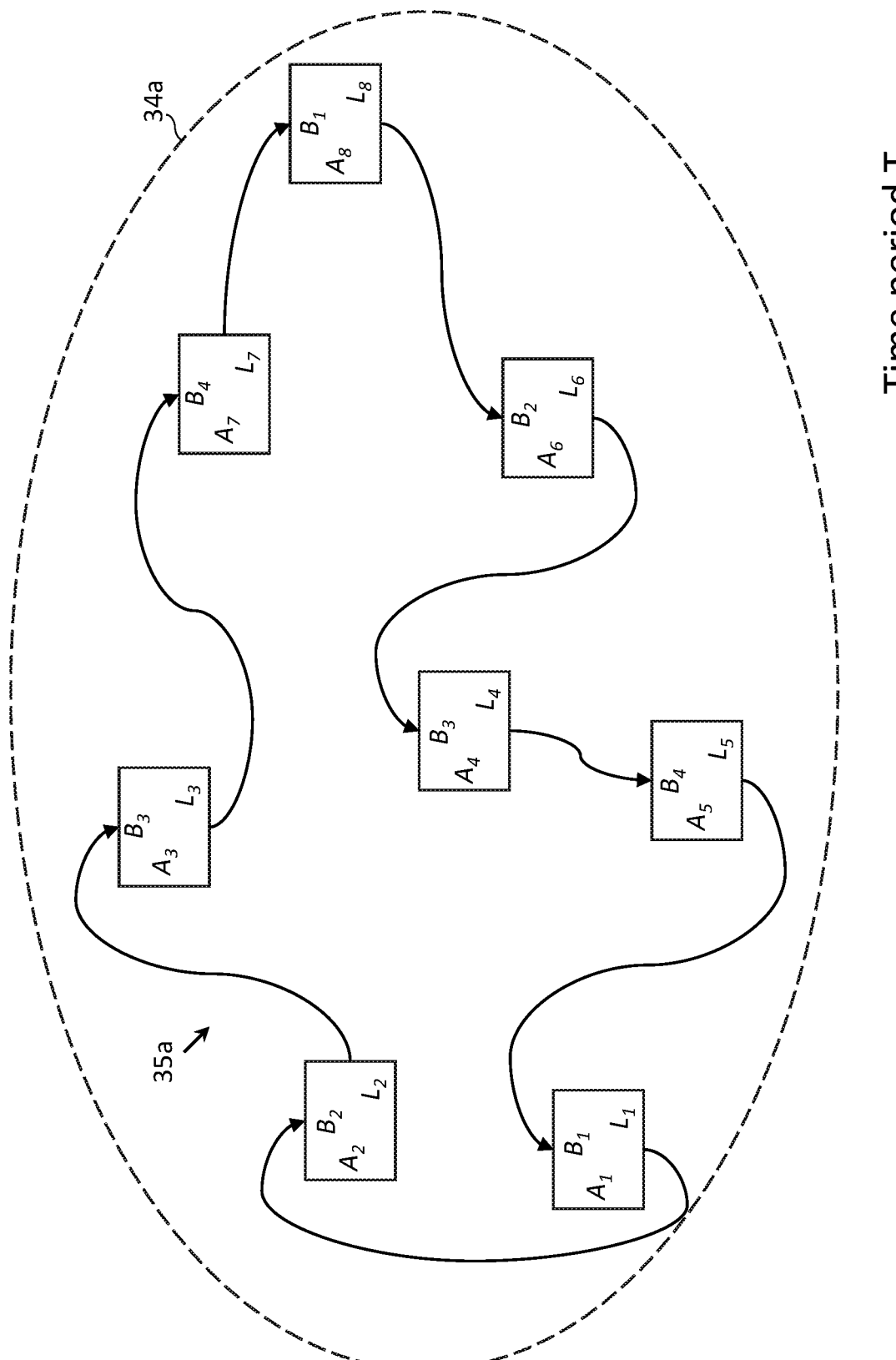

FIG. 19B depicts time period $T_2$ (which immediately follows time period $T_1$ in the example of FIG. 19B) after the vertical stripes have been "rotated" in the clockwise direction along closed path 35a in the intervening time between time period $T_1$ and time period $T_2$. In time period $T_2$ depicted in FIG. 19B:
vertical stripe $B_1$ is stored on chiplets $L_1$ and $L_8$
vertical stripe $B_2$ is stored on chiplets $L_2$ and $L_6$
vertical stripe $B_3$ is stored on chiplets $L_3$ and $L_4$
vertical stripe $B_4$ is stored on chiplets $L_5$ and $L_7$ Also in time period $T_2$, the respective horizontal stripes that are resident on the respective chiplets can be multiplied with the respective vertical stripes that are resident on the respective chiplets.

Figure 19C:
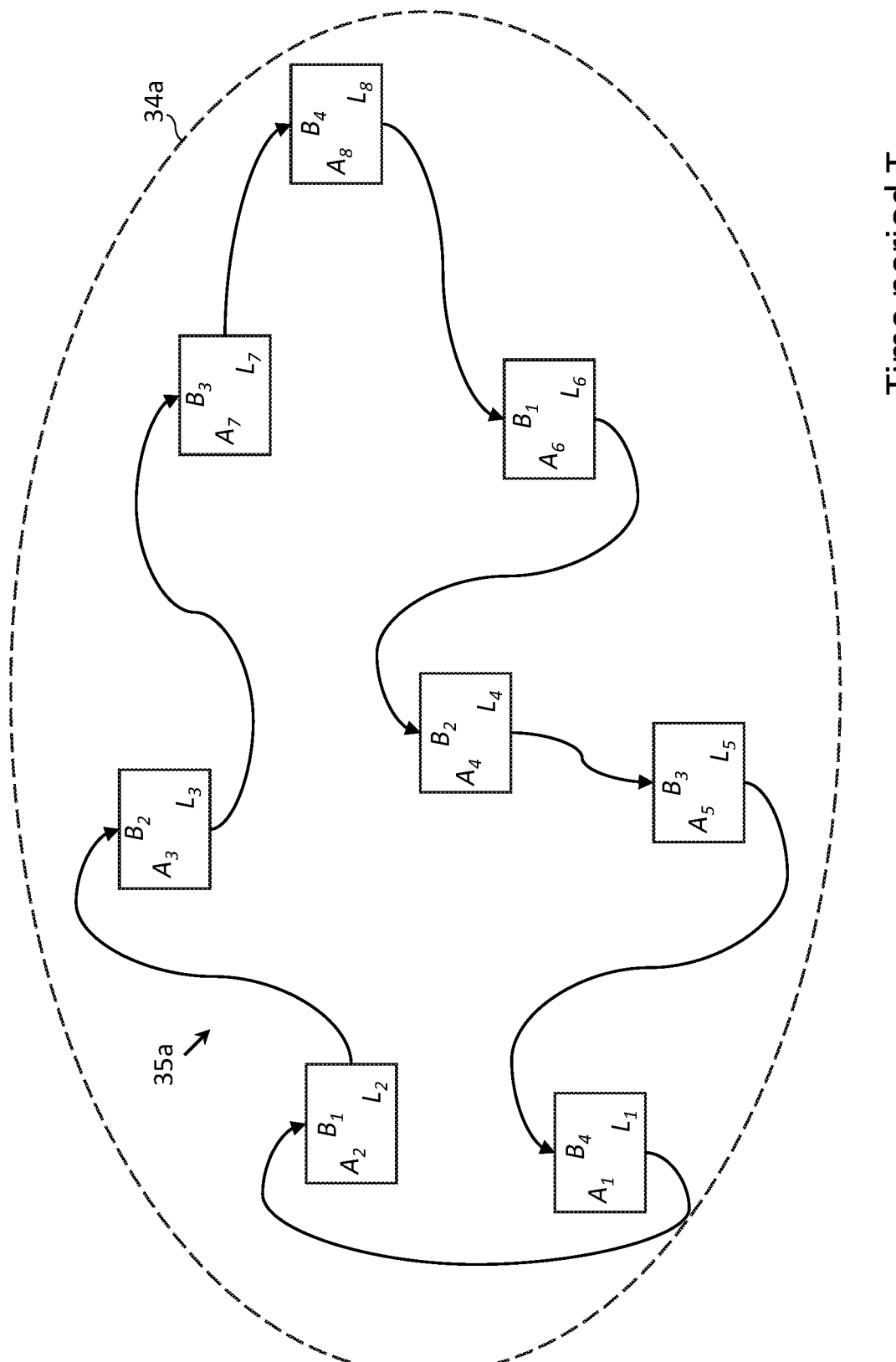

FIG. 19C depicts time period $T_3$ (which immediately follows time period $T_2$ in the example of FIG. 19C) after the vertical stripes have been "rotated" in the clockwise direction along closed path 35a in the intervening time between time period $T_2$ and time period $T_3$. In time period $T_3$ depicted in FIG. 19C:
vertical stripe $B_1$ is stored on chiplets $L_2$ and $L_6$
vertical stripe $B_2$ is stored on chiplets $L_3$ and $L_4$
vertical stripe $B_3$ is stored on chiplets $L_5$ and $L_7$
vertical stripe $B_4$ is stored on chiplets $L_1$ and $L_8$ Also in time period $T_3$, the respective horizontal stripes that are resident on the respective chiplets can be multiplied with the respective vertical stripes that are resident on the respective chiplets.

Figure 19D:
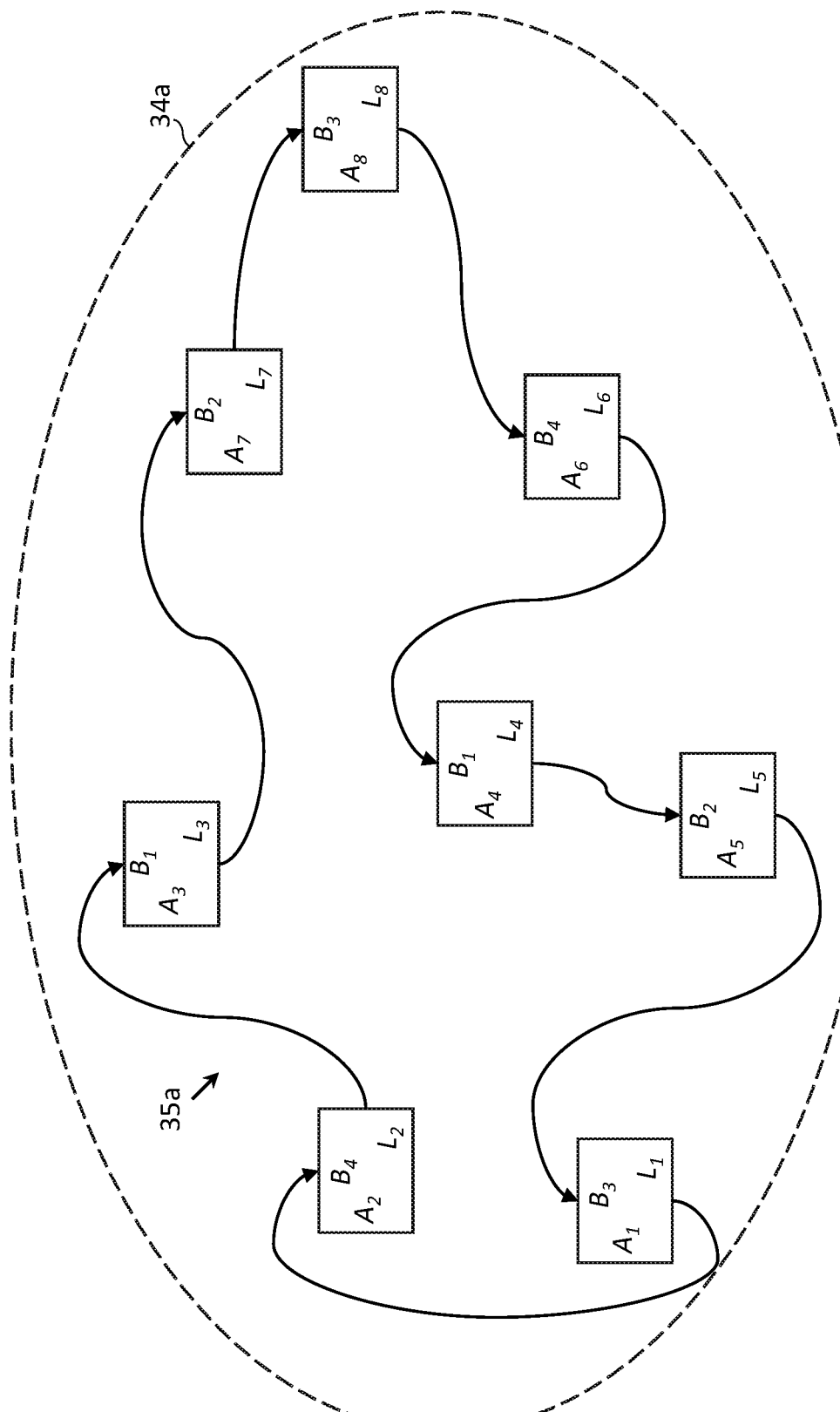

FIG. 19D depicts the final time period $T_4$ (which immediately follows time period $T_3$ in the example of FIG. 19D) after the vertical stripes have been "rotated" in the clockwise direction along closed path 35a in the intervening time between time period $T_3$ and time period $T_4$. In time period $T_4$ depicted in FIG. 19D:

vertical stripe $B_1$ is stored on chiplets $L_3$ and $L_4$
vertical stripe $B_2$ is stored on chiplets $L_5$ and $L_7$
vertical stripe $B_3$ is stored on chiplets $L_1$ and $L_8$
vertical stripe $B_4$ is stored on chiplets $L_2$ and $L_6$ Also in time period $T_4$, the respective horizontal stripes that are resident on the respective chiplets can be multiplied with the respective vertical stripes that are resident on the respective chiplets. At this point, the processing concludes as each of the chiplets has received and processed a copy of each of the vertical stripes of the matrix B. It should be apparent that in the strategy described in the example of FIGS. 19A-19D, each copy of the vertical stripe travels along only a segment of closed path 35a (and not the entire way around closed path 35a).

Figure 20A:
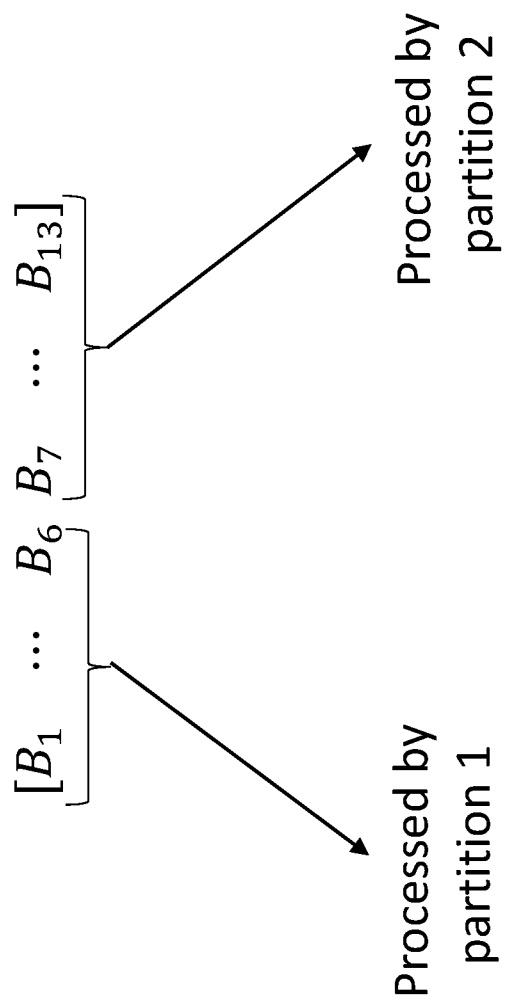
FIGS. 20A-20C depict an example in which the chiplets are organized into a first partition and a second partition, and a first group of vertical stripes from matrix B are passed along one or more closed paths from the first partition and a second group of vertical stripes from matrix B are passed along one or more closed paths from the second partition, in accordance with one embodiment of the invention.
Figure 20B:
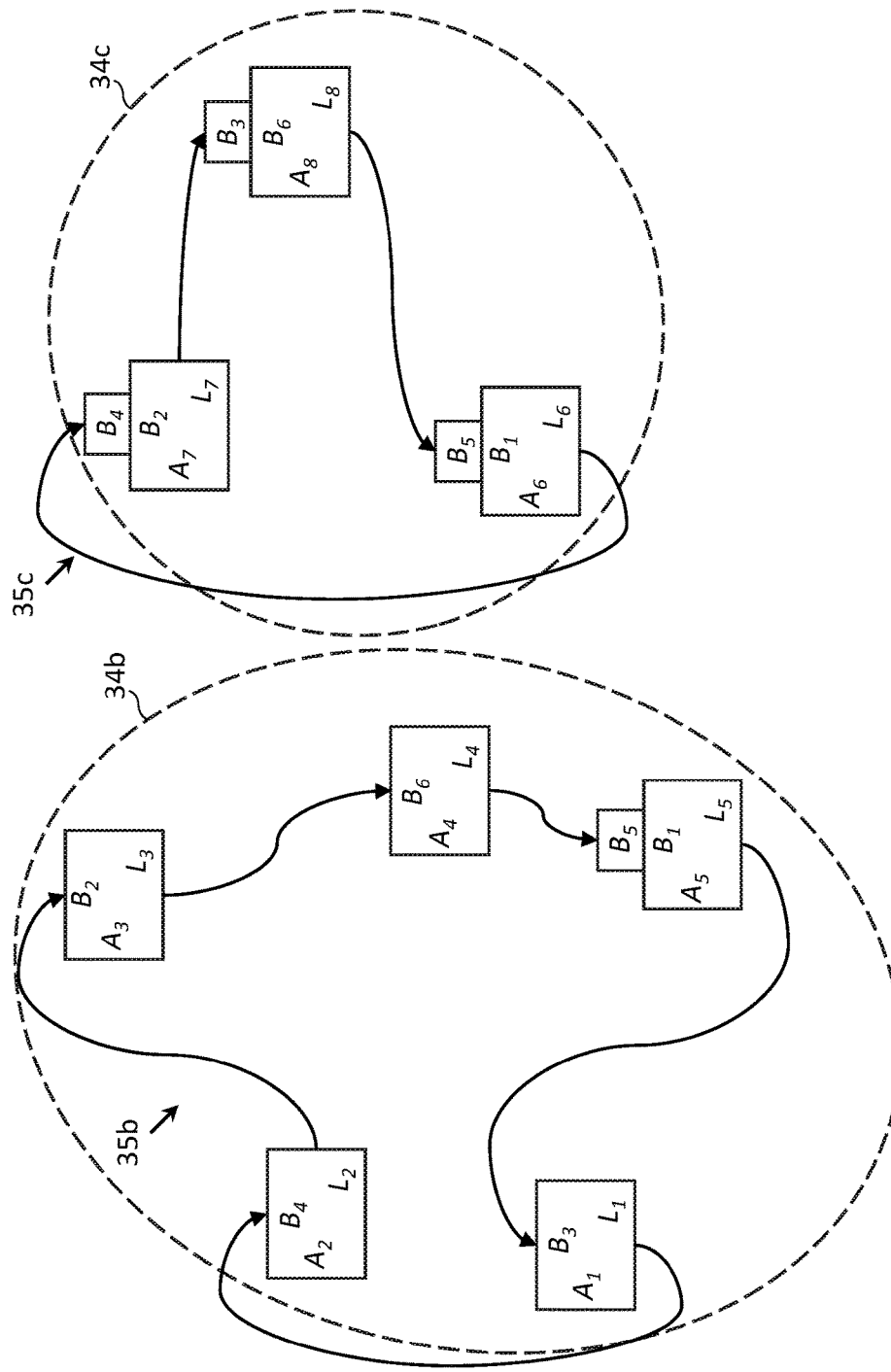
Figure 20C:
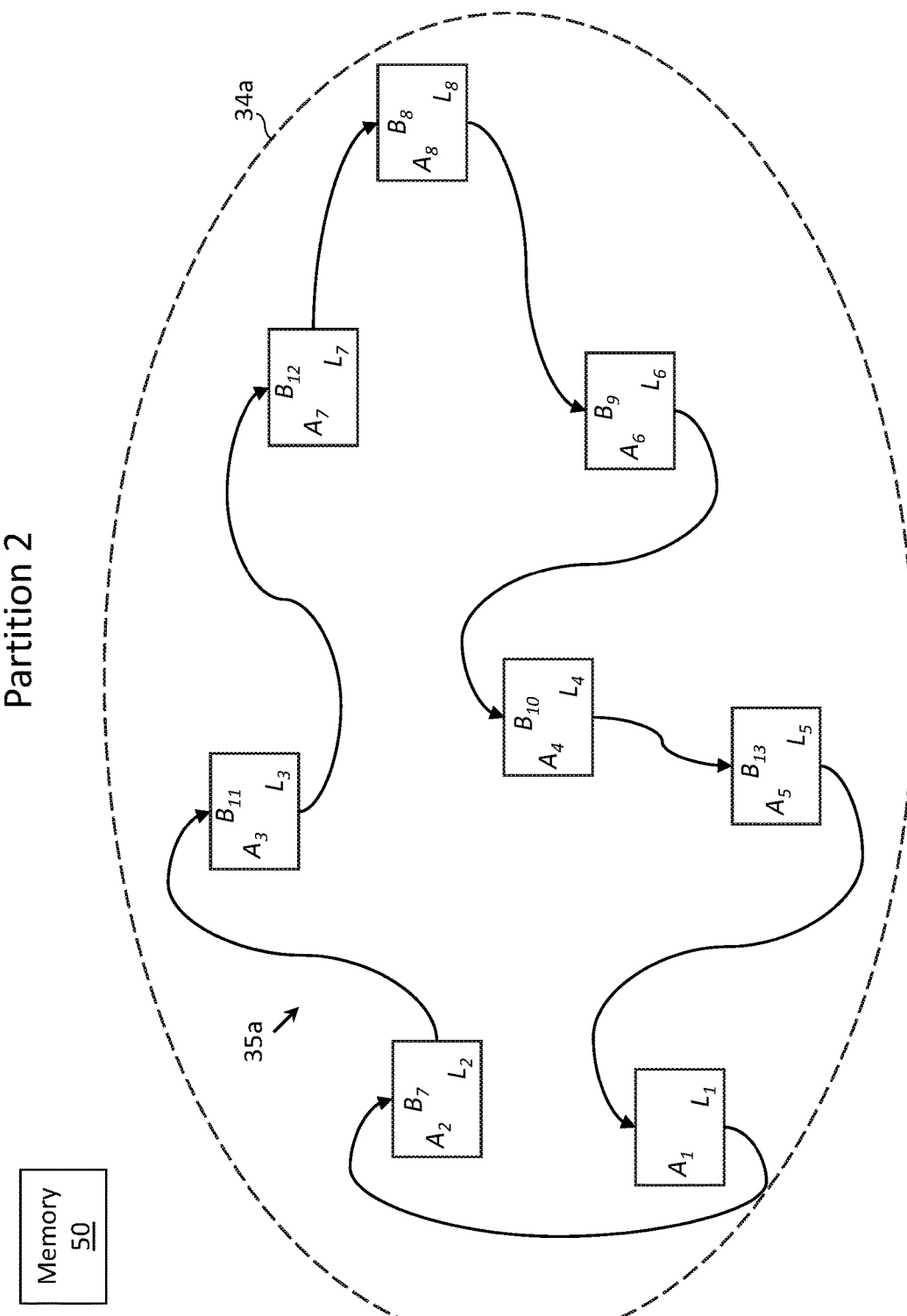

FIGS. 20A-20C provide an example which explains that the chiplets may be logically grouped into different partitions over time, and that these different partitions may be used to compute the multiplication of matrix A with matrix B. In the example, matrix B is formed by vertical stripes $B_1, \ldots, B_{13}$, specifically:

$$B = [B_1 \ldots B_{13}]$$

A first group of the vertical stripes $B_1, \ldots, B_6$ may be processed by the chiplets organized in a first partition, and a second group of the vertical stripes $B_7, \ldots, B_{13}$ may be processed by the same chiplets organized in a second partition. FIG. 20B depicts the chiplets $L_1, \ldots, L_8$ logically organized into chiplet groups 34b and 34c which form the first partition. Closed path 35b may interconnect the chiplets $L_1, \ldots, L_5$ within chiplet group 34b, and closed path 35c may interconnect the chiplets $L_6$, $L_7$ and $L_8$ within chiplet group 34c. One copy of the vertical stripes $B_1, \ldots, B_6$ may be loaded onto the chiplets $L_1, \ldots, L_5$ within chiplet group 34b from memory 50 and another copy of the vertical stripes $B_1, \ldots, B_6$ may be loaded onto the chiplets $L_6$, $L_7$ and $L_8$ within chiplet group 34c. The processing of an identical arrangement was previously discussed in FIG. 17C and hence will not be repeated for conciseness. Further, based on the previous discussion from FIG. 17D, it should be apparent how the vertical stripes $B_1, \ldots, B_6$ are rotated through the respective closed paths 35b and 35c in various time periods (not depicted) until each of the chiplets, $L_1, \ldots, L_8$, has processed each of the vertical stripes $B_1, \ldots, B_6$. However, in the example of FIG. 20B, the processing to form the product of matrix A and matrix B is not yet complete, as there are further vertical stripes of matrix B that have not yet been processed.

With the contents in the respective output buffers maintained from the processing of vertical stripes $B_1, \ldots, B_6$, the example continues in FIG. 20C with the chiplets $L_1, \ldots, L_8$ logically organized into chiplet group 34a which forms a second partition distinct from the first partition. Closed path 35a may interconnect the chiplets $L_1, \ldots, L_8$ within chiplet group 34a. The remaining vertical stripes $B_7, \ldots, B_{13}$ may be loaded from memory 50 onto the chiplets within chiplet group 34a. There are seven vertical stripes and eight chiplets, so in the example, chiplet $L_1$ initially does not have any vertical stripe stored thereon. Based on the discussion from the previous examples, it should be clear how the horizontal stripes resident on the respective chiplets are multiplied with the vertical stripes resident on the respective chiplets, and further how the vertical stripes $B_7, \ldots, B_{13}$ are rotated through the closed paths 35a in various time periods (not depicted) until each of the chiplets, $L_1, \ldots, L_8$, has processed each of the vertical stripes $B_7, \ldots, B_{13}$. At that point, the computation of the product of matrix A and matrix B is complete. The example of FIGS. 20A-20C demonstrates that the partitioning of the chiplets need not remain constant while the vertical stripes of matrix B are being processed so long as each partition is used to process disjoint sets of the vertical stripes.

Figure 21A:
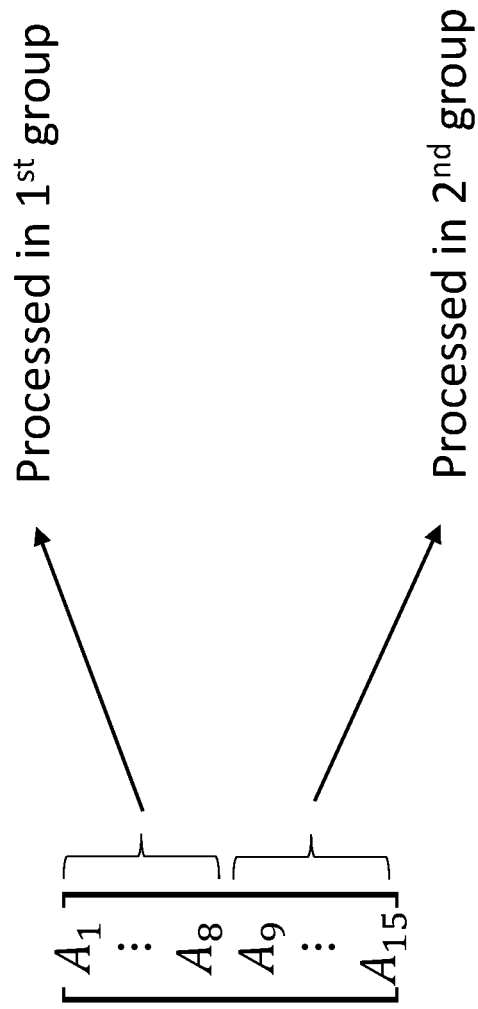
FIGS. 21A-21C depict an example for handling the case when the number of horizontal stripes is greater than the number of chiplets, in accordance with one embodiment of the invention.
Figure 21B:
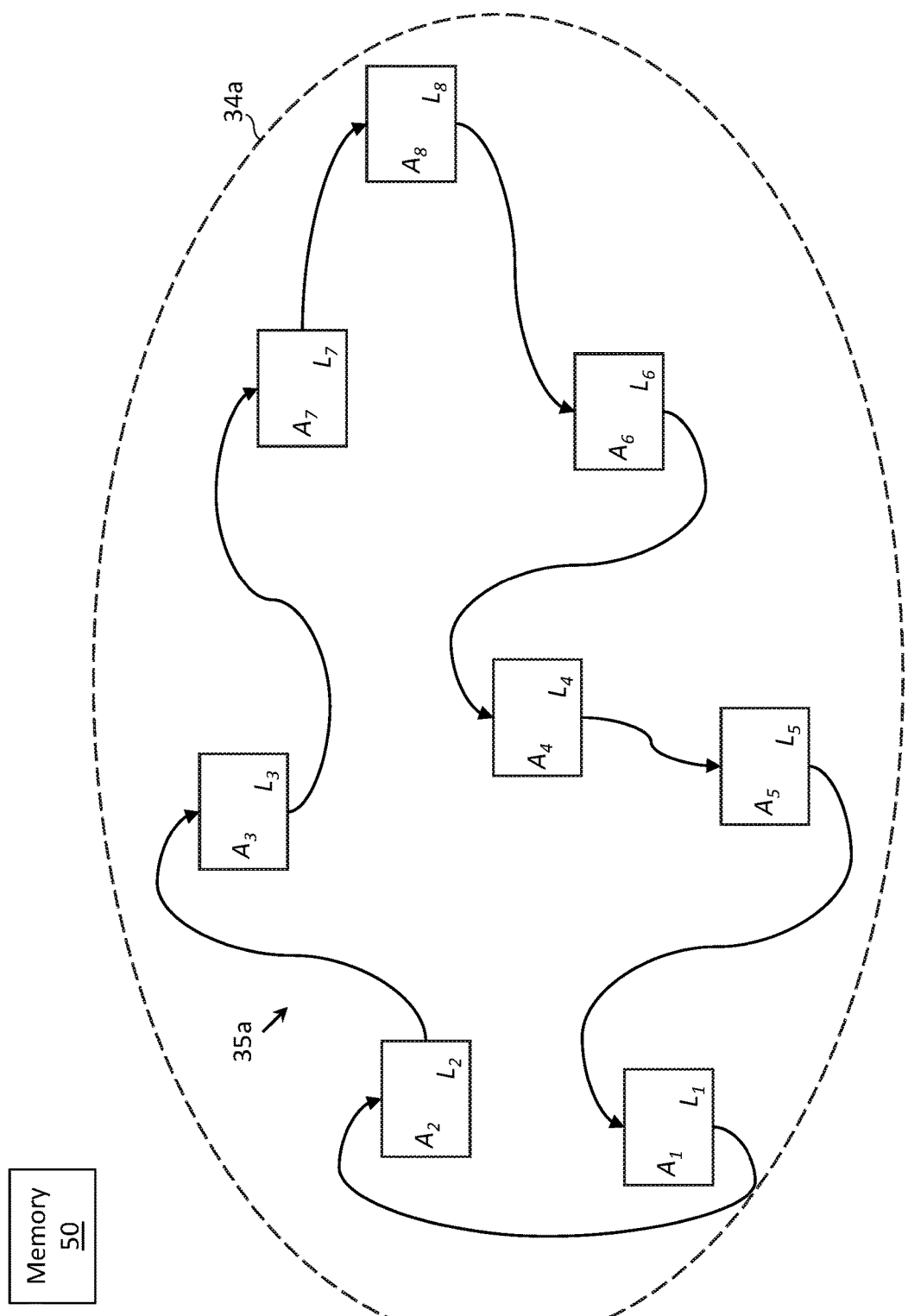
Figure 21C:
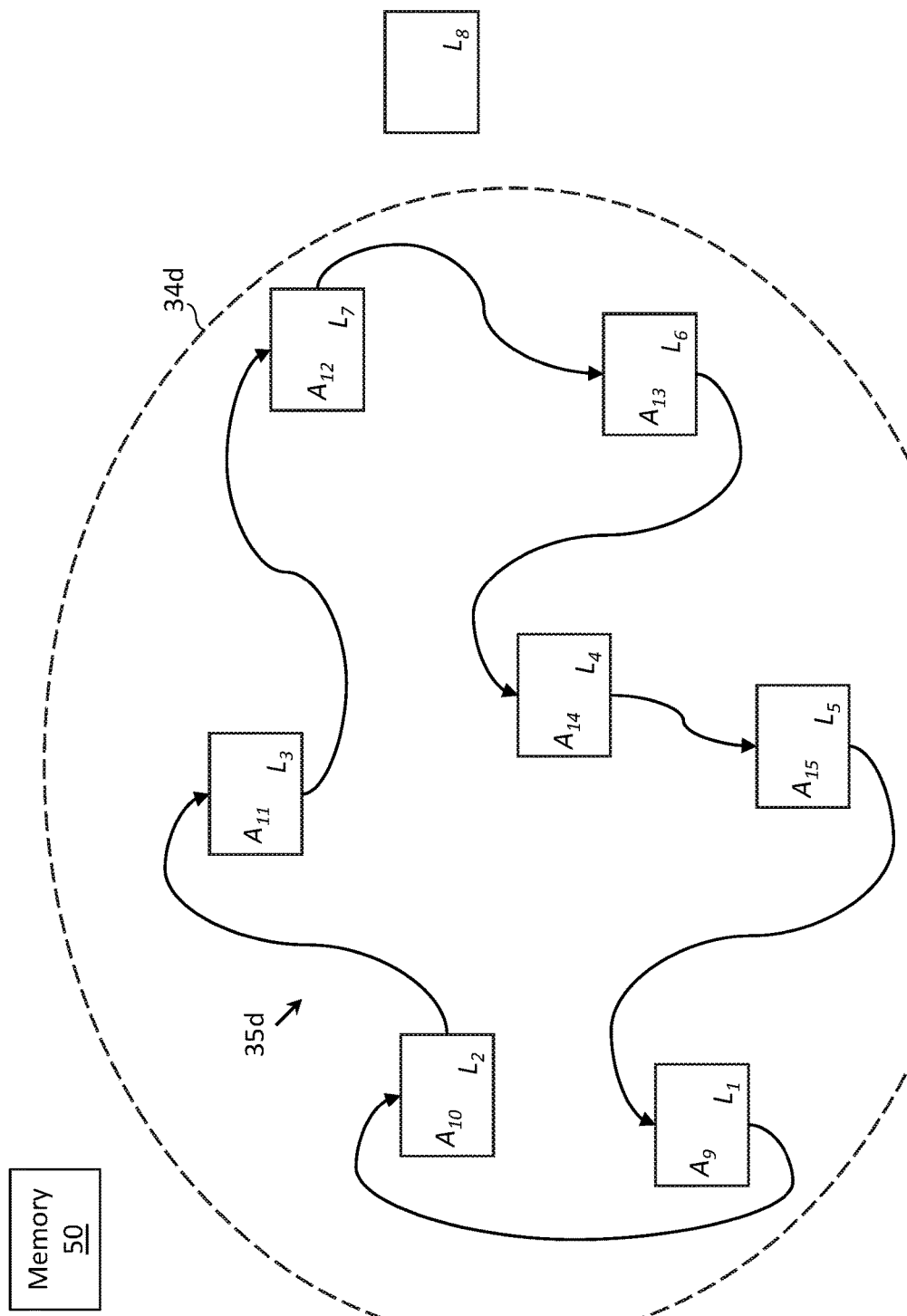

FIGS. 21A-21C depict an example for handling the case when the number of horizontal stripes in matrix A is greater than the number of chiplets. In the example, there are eight chiplets and fifteen horizontal stripes, $A_1, \ldots, A_{15}$. Matrix A is formed as a column of the horizontal stripes:

$$A = \begin{bmatrix} A_1 \\ \vdots \\ A_{15} \end{bmatrix}$$

Horizontal stripes $A_1, \ldots, A_8$ may be processed a first group, in which the horizontal stripes $A_1, \ldots, A_8$ are loaded onto chiplets $L_1, \ldots, L_8$ from memory 50, as shown in FIG. 21B. Chiplets $L_1, \ldots, L_8$ are part of chiplet group 34a, and closed path 35a interconnects the chiplets within chiplet group 34a. For the sake of conciseness, the example does not show the loading of the vertical stripes and the processing of the vertical stripes, as these details were previously discussed and shown in FIGS. 16C and 16D.

Next, horizontal stripes $A_9, \ldots, A_{15}$ may be processed a second group, in which the horizontal stripes $A_9, \ldots, A_{15}$ are loaded onto chiplets $L_1, \ldots, L_7$ from memory 50, as shown in FIG. 21C. Notice that chiplet $A_8$ is unused and does not form part of the chiplet group 34d. Chiplets $L_1, \ldots, L_7$ are part of chiplet group 34d, and closed path 35d interconnects the chiplets within chiplet group 34d. For the sake of conciseness, the example does not show the loading of the vertical stripes, the processing of the vertical stripes, and the rotation of the vertical stripes through the closed paths 35a, 35d as similar details were previously discussed and shown in FIGS. 16C and 16D. While the horizontal stripes of matrix A were serially processed in two groups (with one group followed by another group) in the example of FIGS. 21A-21C, it is understood that the example is not limiting and the horizontal stripes of matrix A could be processed in any number of groups. Stated differently, the number of horizontal stripes of matrix A could be much greater than the number of chiplets; the drawback is that many groups will be needed to process all of the horizontal stripes of matrix A.

Figure 21D:
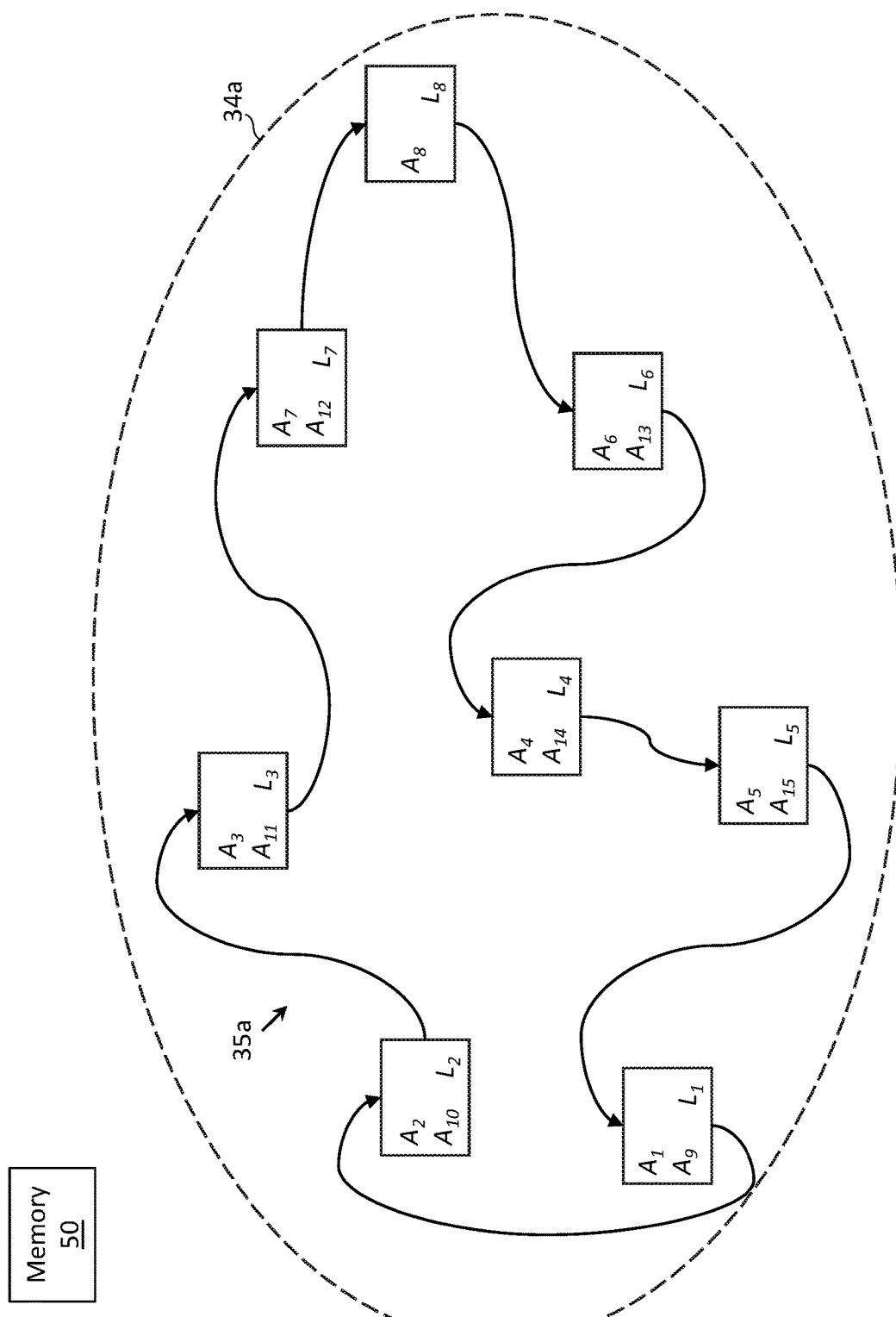
FIGS. 21D-21F depict another example for handling the case when the number of horizontal stripes is greater than the number of chiplets, in accordance with one embodiment of the invention.
Figure 21E:
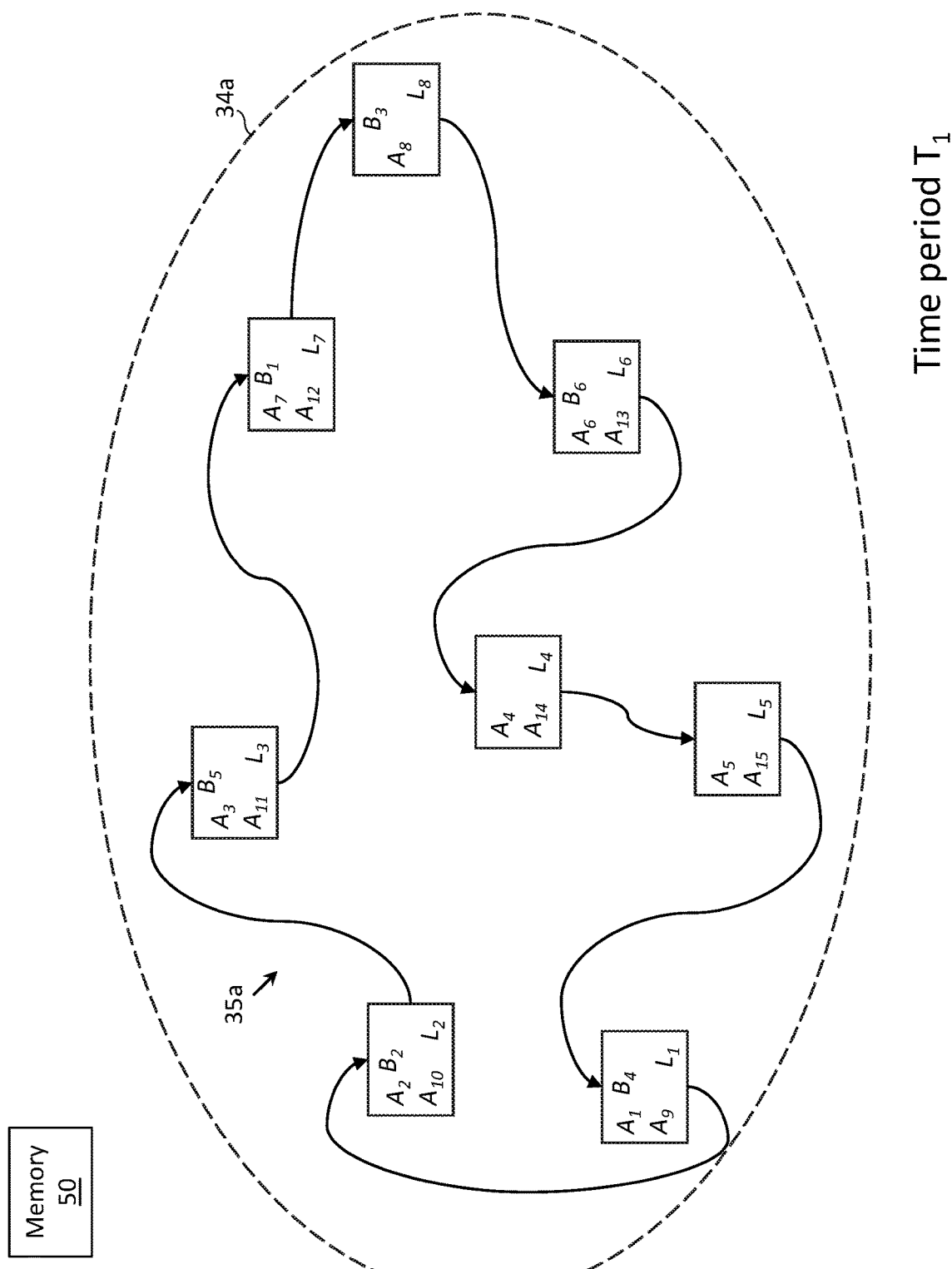
Figure 21F:
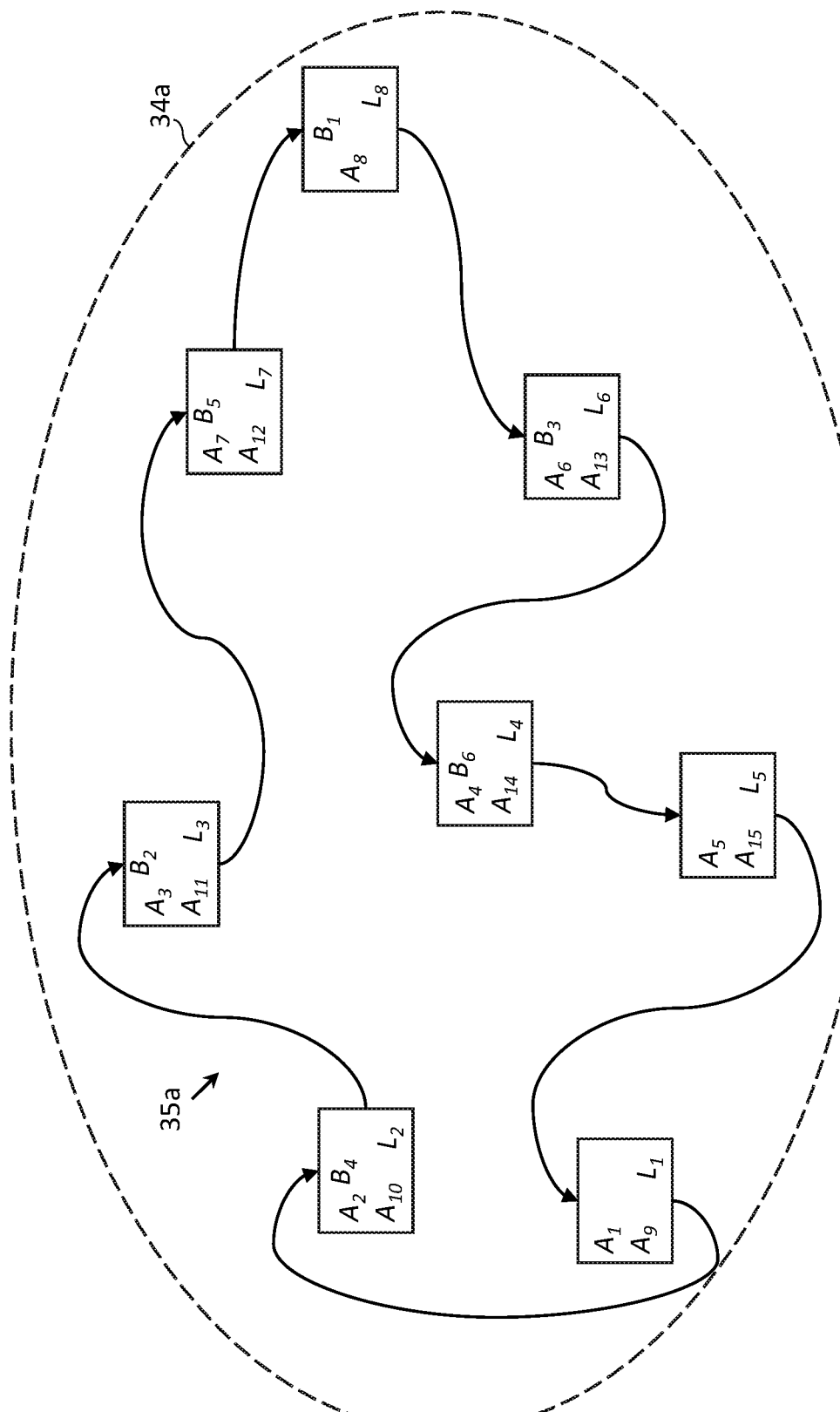

FIGS. 21D-21F depict another example for handling the case when the number of horizontal stripes in matrix A is greater than the number of chiplets. In contrast to the example from FIGS. 21A-21C, multiple horizontal stripes may be loaded on one or more of the chiplets at the same time. In the example:

horizontal stripes $A_1$, $A_9$ are stored on chiplet $L_1$
horizontal stripes $A_2$, $A_{10}$ are stored on chiplet $L_2$
horizontal stripes $A_3$, $A_{11}$ are stored on chiplet $L_3$
horizontal stripes $A_4$, $A_{14}$ are stored on chiplet $L_4$
horizontal stripes $A_5$, $A_{15}$ are stored on chiplet $L_8$ horizontal stripes $A_6$, $A_{13}$ are stored on chiplet $L_6$ horizontal stripes $A_7$, $A_{12}$ are stored on chiplet $L_7$ horizontal stripe $A_8$ are stored on chiplet $L_8$ For completeness, FIG. 21E shows vertical stripes $B_1, \ldots, B_6$ being loaded onto respective ones of the chiplets from memory 50 and FIG. 21F shows vertical stripes $B_1, \ldots, B_6$ after being passed (e.g., rotated) from one chiplet to another along closed path 35a. An advantage of the approach of FIGS. 21D-21F is that the vertical stripes $B_1, \ldots, B_6$ only need to be rotated through the closed path 35a once, in comparison to the example of FIGS. 21A-21C in which the vertical stripes needed to be rotated through closed path 35a and another time through closed path 35d. One complication that arises in the example of FIGS. 21D-21F is that it may not be possible to load the horizontal stripes resident on the respective chiplets onto the systolic array 26 at the same time due to size constraints. Taking chiplet $L_2$ as a specific example, the height of horizontal stripe $A_2$, the height of horizontal stripe $A_{10}$ and the height of systolic array 26 may each be equal to h (e.g., as shown in FIG. 3A). To accommodate the size constraints, the products between the respective horizontal stripes and respective vertical stripes may be computed serially by systolic array 26 of chiplet $L_2$. Specifically:

in time period $T_1$, the product of $A_2B_2$ may be computed followed by the product of $A_{10}B_2$ (or in the reverse order) in time period $T_2$, the product of $A_2B_4$ may be computed followed by the product of $A_{10}B_4$ (or in the reverse order)

A further complication may arise when sub-vertical stripes (not depicted in the example of FIGS. 21E-21F) are rotated through the arrangement of horizontal stripes of FIG. 21D, as each product of a horizontal stripe and a sub-vertical stripe would only be a partial sum, and there would need to be a way to separately accumulate the partial sums for each of the horizontal stripes. One way to do this would be to instantiate two accumulators in each of the MAC units 10 (e.g., one for accumulating the partial sums associated with each of the horizontal stripes). Another way to do this would be to have a single accumulator in the MAC unit 10 for computing the partial sums associated with both horizontal stripes, but the running totals would need to be separately stored in a temporary storage (e.g., in output buffer 28). While the example was limited to two horizontal stripes per chiplet, it is understood that the discussion can be generalized to handle two or more horizontal stripes in each chiplet.

Figure 22B:
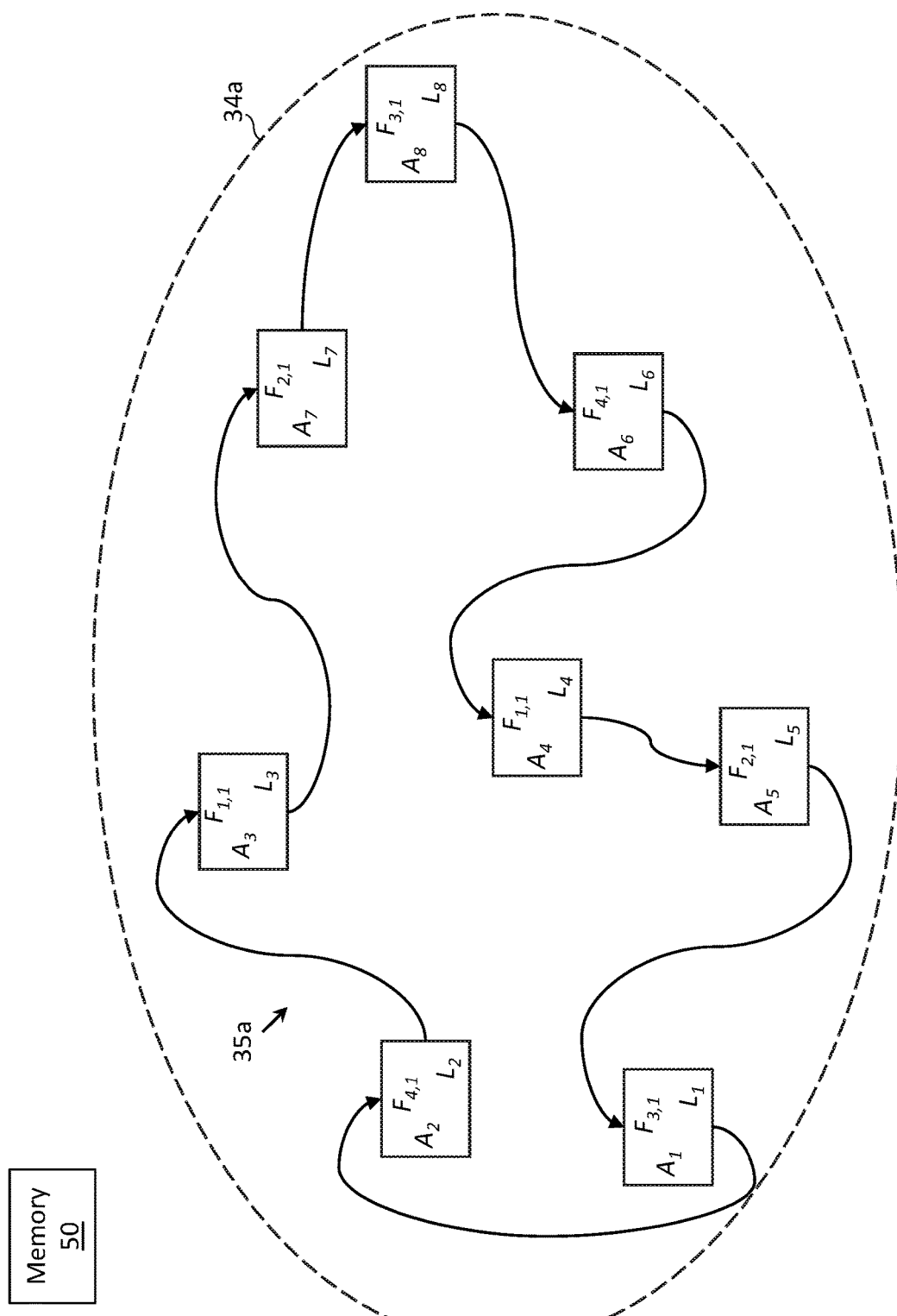
Figure 22C:
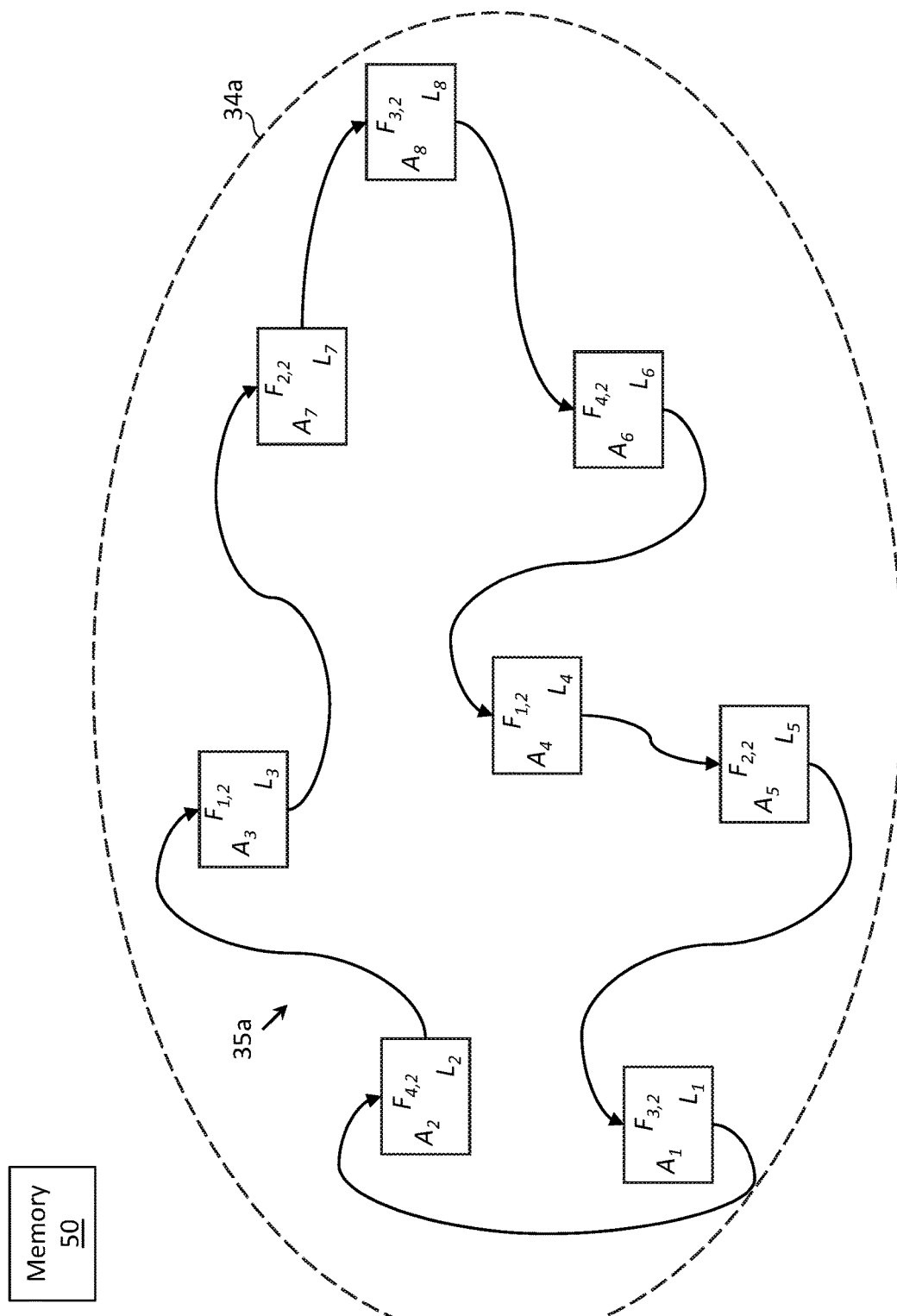

FIGS. 22A-22C depicts the decomposition of matrix A and matrix B in accordance with FIG. 8, in which the vertical stripes are processed in separate time periods. Matrix A includes eight horizontal stripes, each decomposed into four sub-horizontal stripes, and can be represented as follows:

$$A = \begin{bmatrix} A_1 \\ \vdots \\ A_8 \end{bmatrix} = \begin{bmatrix} E_{1,1} & E_{1,2} & E_{1,3} & E_{1,4} \\ E_{2,1} & E_{2,2} & E_{2,3} & E_{2,4} \\ E_{3,1} & E_{2,3} & E_{3,3} & E_{3,4} \\ E_{4,1} & E_{2,4} & E_{4,3} & E_{4,4} \\ E_{5,1} & E_{2,5} & E_{5,3} & E_{4,5} \\ E_{6,1} & E_{2,6} & E_{6,3} & E_{4,6} \\ E_{7,1} & E_{2,7} & E_{7,3} & E_{4,7} \\ E_{8,1} & E_{2,8} & E_{8,3} & E_{4,8} \end{bmatrix}$$

Matrix B includes two vertical stripes, each decomposed into four sub-vertical stripes, and can be represented as follows:

$$B = [B_1 \; B_2] = \begin{bmatrix} F_{1,1} & F_{1,2} \\ F_{2,1} & F_{2,2} \\ F_{3,1} & F_{3,2} \\ F_{4,1} & F_{4,2} \end{bmatrix}$$

FIG. 22B depicts processing of the respective sub-vertical stripes, $F_{1,1}$, $F_{2,1}$, $F_{3,1}$, $F_{4,1}$ belonging to vertical stripe $B_1$. Employing a similar scheme described in FIGS. 19A-19D, two copies each of the sub-vertical stripes may be loaded onto the chiplets $L_1, \ldots, L_8$ in order to reduce the number of time periods needed to process the sub-vertical stripes, $F_{1,1}$, $F_{2,1}$, $F_{3,1}$, $F_{4,1}$. The processing of the sub-vertical stripes, $F_{1,1}$, $F_{2,1}$, $F_{3,1}$, $F_{4,1}$ is quite similar to the processing of vertical stripes $B_1, \ldots, B_4$ in FIGS. 19A-19D with the difference that accumulation of the products in the systolic arrays continues across the rotations of the sub-vertical stripes through the closed path 35a, whereas in the processing of the vertical stripes, the accumulation of the products resets for each rotated position of the vertical stripes. If this detail is not apparent, the reader can refer back to the example previously discussed in FIGS. 9A-9C.

FIG. 22C depicts processing of the respective sub-vertical stripes, $F_{1,2}$, $F_{2,2}$, $F_{3,2}$, $F_{4,2}$ belonging to vertical stripe $B_2$. As should be apparent, the accumulators within the respective systolic arrays are reset prior to the processing of FIG. 22C, as the sums stemming from the vertical stripe $B_1$ are separate from the sums stemming from the vertical stripe $B_2$ (see FIGS. 9A and 9B). The processing performed in FIG. 22C is virtually identical to that of FIG. 22B, except for the sub-vertical stripes being processed, so a more detailed discussion will be omitted for the sake of conciseness.

Figure 22D:
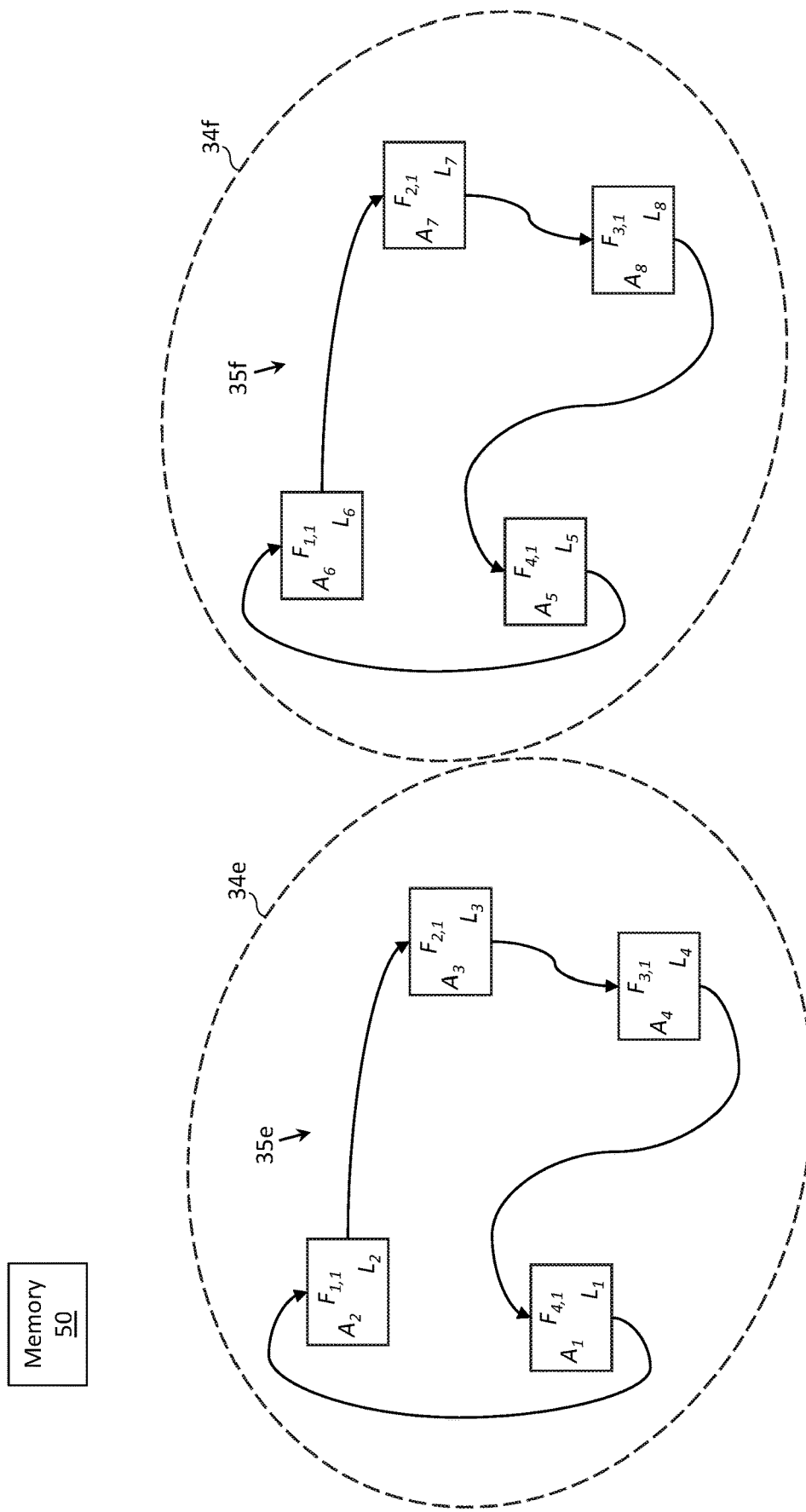
FIGS. 22D-22E provides a variation to the example in FIGS. 22B-22C, in which the sub-vertical stripes are passed along two closed paths, in accordance with one embodiment of the invention.
Figure 22E:
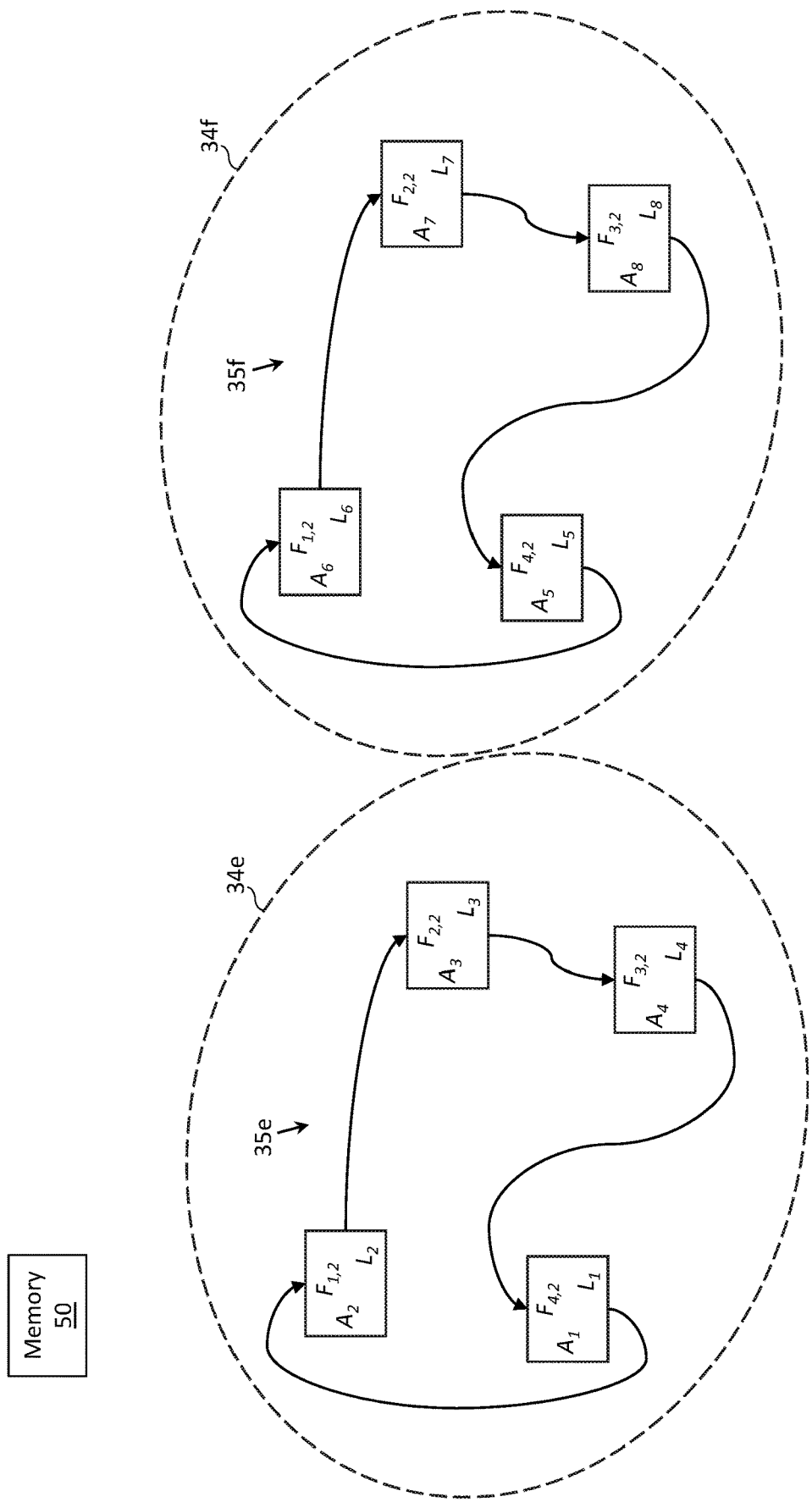

FIGS. 22D-22E provides a variation to the example in FIGS. 22B-22C, in which the sub-vertical stripes are passed along two closed paths 35e, 35f. FIG. 22D depicts the processing of the respective sub-vertical stripes, $F_{1,1}$, $F_{2,1}$, $F_{3,1}$, $F_{4,1}$ belonging to vertical stripe $B_1$, after one copy of the sub-vertical stripes $F_{1,1}$, $F_{2,1}$, $F_{3,1}$, $F_{4,1}$ has been loaded from memory 50 onto the chiplets $L_1$, $L_2$, $L_3$, $L_4$ belonging to chiplet group 34e and another copy of the sub-vertical stripes $F_{1,1}$, $F_{2,1}$, $F_{3,1}$, $F_{4,1}$ has been loaded from memory 50 onto the chiplets $L_5$, $L_6$, $L_7$, $L_8$ belonging to chiplet group 34f. Based on the discussion from the previous examples, it should be apparent how the processing of the sub-vertical stripes belonging to vertical stripe $B_1$ continues from FIG. 22D (i.e., the sub-verticals stripes are rotated within the respective closed paths 35e and 35f until each of the chiplets has received and processed a copy of the sub-vertical stripes belonging to vertical stripe $B_1$).

FIG. 22E depicts the processing of the respective sub-vertical stripes, $F_{1,2}$, $F_{2,2}$, $F_{3,2}$, $F_{4,2}$ belonging to vertical stripe $B_2$, after one copy of the sub-vertical stripes $F_{1,2}$, $F_{2,2}$, $F_{3,2}$, $F_{4,2}$ has been loaded from memory 50 onto the chiplets $L_1$, $L_2$, $L_3$, $L_4$ belonging to chiplet group 34e and another copy of the sub-vertical stripes $F_{1,2}$, $F_{2,2}$, $F_{3,2}$, $F_{4,2}$ has been loaded from memory 50 onto the chiplets $L_5$, $L_6$, $L_7$, $L_5$ belonging to chiplet group 34f. Based on the discussion from the previous examples, it should be apparent how the processing of the sub-vertical stripes belonging to vertical stripe $B_2$ continues from FIG. 22E (i.e., the sub-verticals stripes are rotated within the respective closed paths 35e and 35f until each of the chiplets has received and processed a copy of the sub-vertical stripes belonging to vertical stripe $B_2$). As should be apparent, the accumulators within the respective systolic array are reset prior to the processing of FIG. 22E, as the sums stemming from the vertical stripe $B_1$ are separate from the sums stemming from the vertical stripe $B_2$ (see FIGS. 9A and 9B). While two vertical stripes have been discussed in the examples of FIG. 22A-22E, it is understood that a similar reasoning would apply to two or more verticals stripes that are processed in separate time periods.

Figure 23B:
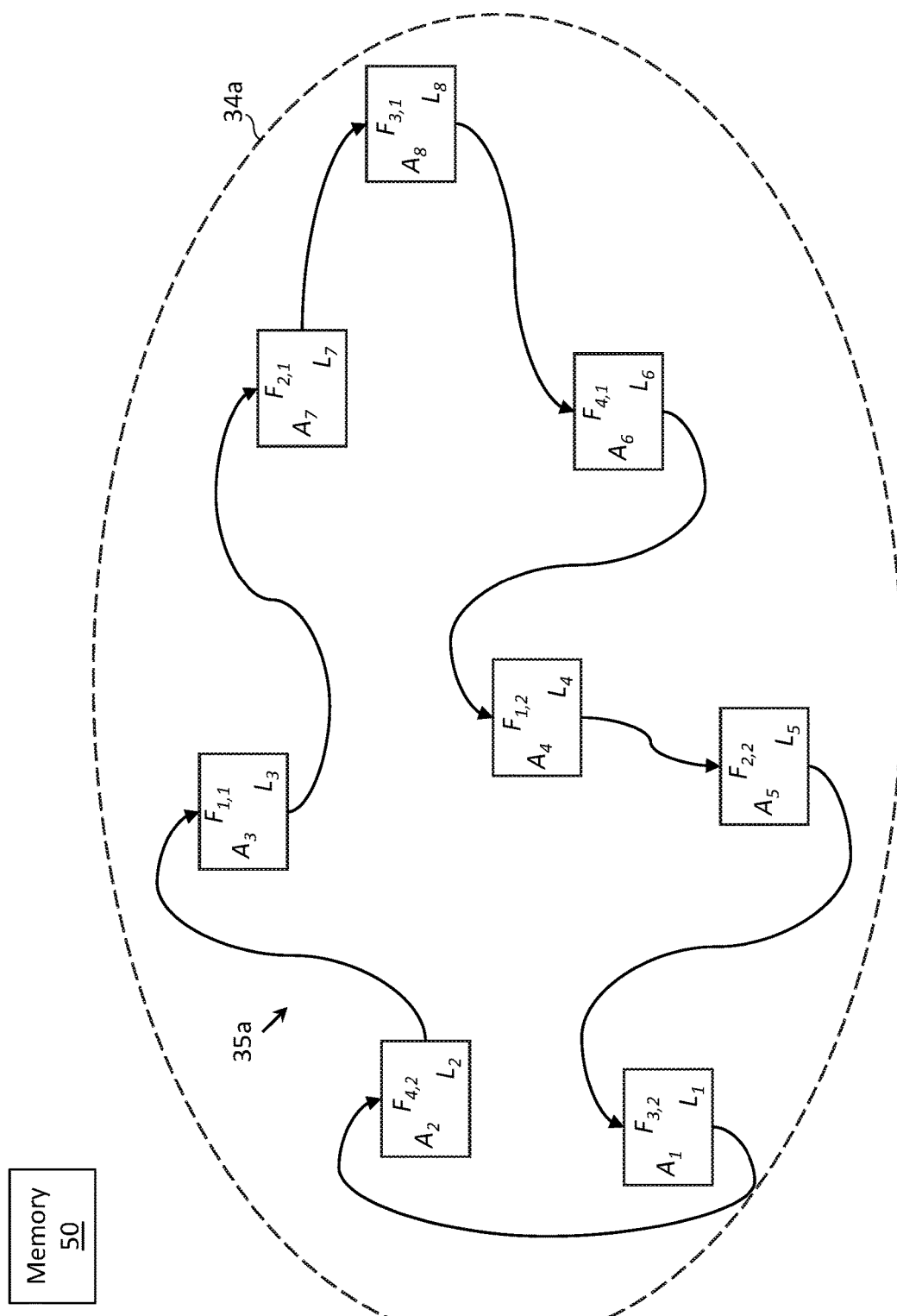

FIGS. 23A-23B depicts the decomposition of matrix A and matrix B in accordance with FIG. 8, and furthermore, the vertical stripes being processed in the same time period. As shown in FIG. 23B, sub-vertical stripes $F_{1,2}$, $F_{2,2}$, $F_{3,2}$, $F_{4,2}$ belonging to vertical stripe $B_1$ and sub-vertical stripes $F_{1,2}$, $F_{2,2}$, $F_{3,2}$, $F_{4,2}$ belonging to vertical stripe $B_2$ are both loaded from memory 50 onto the chiplets from chiplet group 34a. As time progresses and the sub-vertical stripes belonging to both vertical stripes $B_1$ and $B_2$ are rotated through closed path 35a, each chiplet will need to form two running sums, one corresponding to vertical stripe $B_1$ and another corresponding to vertical stripe $B_2$. As such, the architecture of a MAC unit 10 may need to be modified to include two accumulators. Further, the control logic may be more complex in that controller 25 may need to determine which vertical stripe a sub-vertical stripe belongs to (e.g., via metadata associated with the sub-vertical stripe), and activate the corresponding accumulator in each of the MAC units 10 (i.e., with one accumulator assigned to accumulate the sum corresponding to each of the vertical stripes). As an alternative to instantiating two accumulators on each of the MAC units 10, one accumulator may be used to compute the partial sums belonging to either one of the vertical stripes, but temporary storage (e.g., on output buffer 28) would be used to store two running totals, one corresponding to each of the vertical stripes. Further, the partial sum computed by the accumulator would need to be switched between the two running totals, depending on which vertical stripe the partial sum corresponds to. While two vertical stripes have been discussed in the example of FIG. 23A, it is understood that the same reasoning would apply to two or more verticals stripes that are processed in the same time period. More specifically, if q verticals stripes were processed in the same time period, the architecture of a MAC unit 10 may need to be modified to include q accumulators. In order to avoid the overhead that may be incurred in the example of FIGS. 23A-23B, it may be preferable to process the sub-vertical stripes corresponding to each vertical stripe in separate time periods (as in FIGS. 22A-22E).

For completeness, it is noted that the embodiments described in FIGS. 21D-21F and FIGS. 23A-23B can be combined such that each of the chiplets may have two or more horizontal stripes resident at the same time (as was the case in FIGS. 21D-21F), and two or more sub-vertical stripes can be rotated through the same closed path (as was the case in FIGS. 23A-23B). In such case, the number of accumulators instantiated on each of the MAC units 10 or the number of running totals stored in temporary storage (e.g., output buffer 28) would be the product of the number of horizontal stripes resident at the same time on a chiplet and the number of sub-vertical stripes being rotated through the same closed path.

While the examples in FIG. 15A through FIG. 23B have focused on the horizontal stripe being stationary and the vertical stripes or sub-vertical stripes being passed between respective pairs of the chiplets, it should be understood that the examples can be extended to the related arrangement in which the vertical stripes are stationary and the horizontal stripes or sub-horizontal stripes are passed between respective pairs of the chiplets without any loss in generality. For the sake of completeness, a brief example is provided in FIGS. 24A-24C with stationary vertical stripes and rotating horizontal stripes. In the example, matrix B includes eight vertical stripes and is represented as follows:

$$B = [B_1 \ldots B_8]$$

Figure 24A:
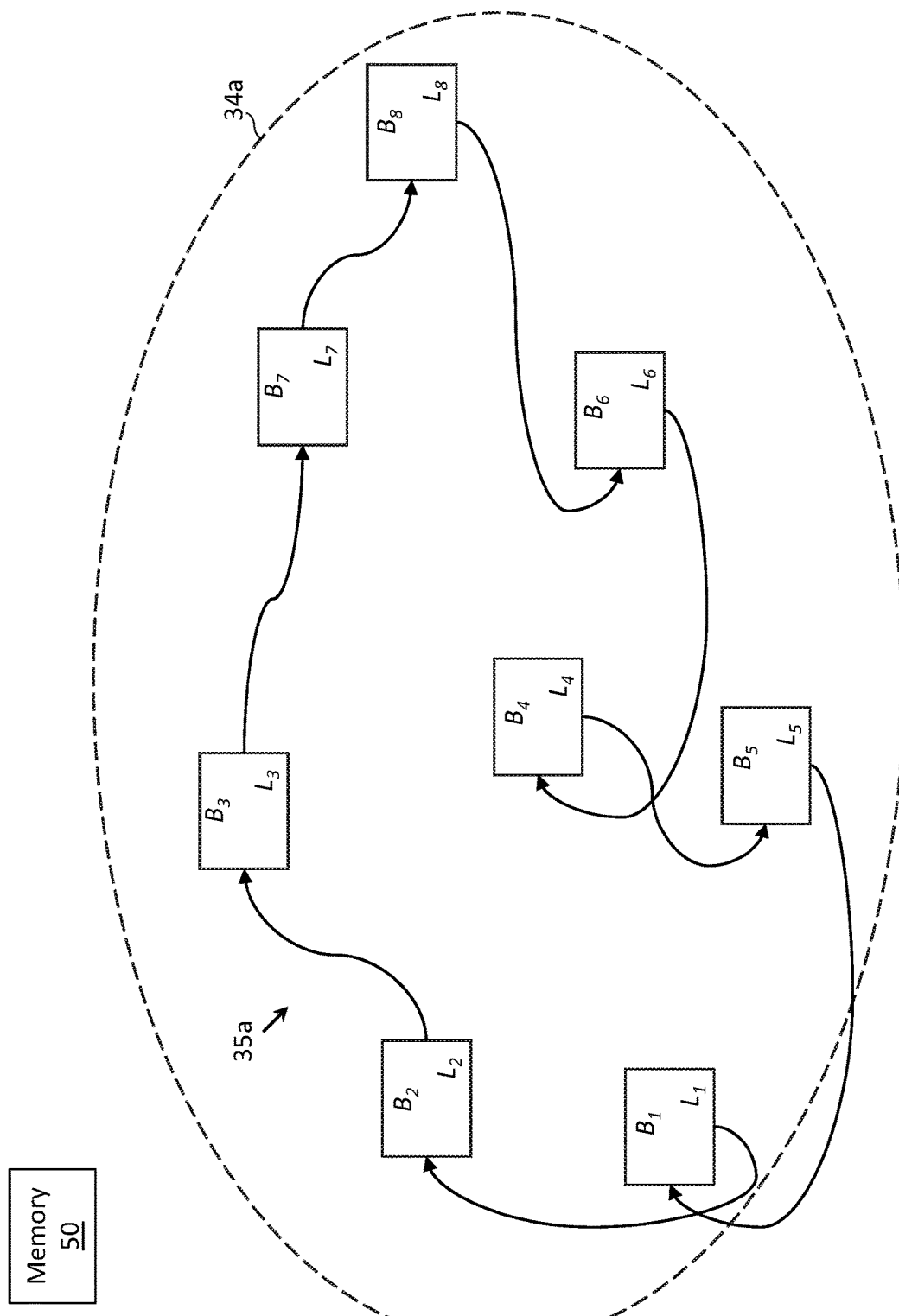
FIGS. 24A-24C depicts an example with stationary vertical stripes and rotating horizontal stripes, in accordance with one embodiment of the invention.

In FIG. 24A, one of the vertical stripes of matrix B are stored from memory 50 on each of the chiplets. For convenience of depiction and explanation, vertical stripe $B_1$ is stored on chiplet $L_j$, for $j=1 \ldots 8$; however, it is understood that the index of the vertical stripe need not be identical to the index of the chiplet in general.

Figure 24B:
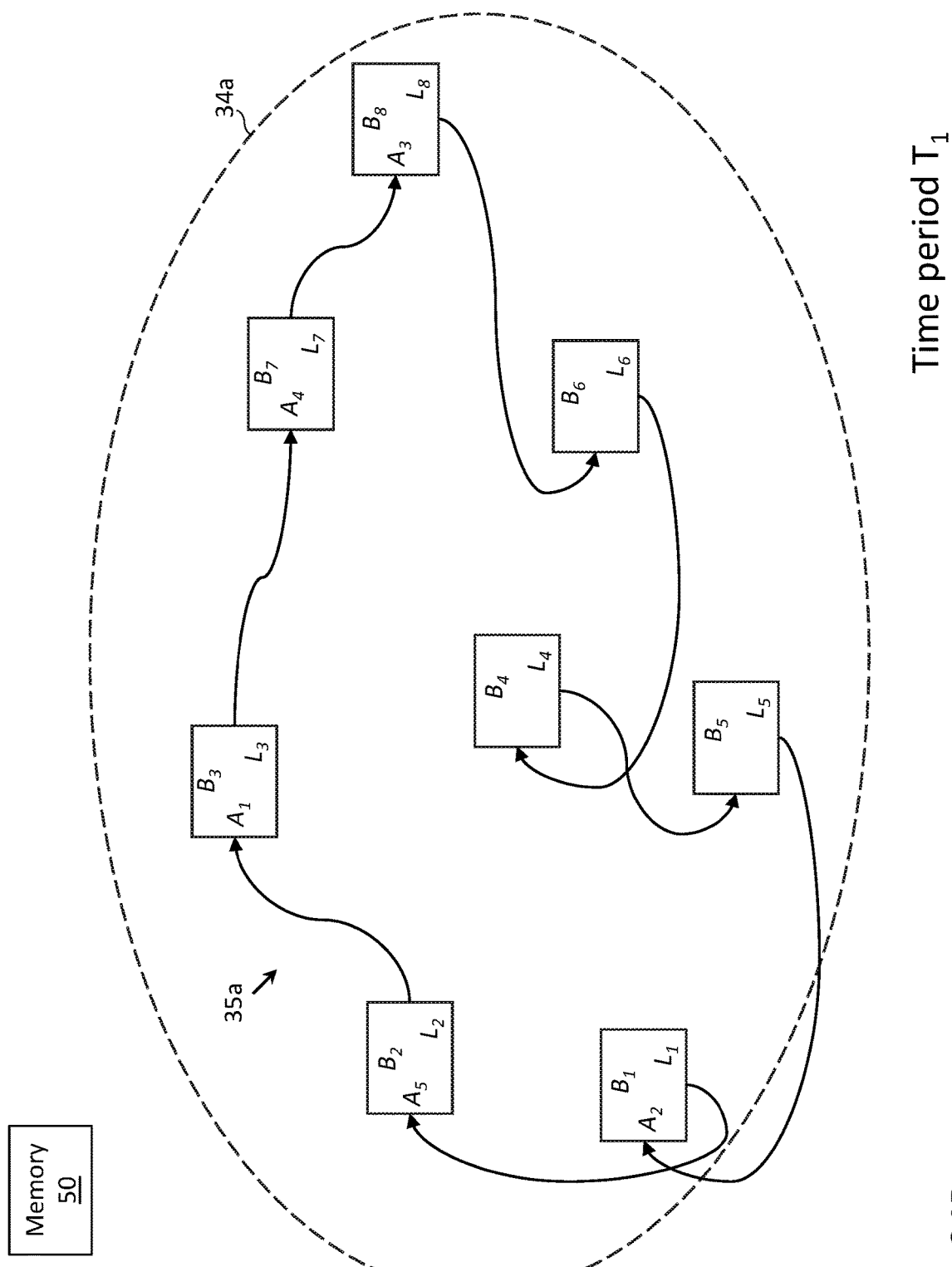

FIG. 24B depicts the processing of the horizontal stripes during time period $T_1$ after the horizontal stripes, $A_1, \ldots, A_5$ that have been loaded into chiplets, $L_3, L_1, L_8, L_7, L_2$, respectively from memory 50. Matrix A includes five horizontal stripes, and is represented as follows:

$$A = \begin{bmatrix} A_1 \\ \vdots \\ A_5 \end{bmatrix}$$

In the example, since there are more chiplets than horizontal stripes, some of the chiplets (e.g., $L_4$, $L_5$, $L_6$) may initially not store any horizontal stripes.

Figure 24C:
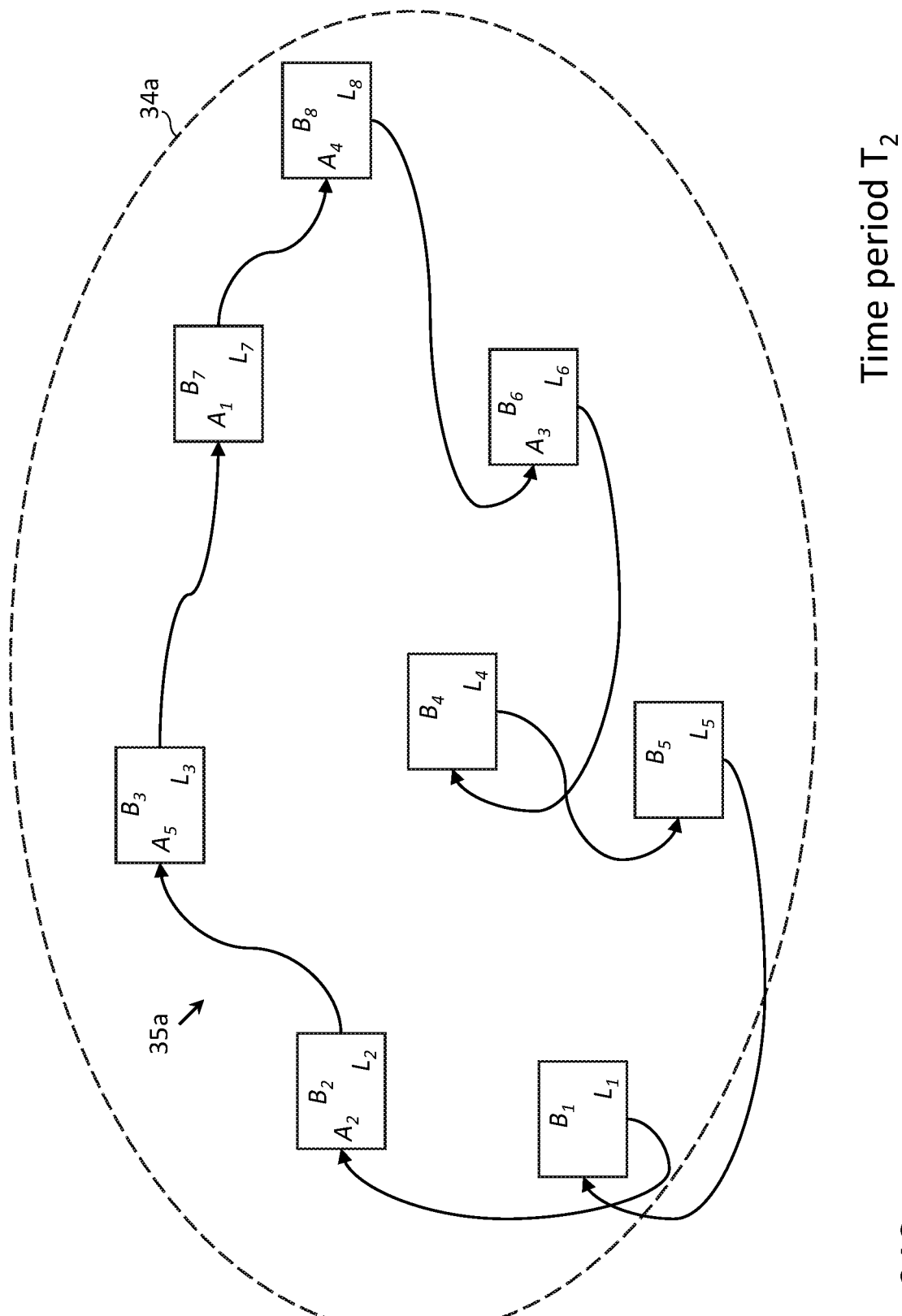

FIG. 24C depicts the processing of horizontal stripes during time period $T_2$ (which immediately follows time period $T_1$ in the example of FIG. 24C) after the horizontal stripes have been "rotated" in the clockwise direction along closed path 35a in the intervening time between time period $T_1$ and time period $T_2$. The rotation may involve the horizontal stripes being passed from one chiplet to another chiplet. In particular:

horizontal stripe $A_2$ has been passed from chiplet $L_1$ to $L_2$
horizontal stripe $A_5$ has been passed from chiplet $L_2$ to $L_3$
horizontal stripe $A_1$ has been passed from chiplet $L_3$ to $L_7$
horizontal stripe $A_4$ has been passed from chiplet $L_7$ to $L_8$
horizontal stripe $A_3$ has been passed from chiplet $L_8$ to $L_6$ The remaining time periods have been omitted for conciseness, but it should be apparent that the final time period occurs when each of the chiplets has processed a copy of each of the horizontal stripes of matrix A. After the processing in the final time period, vertical stripes from matrix C can be transmitted from each of the chiplets $L_1, \ldots, L_8$ to client device 27, in order to form matrix C (or a portion of matrix C) at client device 27.

For completeness, it is noted that the logic from FIGS. 21A-21C, which depicted an example to handle the case when the number of (fixed) horizontal stripes in matrix A is greater than the number of chiplets, can be applied to the corresponding scenario in which the number of (fixed) vertical stripes in matrix B is greater than the number of chiplets.

If the operation with fixed horizontal stripes and rotating vertical stripes were called a first mode of operation, and the operation with fixed vertical stripes and rotating horizontal stripes were called a second mode of operation, it is noted that the operation can transition from the first mode of operation to the second mode of operation and vice versa. For instance, under the first mode of operation, matrix A and matrix B may be multiplied to generate output horizontal stripes of the output matrix C. At this point, the operation may transition to the second mode of operation, in which the horizontal stripes of matrix C (which are already resident on each of the chiplets as a result of the computation on the respective chiplets) are rotated across the chiplets and the vertical stripes of matrix D are fixed in order to compute the product of C*D. This ability to transition from one mode to another is important as matrix D is often a constant and is loaded once at boot and then is used thousands of times with different inputs (i.e., in which each of the inputs is the result of matrix multiplication).

While the examples so far have discussed striped data being transmitted within closed paths, it is also possible for the striped data to be transmitted along paths in the form of other topologies, such as trees. More generally, all that is needed is for the chiplets to be interconnected via a set of connections such that each of the chiplets is reachable from any of the other chiplets in one or more hops.

Thus, methods for multiplying matrices using a plurality of chiplets has been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method, comprising:
   partitioning a first matrix, A, with size m rows by n columns into a plurality of input horizontal stripes, $A_1, \ldots, A_S$, such that $$A = \begin{bmatrix} A_1 \\ \vdots \\ A_s \end{bmatrix},$$

each of the input horizontal stripes, $A_i$, for $i=1, \ldots, s$, having size h rows by n columns, with h being is less than m;
   partitioning each of the input horizontal stripes, $A_i$, for $i=1, \ldots, s$ into a plurality of sub-horizontal stripes $\{E_{i,k}\}|_{i=1 \ldots s, k=1 \ldots u}$, such that $$A_i = [E_{i,1} \ldots E_{i,u}],$$

each of the sub-horizontal stripes, $E_{i,k}$, having size h rows by x columns, with x being less than n;
   partitioning a second matrix, B, with size n rows by p columns into a plurality of vertical stripes, $B_1, \ldots, B_t$, such that $$B = [B_1 \ldots B_t],$$

each of the vertical stripes, $B_j$, for $j=1, \ldots, t$ with size n rows by w columns, with w being is less than p;
   partitioning each of the vertical stripes, $B_j$, for $j=1, \ldots, t$ into a plurality of sub-vertical stripes $\{F_{k,j}\}|_{k=1 \ldots u, j=1 \ldots t}$, such that $$B_j = \begin{bmatrix} F_{1,j} \\ \vdots \\ F_{u,j} \end{bmatrix},$$

each of the sub-vertical stripes, $F_{k,j}$, having size x rows by w columns;
   storing the input horizontal stripes $A_1, \ldots, A_r$ across a plurality of chiplets, $L_1, \ldots, L_r$, such that horizontal stripe $A_d$ is stored at chiplet $L_d$, for $d=1 \ldots r$, wherein each of the chiplets comprises a systolic array;
   communicating each of the sub-vertical stripes $\{F_{k,j}\}|_{k=1 \ldots u, j=1 \ldots t}$ between respective pairs of the chiplets from the plurality of chiplets until each of the chiplets from the plurality of chiplets has received each of the sub-vertical stripes $\{F_{k,j}\}|_{k=1 \ldots u, j=1 \ldots t}$; and
   at the chiplet, $L_d$, for $d=1 \ldots r$:
      multiplying, by the systolic array, the sub-horizontal stripe $E_{d,k}$ with the sub-vertical stripe $F_{k,j}$ for $j=1 \ldots t$ and $k=1 \ldots u$ so as to form a plurality of products $E_{d,k}F_{k,j}$ for $j=1 \ldots t$ and $k=1 \ldots u$;
      summing, by the systolic array, the plurality of products in accordance with $$A_d B_j = \sum_{k=1}^{u} E_{d,k} F_{k,j}, \text{ for } j = 1 \ldots t; \text{ and}$$

forming an output horizontal stripe, $C_d$, in accordance with $$C_d = [A_d B_1 \ldots A_d B_t],$$

each of the output horizontal stripes, $C_d$, having size h rows by p columns.

2. The method of claim 1, wherein the plurality of chiplets is logically divided into one or more chiplet groups which form a partition of the plurality of chiplets, wherein respective chiplets within each of the chiplet groups are interconnected to one another via one or more closed paths, and wherein communicating each of the sub-vertical stripes $\{F_{k,j}\}|_{k=1 \ldots u, j=1 \ldots t}$ between respective pairs of the chiplets comprises passing the sub-vertical stripes $\{F_{k,j}\}|_{k=1 \ldots u, j=1 \ldots t}$ through each of the one or more closed paths.

3. The method of claim 2, wherein at least one of the one or more closed paths contains at least two copies of each of the sub-vertical stripes $\{F_{k,j}\}|_{k=1 \ldots u, j=1 \ldots t}$.

4. The method of claim 2, wherein sub-vertical stripes from a first one of the vertical stripes are processed on the plurality of chiplets in a first time period, and sub-vertical stripes from a second one of the vertical stripes are processed on the plurality of chiplets in a second time period, the first time period being disjoint from the second time period.

5. The method of claim 2, wherein sub-vertical stripes from a first one of the vertical stripes are processed on the plurality of chiplets in a first time period, and sub-vertical stripes from a second one of the vertical stripes are processed on the plurality of chiplets in a second time period, the first time period being identical to the second time period.

6. The method of claim 2, wherein each of the one or more closed paths traverses each of the chiplets at most one time.

7. The method of claim 6, each of the one or more closed paths is bi-directional.

8. The method of claim 1, wherein a time at which a first one of the sub-vertical stripes is communicated between a first pair of the chiplets is independent from a time at which a second one of the sub-vertical stripes is communicated between a second pair of the chiplets.

9. The method of claim 1, further comprising for $d=1 \ldots r$, transmitting, by the chiplet, $L_d$, the output horizontal stripe, $C_d$ to a client device.

10. The method of claim 1, further comprising for d=1 . . . r, repurposing the output horizontal stripe, $C_d$ as a further input horizontal stripe to a matrix multiplication operation.

11. A method, comprising:

partitioning a first matrix, A, with size m rows by n columns into a plurality of input horizontal stripes, $A_1, \ldots, A_S$, such that $$A = \begin{bmatrix} A_1 \\ \vdots \\ A_s \end{bmatrix},$$

each of the input horizontal stripes, $A_i$, having size h rows by n columns, with h being is less than m;

partitioning each of the input horizontal stripes, $A_1, \ldots, A_S$ into a plurality of sub-horizontal stripes $\{E_{i,k}\}|_{i=1 \ldots s, k=1 \ldots u}$, such that $$A_1 = [E_{i,1} \ldots E_{i,u}],$$

each of the sub-horizontal stripes, $E_{i,k}$, having size h rows by x columns, with x being less than n;

partitioning a second matrix, B, with size n rows by p columns into a plurality of vertical stripes, $B_1, \ldots, B_t$, such that $$B = [B_1 \ldots B_t],$$

each of the vertical stripes, $B_j$, with size n rows by w columns, with w being is less than p;

partitioning each of the vertical stripes, $B_1, \ldots, B_t$ into a plurality of sub-vertical stripes $\{F_{k,j}\}|_{k=1 \ldots u, j=1 \ldots t}$, such that $$B_j = \begin{bmatrix} F_{1,j} \\ \vdots \\ F_{u,j} \end{bmatrix},$$

each of the sub-vertical stripes, $F_{k,j}$, having size x rows by w columns;

storing the input vertical stripes $B_1, \ldots, B$, across a plurality of chiplets, $\{L_d\}|_{d=1 \ldots r}$, such that input vertical stripe $B_d$ is stored at the chiplet $L_d$, for d=1 . . . r, wherein each of the chiplets comprises a systolic array;

communicating each of the sub-horizontal stripes $\{E_{i,k}\}|_{i=1 \ldots s, k= \ldots u}$ between respective pairs of the chiplets from the plurality of chiplets until each of the chiplets from the plurality of chiplets has received each of the sub-horizontal stripes $\{E_{i,k}\}|_{i=1 \ldots s, k=1 \ldots 1}$; and at the chiplet, $L_d$, for d=1 . . . r:

multiplying, by the systolic array, the sub-horizontal stripe $E_{1,k}$ with the sub-vertical stripe $F_{k,d}$ for i=1 . . . s and k=1 . . . u so as to form a plurality of products $E_{1,k} F_{k,d}$ for i=1 . . . s and k=1 . . . u;

summing, by the systolic array, the plurality of products in accordance with $$A_i B_d = \sum_{k=1}^{u} E_{i,k} F_{k,d}, \text{ for } i = 1 \ldots s; \text{ and}$$

forming an output vertical stripe, $\gamma_d$, wherein $$\gamma_d = \begin{bmatrix} A_1 B_d \\ \vdots \\ A_s B_d \end{bmatrix},$$

each of the output vertical stripes, $\gamma_d$, having size m rows by w columns.

12. The method of claim 11, wherein the plurality of chiplets is logically divided into one or more chiplet groups which form a partition of the plurality of chiplets, wherein respective chiplets within each of the chiplet groups are interconnected to one another via one or more closed paths, and wherein communicating each of the sub-horizontal stripes $\{E_{i,k}\}|_{i=1 \ldots s, k=1 \ldots u}$ between respective pairs of the chiplets comprises passing the sub-horizontal stripes $\{E_{i,k}\}|_{i=1 \ldots s, k=1 \ldots u}$ through each of the one or more closed paths.

13. The method of claim 12, wherein at least one of the one or more closed paths contains at least two copies of each of the sub-horizontal stripes $\{E_{i,k}\}|_{i=1 \ldots s, k=1 \ldots u}$.

14. The method of claim 12, wherein sub-horizontal stripes from a first one of the horizontal stripes are processed on the plurality of chiplets in a first time period, and sub-horizontal stripes from a second one of the horizontal stripes are processed on the plurality of chiplets in a second time period, the first time period being disjoint from the second time period.

15. The method of claim 12, wherein sub-horizontal stripes from a first one of the horizontal stripes are processed on the plurality of chiplets in a first time period, and sub-horizontal stripes from a second one of the horizontal stripes are processed on the plurality of chiplets in a second time period, the first time period being identical to the second time period.

16. The method of claim 12, wherein each of the one or more closed paths traverses each of the chiplets at most one time.

17. The method of claim 16, each of the one or more closed paths is bi-directional.

18. The method of claim 11, wherein a time at which a first one of the sub-horizontal stripes is communicated between a first pair of the chiplets is independent from a time at which a second one of the sub-horizontal stripes is communicated between a second pair of the chiplets.

19. The method of claim 11, further comprising for d=1 . . . r, transmitting, by the chiplet, $L_d$, the output vertical stripe, $\gamma_d$ to a client device.

20. The method of claim 11, further comprising for d=1 . . . r, repurposing the output vertical stripe, $\gamma_d$ as a further input vertical stripe to a matrix multiplication operation.

* * * * *